(12) United States Patent
Fujita et al.

(10) Patent No.: US 6,325,365 B1
(45) Date of Patent: Dec. 4, 2001

(54) VIBRATION MECHANISM

(75) Inventors: Etsunori Fujita; Seiji Kawasaki; Shigeyuki Kojima, all of Hiroshima (JP)

(73) Assignee: Delta Tooling Co., Ltd., Hiroshima (JP)

(*) Notice: Subject to any disclaimer, the term of this patent is extended or adjusted under 35 U.S.C. 154(b) by 0 days.

(21) Appl. No.: 09/577,139

(22) Filed: May 24, 2000

(30) Foreign Application Priority Data

May 25, 1999 (JP) .................................... 11-144860

(51) Int. Cl.[7] .................................................. F16F 13/00
(52) U.S. Cl. ........................... 267/140.15; 267/140.14; 188/161; 188/267
(58) Field of Search .................... 188/267, 161; 267/140.14, 140.15

(56) References Cited

U.S. PATENT DOCUMENTS

| 4,502,652 | 3/1985 | Breitach . | |
|---|---|---|---|
| 4,669,711 | * 6/1987 | Beer | 267/140.1 |
| 5,542,506 | * 8/1996 | McMichael | 188/267 |
| 5,896,961 | * 4/1999 | Aida | 188/378 |
| 6,035,980 | * 3/2000 | Fujita | 188/267 |
| 6,084,329 | * 7/2000 | Fujita | 310/90.5 |
| 6,232,689 | * 5/2001 | Fujita et al. | 310/103 |
| 6,241,059 | * 6/2001 | Fujita et al. | 188/267 |

FOREIGN PATENT DOCUMENTS

| 13185 | 5/1957 | (DE) . |
| 2 024 746 | 12/1971 | (DE) . |
| 0 230 626 | 8/1987 | (EP) . |
| 0342377 | * 11/1989 | (EP) . |
| 0 833 074 | 4/1998 | (EP) . |
| 0833074 | * 4/1998 | (EP) . |
| 2 668 969 | 5/1992 | (FR) . |
| 99/17034 | 4/1999 | (WO) . |

* cited by examiner

Primary Examiner—J. J. Swann
Assistant Examiner—David Devine
(74) Attorney, Agent, or Firm—Wenderoth, Lind & Ponack, L.L.P.

(57) ABSTRACT

A vibration mechanism includes a repulsive magneto-spring made up of at least two permanent magnets 22, 24, 36, 38. In this vibration mechanism, the spring constant of the magneto-spring is set to approximately zero by appropriately selecting the relationship of one of the permanent magnets 22, 24, 36, 38 relative to the other.

4 Claims, 73 Drawing Sheets

Fig. 11A
Fig. 11B
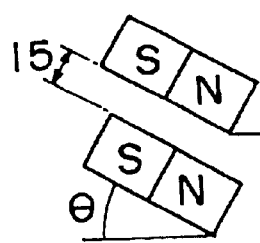
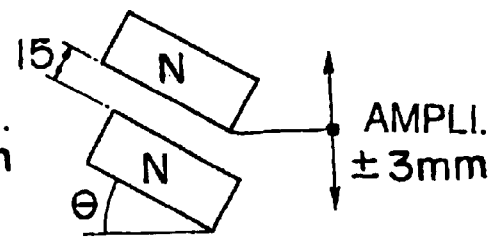
Fig. 13
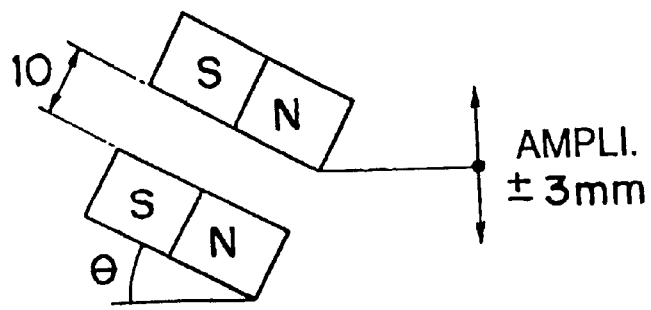
Fig. 15
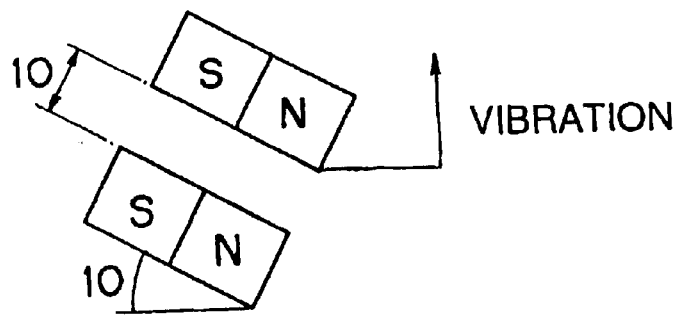

BEHAVIOR OF VSUM SEAT

BEHAVIOR OF CONVENTIONAL SUSPENSION SEAT

*Fig.* 36
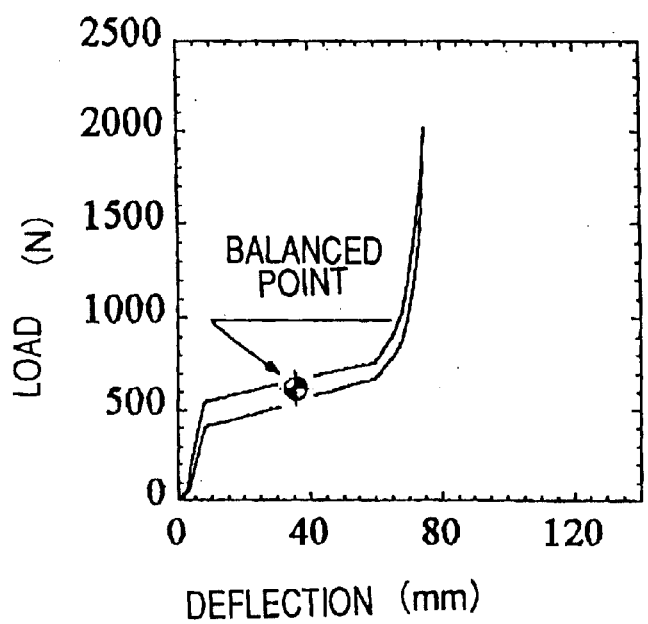
*Fig.* 37
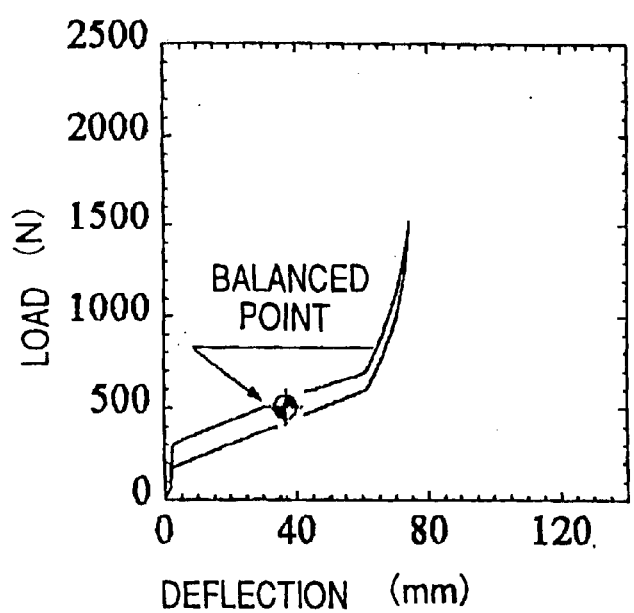

Fig. 57
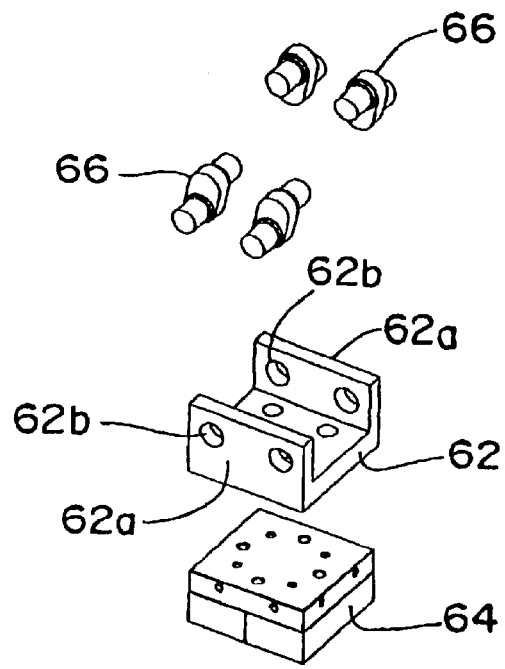
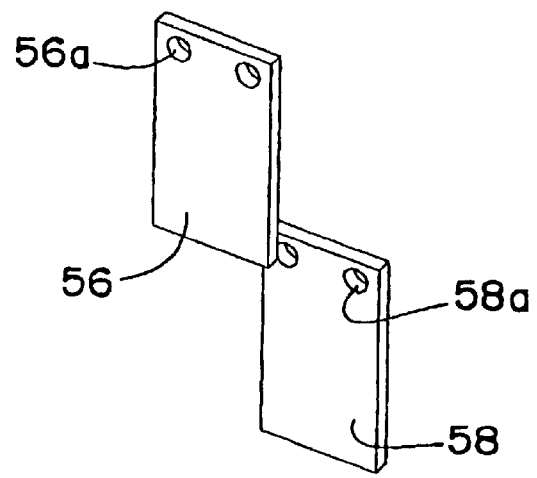
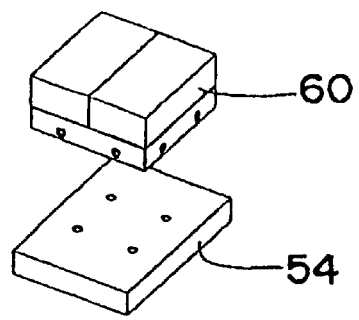

Fig. 77
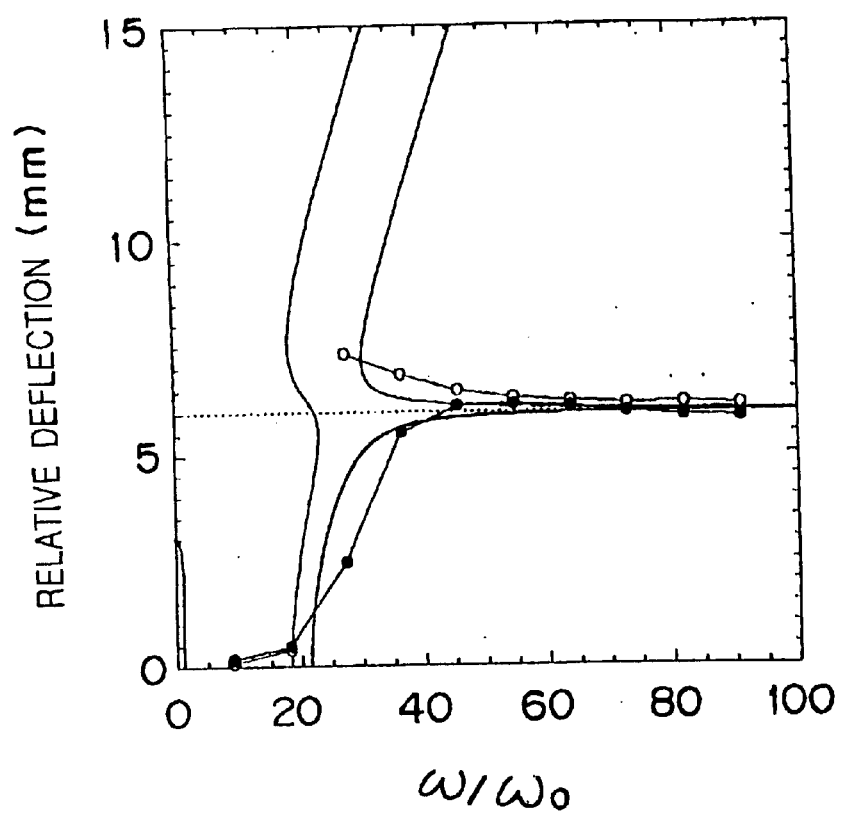
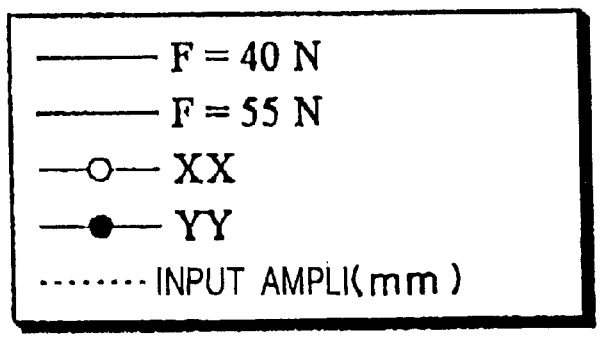
$\zeta = 0.1$
$k_1 = 50 \text{ N/m}$
$k_3 = 11000000 \text{ N/m}$
$h_1 = 0 \text{ N/m}$
$h_3 = 385000000 \text{ N/m}$ Fig. 79
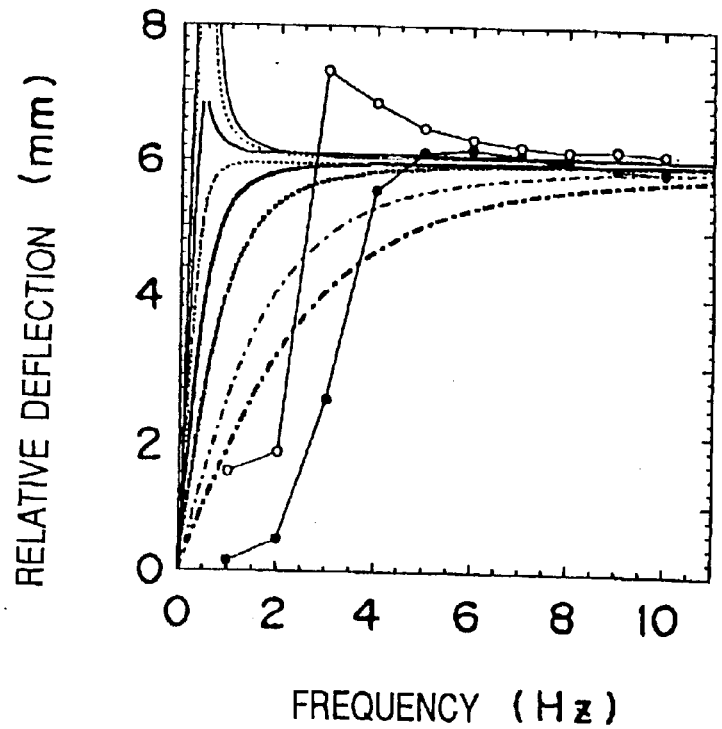
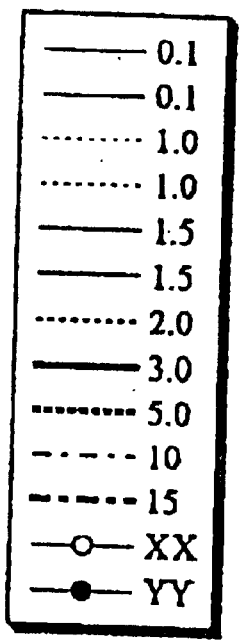

Fig. 80
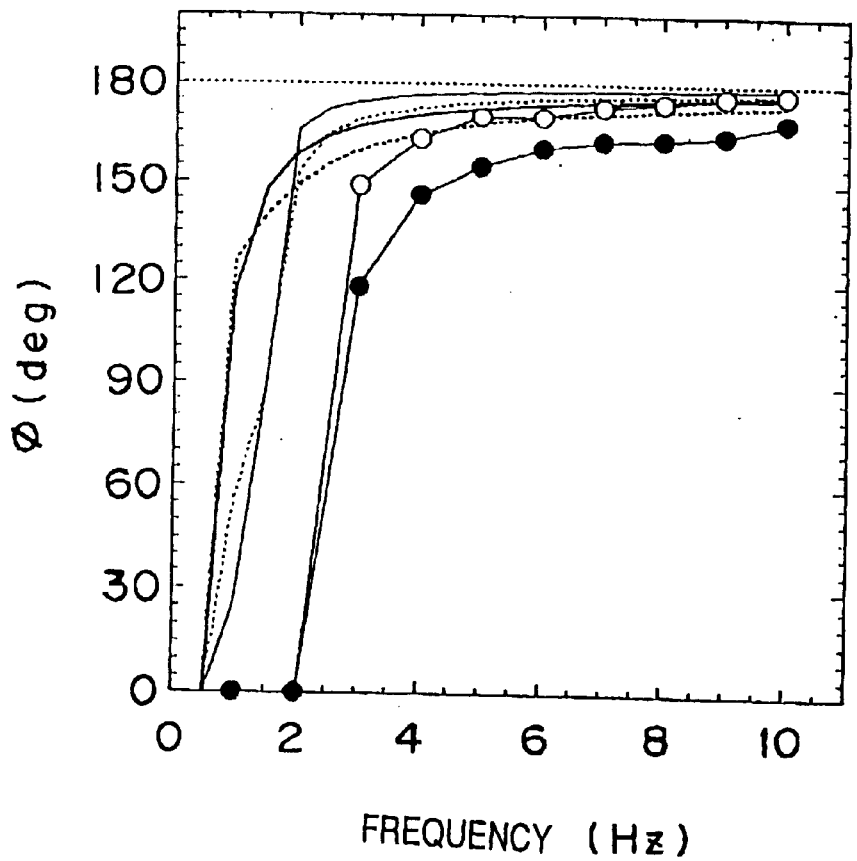
FREQUENCY (Hz)
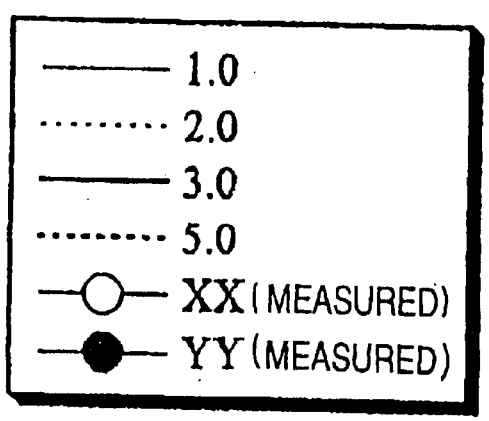
$k_1 = 50$ N/m
$k_3 = 55000000$ N/m
$k = k_1 + h_1$
$m = 105$ kg (a)

VIBRATION MECHANISM

BACKGROUND OF THE INVENTION

1. Field of the Invention

The present invention relates to a vibration mechanism having a magneto-spring that can be used for a vibration isolator such, for example, as a suspension unit, a cab mount, an engine mount or the like.

2. Description of the Related Art

Various types of damping materials, dampers, and other control methods have been proposed to prevent vibration and noise that occur in machines and structures built from materials with low internal damping properties, which are required for their strength and rigidity.

In particular, with motor vehicles progressively being made to run at faster and faster speeds, damage to the muscular and nervous systems of vehicle occupants due to exposure to vibration is becoming an issue. Symptoms of these types of damage include fatigue, headaches, stiff shoulders, lower back pain, and vision problems. Normally, springs and damping materials, such as metal springs, air springs, rubber, viscoelastic materials, and dampers, are combined to optimize vibration isolating properties. However, this combination often exhibits opposing characteristics, as in the relationship between the dynamic magnification and the loss factor. That is, if the dynamic magnification is reduced to improve the low-frequency characteristics, this results in a hard spring having a small loss factor, which deteriorates the high-frequency characteristics. In contrast, if the loss factor is increased to improve the high-frequency characteristics, this results in a soft spring having a large dynamic magnification, which is analogous to the damping materials and deteriorates the low frequency characteristics. For that reason, many studies are being conducted on controlling vibration using passive vibration isolators including dynamic dampers, or quasi-active or active control systems. There is a demand for the dampers which can cope with a characteristic change of an object for which vibration isolation is intended, or which is not subject to deterioration with age and influenced by the environment such as temperatures, oils, ozone or the like.

From among these studies, a suspension seat that combines a suspension mechanism set at a low spring constant under a relatively hard cushion has been proposed as a seat that would reduce the vibrational energy from a motor vehicle. Conventional suspension seats attempt to find a point of compromise between isolating high-frequency components of vibrational input and reducing the shocks due to the cushion hitting its bottom point (bottoming or bottom end stop), to optimize the suspension's parameters, but with passive control, limitations always exist.

In recent years, accompanying the practical use of permanent magnets that have a high coercive force and high residual magnetic flux density, research is flourishing in area such as mechanical structures and magnetic systems that utilize magnetic levitation, magnetic bearings, MR dampers, etc., which use magnetic force and magnetic fluidity to control vibration. In particular, magnetic dampers in which eddy currents caused by electromagnetic induction and magnetic damping caused by the effects of magnetic flux are utilized are useful as an attenuating means, and the practical use thereof is expanding.

Meanwhile, because magnetic levitation damping technology makes it possible to support physical objects with no actual physical contact, its merits include reduction of problems related to friction and wear, the capability for motion at very high speeds, and low levels of vibration and noise. Moreover, it can be used in special situations (also a special characteristic of magnets), as well as having the advantage of its force being effective in all directions. For those reasons, magnetic levitation vehicles, magnetic bearings, etc. which apply these special characteristics are being developed.

Of the levitation technologies that utilize these types of magnetic forces, the majority utilizes attractive forces. Magnetic circuits that make use of repulsive forces are difficult to utilize in vibration control systems, due to their instability, the fact that the marked non-linear characteristics of the repulsive forces are difficult to control, and their large spring constant.

SUMMARY OF THE INVENTION

The present invention has been developed to overcome the above-described disadvantages.

It is accordingly an objective of the present invention to provide a vibration mechanism capable of effectively absorbing vibration input from the outside when incorporated into a suspension unit for an automobile seat, an engine mount or the like.

In accomplishing the above and other objectives, the vibration mechanism according to the present invention includes first and second permanent magnets spaced from each other, and the second permanent magnet is movable relative to the first permanent magnet. The first and second permanent magnets constitute a repulsive magneto-spring having a spring constant, wherein magnetic energy accumulated in the magneto-spring is made substantially constant by appropriately selecting a locus of motion of the second permanent magnet relative to the first permanent magnet, thereby setting the spring constant to substantially zero.

By this construction, although the stroke varies depending on input even if vibration is input to the first permanent magnet, the second permanent magnet is not much affected by such vibration, making it possible to efficiently absorb the vibration.

If each of the first and second permanent magnets is a multi-pole magnet, a leakage magnetic field created between neighboring magnet poles can be effectively utilized, resulting in an efficient magneto-spring.

Advantageously, the repulsive force acting between the first and second permanent magnets is made substantially constant by appropriately selecting a relationship between the opposing area of the first and second permanent magnets and the distance between the first and second permanent magnets. Although the construction is very simple, vibration can be effectively absorbed by making use of a phase shift.

Conveniently, the first permanent magnet is secured to a stationary frame, while the second permanent magnet is secured to a movable frame movably mounted on the stationary frame. By this construction, movement of the movable frame relative to the stationary frame changes the opposing area of the two permanent magnets depending on the distance therebetween. As a result, the spring constant is maintained substantially zero, making it possible to efficiently absorb vibration.

If the first and second permanent magnets are inclined on the stationary and movable frames, respectively, the opposing area of the magnets can be easily changed depending on the distance between the magnets, making it possible to simplify the construction of the vibration mechanism.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein:

FIG. 11A is a schematic view of two opposing two-pole magnets when one of the magnets is oscillated with a sine wave having an amplitude of 3 mm;

FIG. 11B is a view similar to FIG. 11A, but depicting single-pole magnets;

FIG. 13 is a view similar to FIG. 11A, but depicting a case in which the balanced point is a point where the opposing area is maximized when the distance between the magnets is 10 mm;

FIG. 15 is a view similar to FIG. 13, but depicting a case in which one of the magnets is oscillated in a range above the balanced point with an angle of inclination maintained constant;

FIG. 36 is a graph similar to FIG. 32, but depicting the load-deflection characteristics of another metal spring type suspension seat;

FIG. 37 is a graph similar to FIG. 32, but depicting the load-deflection characteristics of a further metal spring type suspension seat;

FIG. 57 is an exploded perspective view of the vibration mechanism of FIG. 54;

FIG. 77 is a graph depicting analyzed values and measured values of relative deflection caused by deflection excitation when a sine wave having a constant amplitude has been input;

FIG. 79 is a graph depicting relative deflection curves obtained by deflection excitation when a sine wave having a constant amplitude has been input to the non-linear characteristics obtained by setting the spring constant substantially zero with the use of only a magneto-spring;

FIG. 80 is a graph depicting phase curves when a sine wave having a constant amplitude has been input to the non-linear characteristics obtained by setting the spring constant substantially zero with the use of only a magneto-spring;

DETAILED DESCRIPTION OF THE PREFERRED EMBODIMENTS

Figure 1:
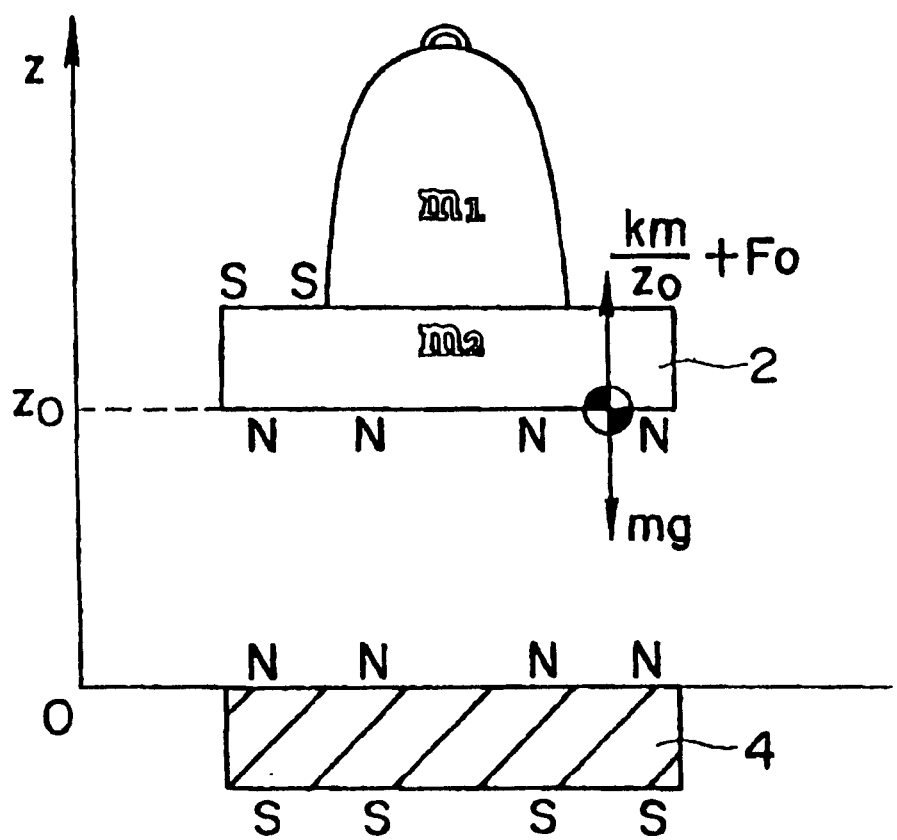
FIG. 1 is a schematic view of a vibration model having two permanent magnets with like magnetic poles opposed to each other, wherein an upper magnet together with a weight placed thereon is allowed to oscillate slightly around a balanced point.

This application is based on application No. 11-144860 filed May 25, 1999 in Japan, the content of which is incorporated hereinto by reference.

As for the methods by which magnetic energy can be utilized, the origin of electromagnetic force is Lorentz force, which controls an electrical charge's velocity vectors within a homogeneous magnetic field (electrical field). The forces that exist between two magnets follow Coulomb's law, and the concept of a "field" of force can be introduced. This field occurs when magnetic charge creates a field called the "magnetic field" around a magnet, which is in turn sensed by another magnet's magnetic charge. If the field is controlled satisfactorily, it is conceivable that the field may bring itself into a steady state, and disturbance may be cancelled out by a passive control.

In a magneto-spring, a pair of permanent magnets 2, 4 such, for example, as rare-earth magnets (Nd—Fe—B) are faced to repel each other. It is a vibration control technology that utilizes control techniques comprising repulsive forces or attractive forces created under relative motion, damping forces created by electromagnetic induction, and a magnetic field gradient.

The repulsive forces between the magnetic poles 2, 4 create fluctuations in energy accumulated by the work produced when the magnetic poles 2, 4 are shifted. The amount of fluctuation is equal to the quantity of work. The magnetic energy accumulated per unit volume of magnetic field space can be found using the following equation:

$$\frac{1}{2} BH = \frac{1}{2} \mu_0 H^2 = \frac{1}{2} \frac{B^2}{\mu_0} \qquad (1)$$

The repulsive forces between the magnets 2, 4 create fluctuations in energy accumulated by the work produced when the magnets 2, 4 are shifted. The amount of fluctuation is equal to the quantity of work. The magnetic energy accumulated per unit volume of magnetic field space can be found using the following equation:

$$F = \frac{1}{2} \frac{B^2 A}{\mu_0} \qquad (2)$$

In these equations, 'B' is the magnetic flux density, 'A' is the area of the magnetic poles, and $\mu_0$ is the magnetic permeability.

From equation (2), the repulsive force is proportional to the square of the magnetic flux density 'B' and to the area 'A'. The magnetic flux density 'B' is determined by the spontaneous magnetization and the effective magnetic field (diamagnetic field+external magnetic field), and is expressed by the following equation:

$$B = 4\pi I - Hm + Hex \qquad (3)$$

The magnetic flux Hm indicates the diamagnetic field of the force by which the magnet weakens itself (self-demagnetization), and Hex is the external magnetic field that arises when magnetic poles oppose one another. As a countermeasure against self-demagnetization, multi polarization is effective to reduce Hm by creating a sequential (quasi) magnetic field with the neighboring magnets. However, if the gradient of the magnetic line of force is small, compared to the tangential vector at the boundary surface of a magnetic body, the magnetic line of force will not extend outward. In other words, if the number of poles is increased to decrease the Hm, the gradient of the magnetic line of force with respect to the tangential vector at the boundary surface is lost, and the magnetic line of force around a magnetic domain wall almost completely stops extending outward. Moreover, the magnetic flux density at the edges is reduced, weakening the repulsive force. As a result, the strength of the repulsive force is determined by the area of the opposing surfaces, the number of poles and the distance between the magnets that is normally used.

FIGS. 2A to 2E depict various magnets each having an area of 75×75 mm$^2$ and a thickness of 20 mm with the number of poles ranging from one to four. FIG. 3 depicts a relationship between the repulsive force and the distance between the magnets when they are disposed in the same manner as in FIG. 1. Single-pole magnets provide an almost homogeneous magnetic field, while two-pole magnets are controlled in magnetic flux and have a leakage magnetic field between the neighboring magnets, wherein an X-shaped magnetic flux distribution portion has a high magnetic flux density. Table 1 shows spring constants and spring forces of such magnets.

brought closer, a stronger repulsive force is achieved, reducing the sensation of bottoming. If the mechanism is designed such that the influence of the leakage magnetic field is a reduced in the steady state, while the leakage magnetic field is utilized in the unsteady state, the leakage magnetic field can be used for a magnetic force to shift the field to the steady state.

Figure 4:
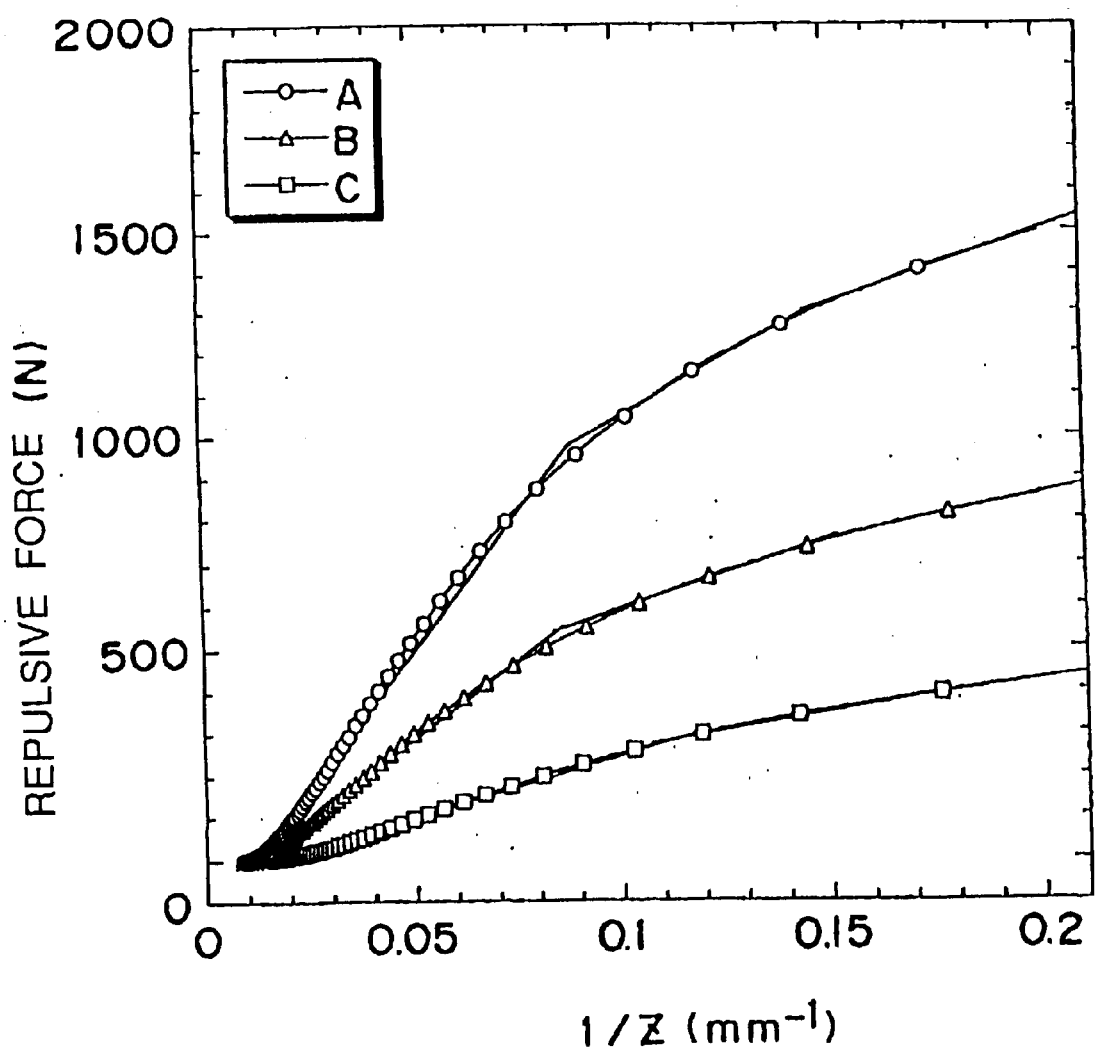
FIG. 4 is a graph depicting a relationship between the distance between the magnets and the static repulsive force when various magnets have been moved in the direction perpendicular to their major surfaces.

FIG. 4 shows a relationship between the distance between the magnets (z) and the static repulsive force (Fmg) expressed by formula (4), when magnets of different size and mass are put in motion in the direction perpendicular to their surfaces. In FIG. 4, A indicates magnets of s=75×75 mm$^2$ and h-20 mm, B indicates magnets of s=75×75 mm$^2$ and h=10 mm, and C indicates magnets of s=50×50 mm$^2$ and h=10 mm.

In rare earth magnets, the internal magnetic moment is not easily affected by the magnetic field, and the strength of magnetization on a demagnetization curve barely fluctuates, and nearly completely maintains the saturation magnetization strength. For that reason, when the magnetic charge is evenly dispersed at the end surfaces of magnets, a hypothesized charge model is used in calculating the repulsive force acting between the magnets.

Figure 5:
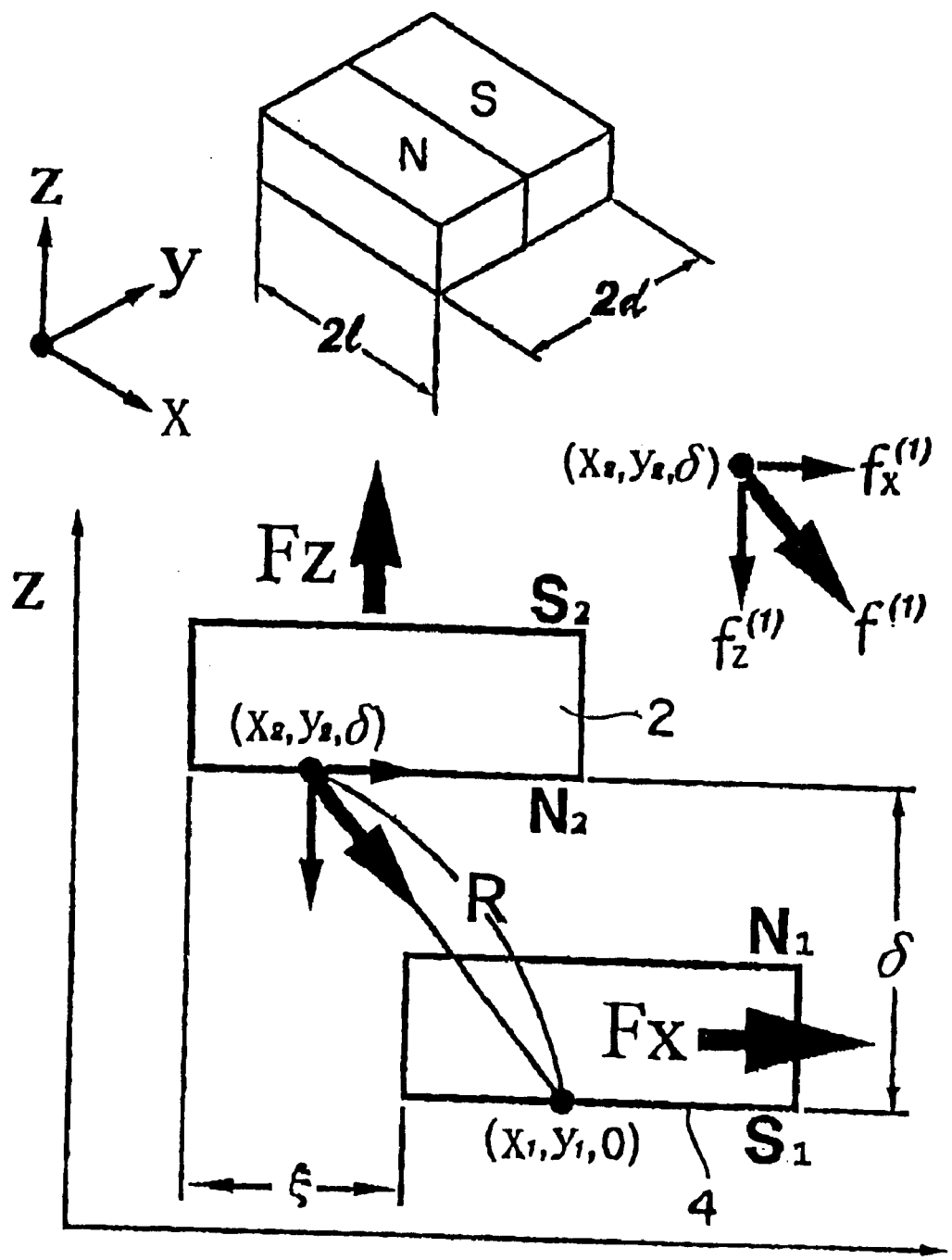
FIG. 5 is a schematic view of an analytical model for use in analyzing the repulsive force and the attractive force of the two permanent magnets with like magnetic poles opposed to each other.

As shown in FIG. 5, (l) and (d) indicate the size of a magnet and $\xi$ is the amount by which the two magnets are offset from each other, provided that the origin for calculation is located at the center point of the lower magnet. The attractive force $f^{(1)}$ that acts upon point P (x2, y2, $\delta$) on magnet surface N2 and upon point Q (x1, y1, 0) on magnet surface S1 is shown below:

TABLE 1

| | 1 pole | | 2 poles | | 3 poles | | 4 poles (FIG. 2E) | | 4 poles (FIG. 2D) | |
|---|---|---|---|---|---|---|---|---|---|---|
| | k$_m$ (Nm) | F$_0$ (N) | k$_m$ (Nm) | F$_0$ (N) | k$_m$ (Nm) | F$_0$ (N) | k$_m$ (Nm) | F$_0$ (N) | k$_m$ (Nm) | F$_0$ (N) |
| I | 2.2 | 566 | 3.5 | 725 | 4.5 | 390 | 4.4 | 512 | 3.4 | 172 |
| II | 5.3 | 230 | 5.8 | 394 | 6.7 | 75 | 6.5 | 197 | 4.9 | −45 |
| III | 12.2 | −108 | 12.0 | −132 | 9.9 | −243 | 10.8 | −212 | 5.8 | −150 |

When the load-deflection characteristic of a magneto-spring system is small enough to ignore the frictional loss, it is reversible, and the repulsive force F$_{mg}$ acting between the magnets (as configured in FIG. 1) has the following relationship:

$$F_{mg} = \frac{k_m}{z} + F_0 \quad (4)$$

In this equation, k$_m$ is the spring constant, z is the distance between the magnets, and F$_0$ is the initial value.

From FIG. 3, an efficient magnetic circuit for a mechanism that is damping vibration across several 10's of mm's of magnet deflection with a seated occupant whose mass is approximately 100 kg would be the two-pole magnet. It has a repulsive force to reduce the "bottoming" sensation, when the distance between the magnets is approximately 5 mm, and it also has a high repulsive force when the distance between the magnets exceeds 20 mm, in the case of the occupant's body absorbing the vibration. Moreover, in the two-pole magnet, a leakage magnetic field is created between the magnets, and when the faced magnets are $$f^{(1)} dx_1 dy_1 dx_2 dy_2 = \frac{q^2}{R^2} dx_1 dy_1 dx_2 dy_2 \quad (5)$$

where qdx$_1$dy$_1$ and qdx$_2$dy$_2$ represent the magnetic charge of minute areas dx$_1$dy$_1$ and dx$_2$dy$_2$, respectively, and R is derived by the following equation:

$$R^2 = (x_2-x_1)^2 + (y_2-y_1)^2 + \delta^2 \quad (6)$$

The x component and the z component of $f^{(1)}$ are derived from the following equations:

$$f_x^{(1)} = f^{(1)} \frac{\sqrt{(x_2-x_1)^2 + (y_2-y_1)^2}}{R} \quad (7)$$

$$f_z^{(1)} = f^{(1)} \frac{\delta}{R} \quad (8)$$

In the same manner, if $f^{(2)}$ is the repulsive force acting between N1 and N2, and $f^{(3)}$ is the repulsive force acting between S1 and S2, loads Fz and Fx are expressed by the following equation:

$$F_\alpha = \int_{-d}^{d}\int_{-d}^{d}\int_{-(\xi+l)}^{-(\xi-l)}\int_{-l}^{l}[-2f_\alpha^{(1)} + f_\alpha^{(2)} + f_\alpha^{(3)}]dx_1 dx_2 dy_1 dy_2 \quad (9)$$

$(\alpha = x, z)$

The results are shown by solid lines in FIGS. 3 and 4. By multiplying correction factors, they are in good agreement with experimental data (○△□) within a 5% margin of error. The spring constant and spring force in each case are shown in Table 1 and Table 2.

TABLE 2

|   | A | | B | | C | |
|---|---|---|---|---|---|---|
|   | $k_m$ (Nm) | $F_0$ (N) | $k_m$ (Nm) | $F_0$ (N) | $k_m$ (Nm) | $F_0$ (N) |
| 1 | 3.6  | 777  | 2.1 | 430 | 1.4 | 144 |
| 2 | 5.7  | 473  | 3.3 | 265 | 1.8 | 84  |
| 3 | 12.5 | −134 | 7.3 | −80 | 2.9 | −47 |

The repulsive force acting between the two magnets is calculated by the equation (4). Therefore, in the arrangement of FIG. 1, the equation of motion when a weight ($m_1$) is placed on the upper magnet 4 is as follows:

$$m\ddot{z} + c\dot{z} - (k_m z^{-1} + F_0) + mg = F(t) \quad (10)$$

where (m) is the mass of the weight ($m_1$) plus the upper magnet ($m_2$), and (c) is a damping coefficient created by a phase shift. The fourth term is a gravity term, and F(t) is an external force. When a balance point of the magnet with the weight placed thereon is $Z_0$, $$-(k_m z_0^{-1} + F_0) + mg = 0 \quad (11)$$

Therefore, when the balance point is the origin, the equation of motion related to the amount of deflection ξ is as follows:

$$m[\$]\$\ddot{g}\ddot{z} + c\dot{\zeta} + k'_m \zeta = F(t) \quad (12)$$

where $$\zeta = z - z_0 \quad (13)$$

When $\zeta/z_0 \ll 1$, approximated as follows:

$$k_m z^{-1} \approx k_m z_0^{-1}(1-\zeta) = k_m z_0^{-1} - k'_m \zeta \quad (14)$$

$$\frac{k_m}{z} \approx \frac{k_m}{z_0}\left(1 - \frac{\zeta}{z_0}\right) = \frac{k_m}{z_0} - k'_m \zeta \quad (15)$$

$$k'_m = \frac{k_m}{z_0^2} = (mg - F_0)^2 k_m^{-1} \quad (16)$$

Here, the external force is calculated as follows, when forced to vibrate at angular frequency ω:

$$F(t) = F_0 e^{j\omega t} \quad (17)$$

At this time, when $$\zeta = A e^{j\omega t} \quad (18)$$

the amplitude A is given by the following equation:

$$A = \frac{F_0 \cdot e^{j(\omega t - \phi)}}{k'_m \sqrt{\left\{1 - \left(\frac{\omega}{\omega_0}\right)^2\right\}^2 + \left(2\gamma\frac{\omega}{\omega_0}\right)^2}} \quad (19)$$

In this equation, $$\gamma = c/2\sqrt{mk'_m} \quad (20)$$

is the damping ratio. φ is the phase angle expressed by the following equation:

$$\tan\phi = \frac{c\omega}{k'_m - m\omega^2} \quad (21)$$

Additionally, $\phi = \phi(k'_m)$. Because $k'_m$ fluctuates depending on the deflection amplitude, the phase angle also fluctuates depending on the amount of deflection.

When the natural frequency is $f_m$, $f_m$ is given by the following equation:

$$f_m = \frac{1}{2\pi}\sqrt{\frac{(mg - F_0)^2}{mk_m}} \quad (22)$$

the natural frequency is directly proportional to $$\sqrt{\frac{1}{k_m}}.$$

If an optimum load-deflection characteristic curve is set by adjusting the equilibrium point and the magnetic circuit, the resonance frequency can be nearly completely fixed, irrespective of the loaded mass. Alternatively, by combining with other spring constants or adjusting the locus of motion of a permanent magnet, the portion where the spring constant $k_m$ is large can be utilized to reduce the resonance frequency.

Figure 6:
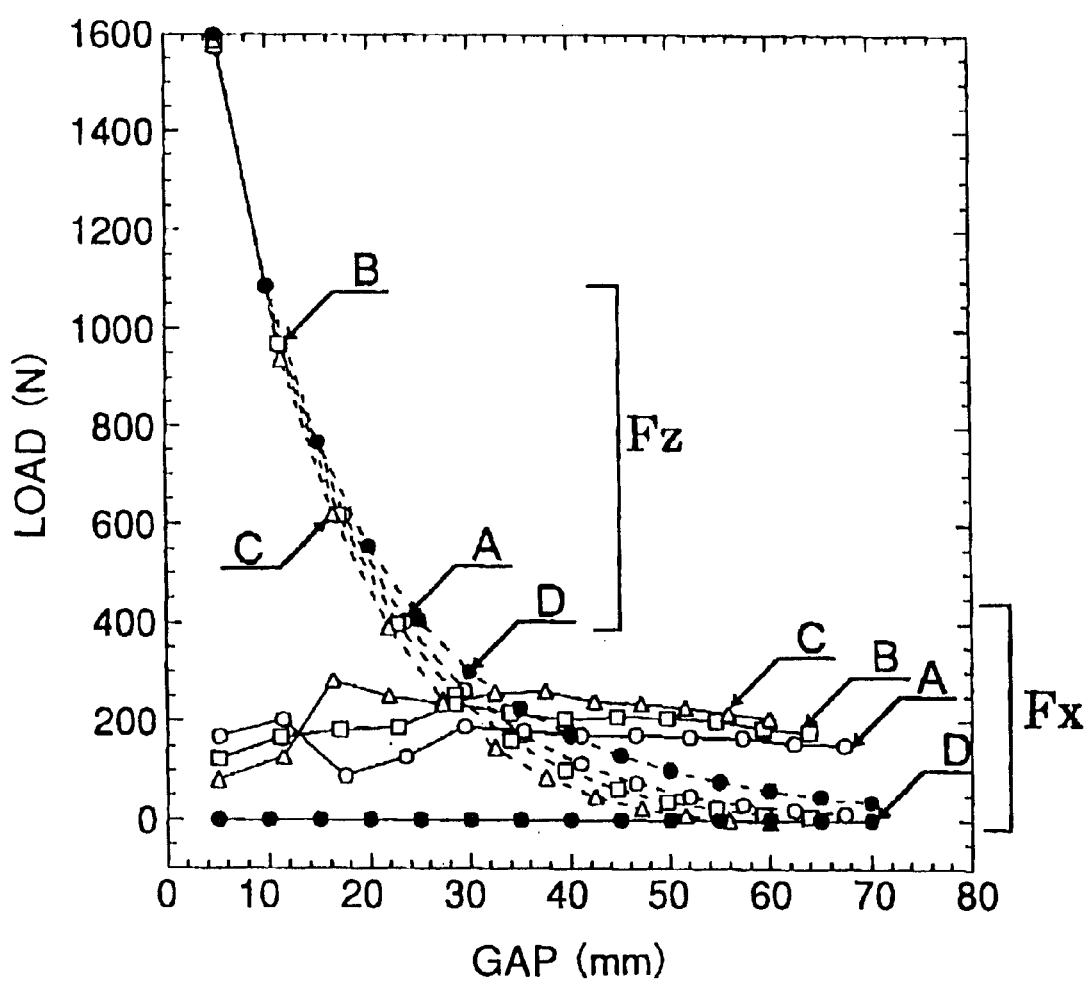
FIG. 6 is a graph depicting a relationship between the load of the magnets A (FIG. 4) and the gap between the magnets when the locus of motion has been changed, as shown in FIG. 7.
Figure 7:
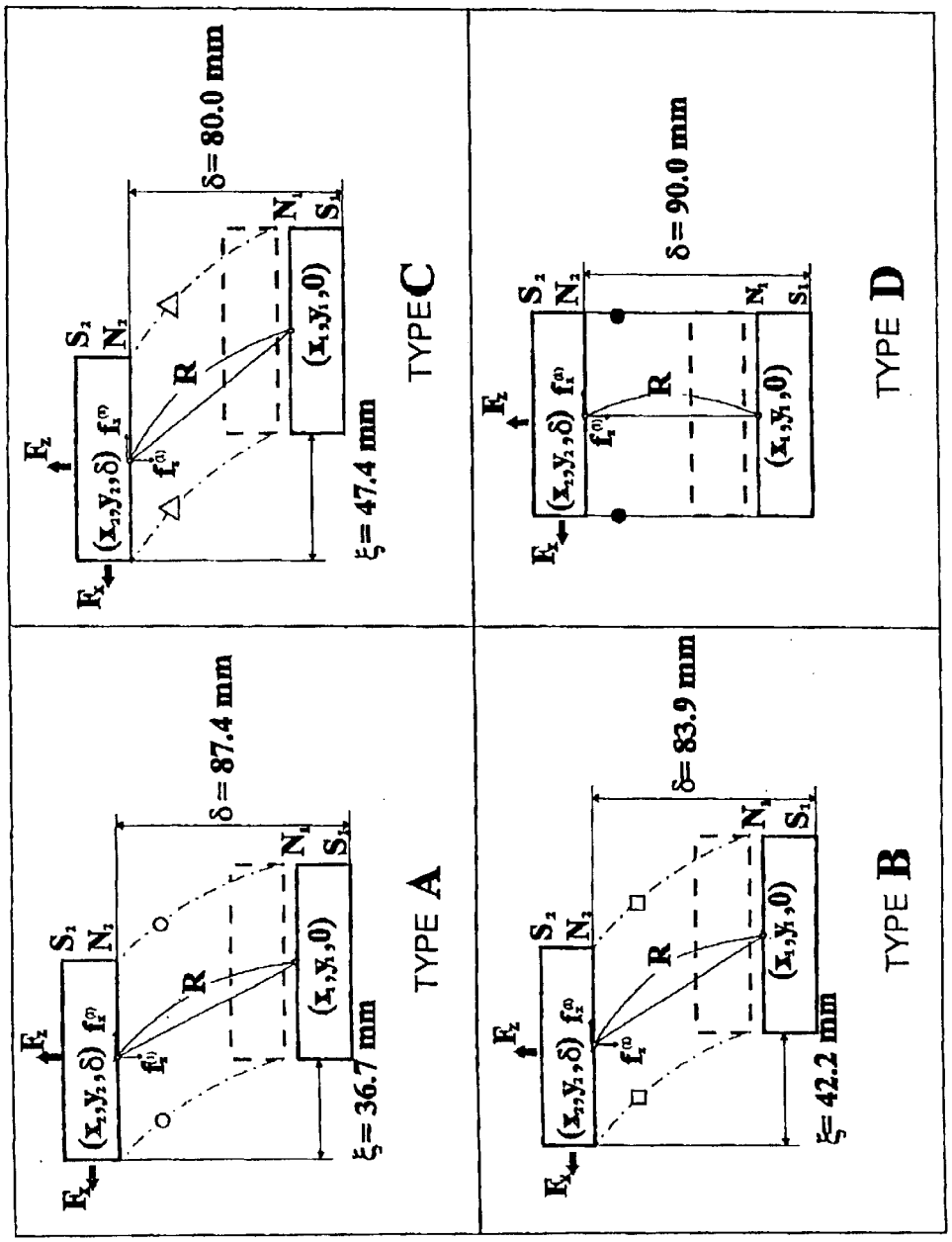
FIG. 7 is a schematic view depicting various loci of motion of one of the magnets relative to the other.
Figure 8:
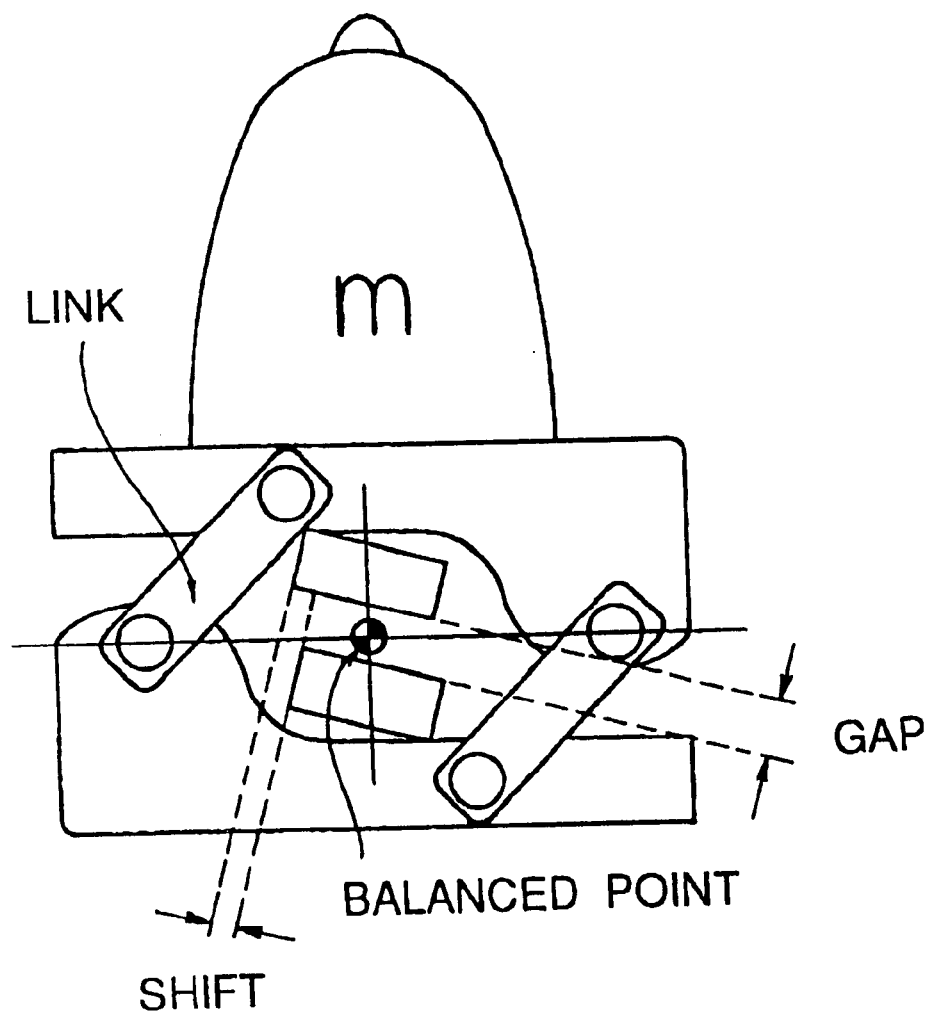
FIG. 8 is a schematic view of a vibration mechanism when the direction in which the maximum repulsive force acts is inclined 15° with respect to the vertical vibration direction, wherein the locus of motion of Type A shown in FIG. 7 is employed.
Figure 9:
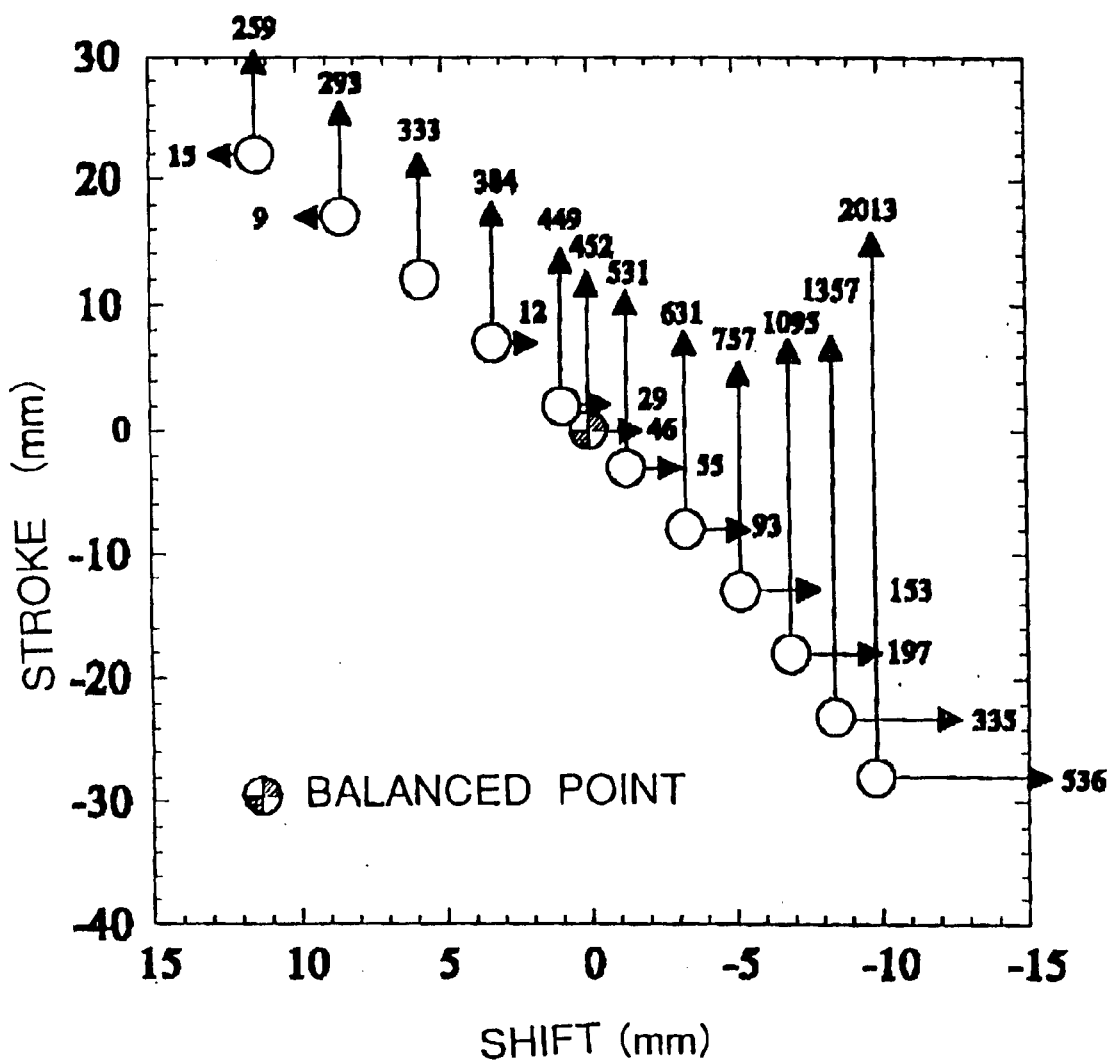
FIG. 9 is a graph depicting the repulsive force of the permanent magnets in the vibration mechanism of FIG. 8.

FIG. 6 shows results of calculation of a load-gap relationship when the locus of motion has been changed, as shown in FIG. 7. The magnet A in FIG. 4 was used. As shown in FIG. 8, the magnets were inclined 15° with respect to the horizontal direction so that the direction in which the maximum repulsive force acts forms an angle of 15° with respect to the vertical direction. The repulsive force in that case is shown in FIG. 9. Fz indicates the repulsive force perpendicular to the faced magnet area, and Fx indicates the horizontal repulsive force, which is in turn converted into either an upward or downward force through the links. By balancing these repulsive forces, the loaded mass, and the strength of metal springs at the point of equilibrium, such non-linear load-deflection characteristics can be provided that the spring constant is low around the point of equilibrium, and when a stroke of 30 mm is caused upon receipt of an input acceleration, a force of approximately 100~150 kg is abruptly created. In other words, in response to input deflection excitation, such characteristics take on an aspect as if an external force has been input, and the magnets assume the role of an actuator.

Figure 10:
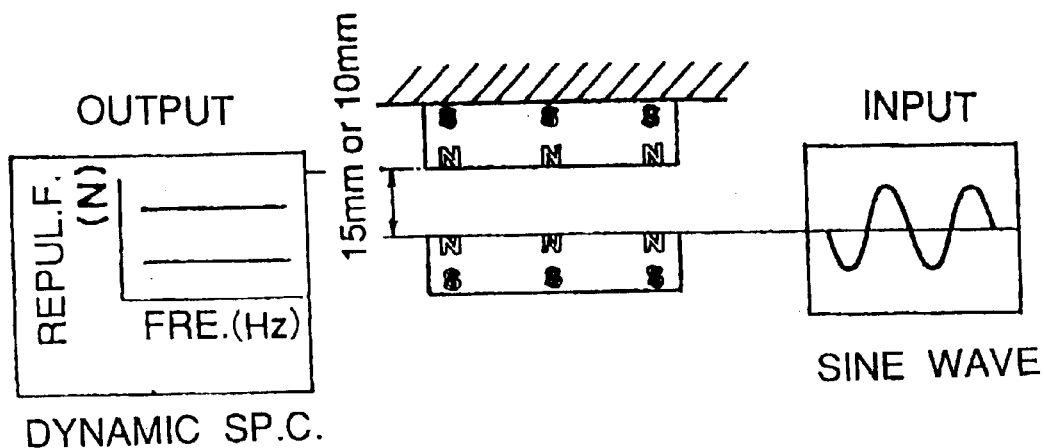
FIG. 10 is a schematic view of an experimental model explanatory of the dynamic magneto-spring characteristics.

Experiments to find out the dynamic spring constant of a magneto-spring composed of two opposing or faced two-pole magnets were carried out with an arrangement and test conditions of FIG. 10 using magnets of s=75×75 mm² and h=20 mm. In a magneto-spring system that uses a magnetic circuit comprising two-pole rare-earth magnets, the dynamic spring constant is controlled by combining the attractive forces and the repulsive forces that vary depending on the loci of the magnets. During simulation, the magnetic field was calculated using a charge model. Although the vector quantity should be used for this calculation, because the magneto-spring was used in a region where the distance between the magnets is small, the magnetization vector was considered to be parallel to the Z axis, and the load-deflection characteristics were found.

Figure 12:
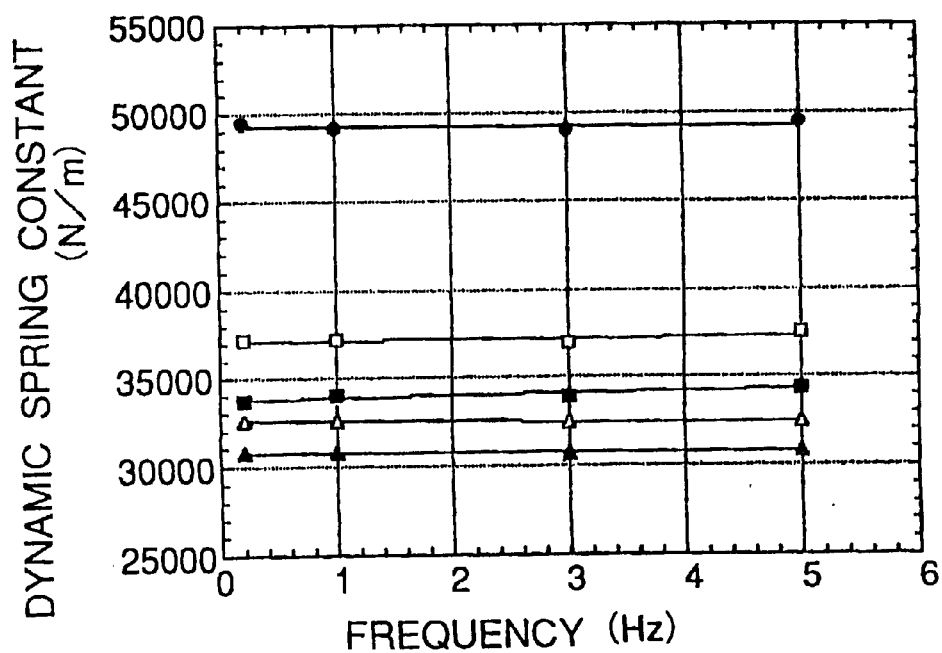
FIG. 12 is a graph depicting dynamic spring constants obtained by excitation shown in FIG. 11.

As shown in FIGS. 11A and 11B, the magnets were disposed such that the opposing area thereof is maximized at a magnet distance of 0 mm, and the point of equilibrium is at a magnet distance of 15 mm apart. When one of the magnets was oscillated with a sine wave having an amplitude of 3 mm, the dynamic spring constants were obtained for each locus of motion and for each arrangement of the magnets. As can be seen from FIG. 12, the locus of motion of the magnets changes the dynamic spring constant. In FIG. 12, ●□▲ (●■▲) indicate the measured values when the magnets were inclined at angles of 0, 30, and 45 degrees, respectively, and ●□▲ correspond to the arrangement of FIG. 11A, while ●■▲ correspond to the arrangement of FIG. 11B.

Figure 14:
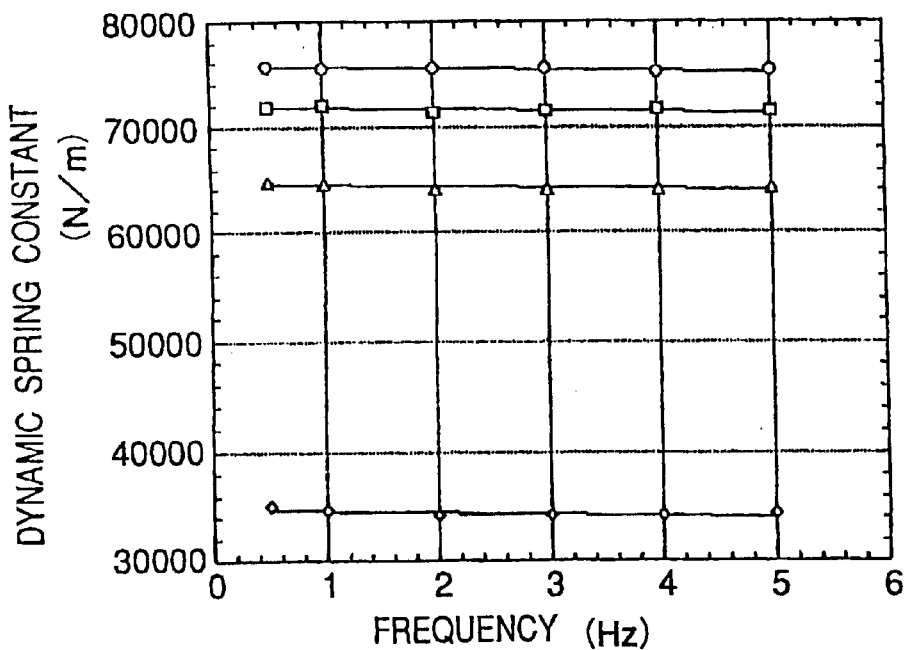
FIG. 14 is a graph depicting the dynamic spring constants obtained by excitation shown in FIG. 13.

As shown in FIG. 13, when the magnets were disposed such that the point of equilibrium is at a magnet distance of 10 mm at which the opposing area thereof is maximized and when one of the magnets was oscillated with a sine wave having an amplitude of 3 mm, the dynamic spring constants as shown in FIG. 14 were obtained. In FIG. 14, ○□△◇ indicate the measured values when the magnets were inclined at angles of 0, 10, 20, and 30 degrees, respectively. The reason for an abrupt change in spring constant when the angle was changed to 30° is that the spring constant is greatly influenced by an attractive force acting between the two magnets.

Figure 16:
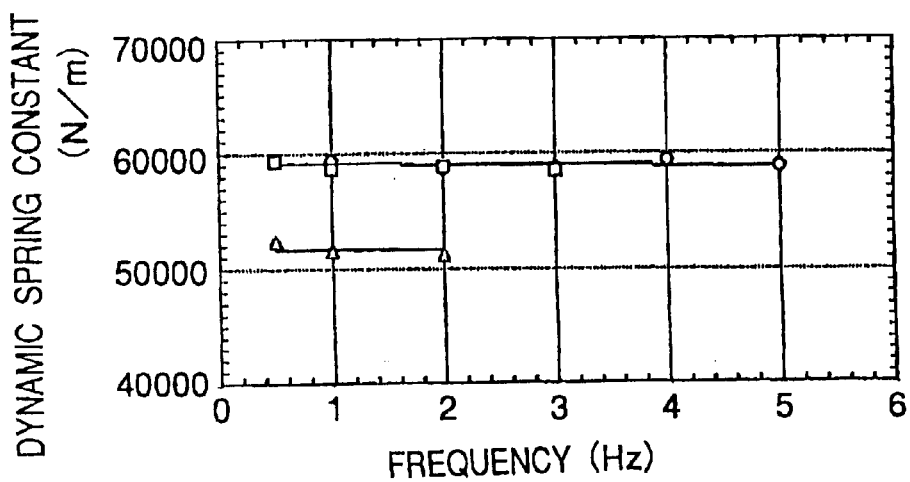
FIG. 16 is a graph depicting the dynamic spring constants obtained by excitation shown in FIG. 15.

Furthermore, as shown in FIG. 15, when the magnets were disposed such that the point of equilibrium is at a magnet distance of 10 mm at which the opposing area thereof is maximized and when one of the magnets was oscillated in a range above the point of equilibrium with the angle of inclination kept constant ($\theta=10°$), the dynamic spring constant changed as shown in FIG. 16, in which ○□△ indicate the measured values when the length of movement was 3 mm, 5 mm, and 7 mm, respectively. The reason why there are no measured values at several points is that at those points, the exciting conditions exceeded the capacity of a measuring instrument, in preparing this graph, the dynamic spring constant was changed by different amplitudes within the same locus using the curvature of the non-linear load-deflection characteristics.

Figure 17:
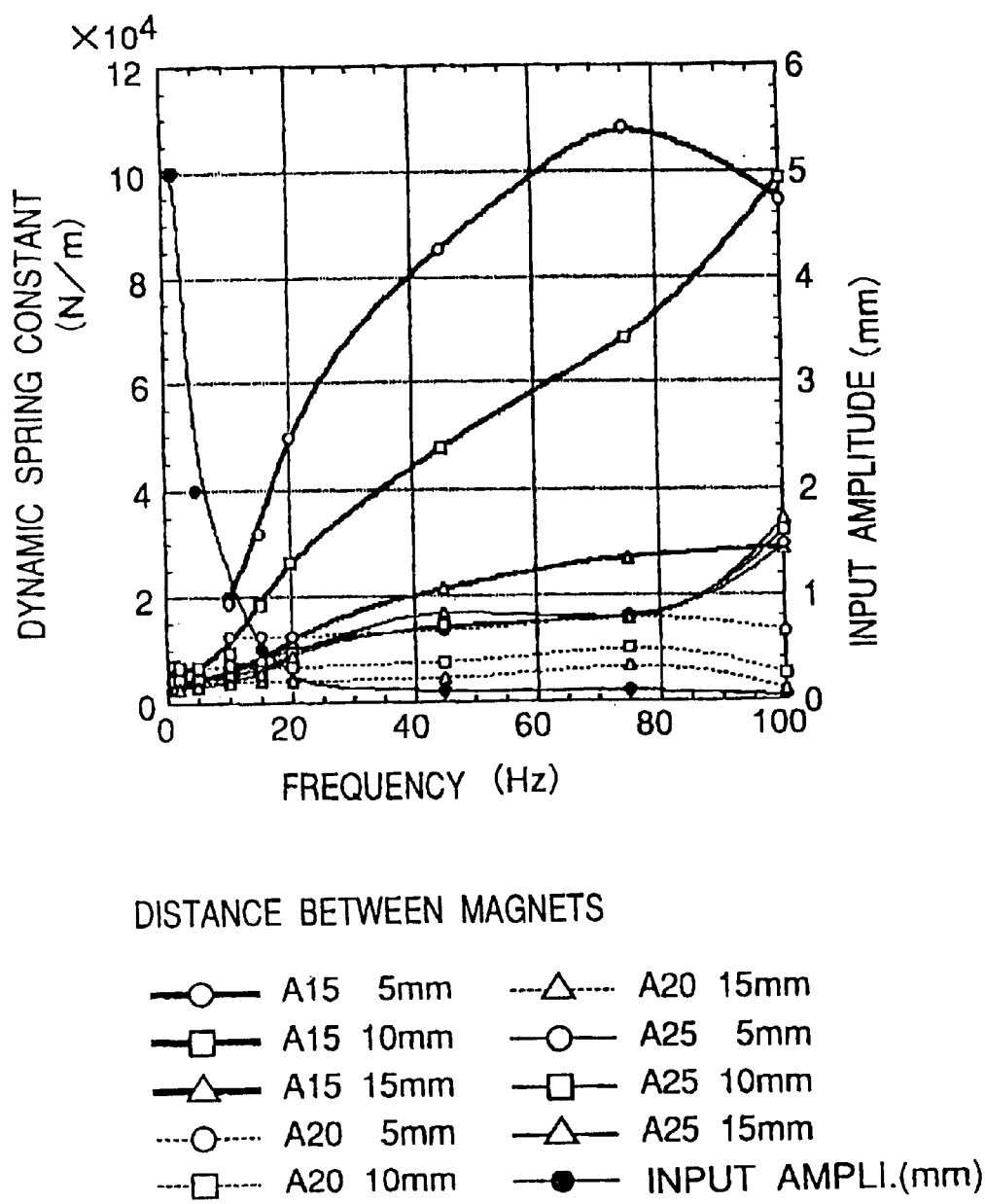
FIG. 17 is a graph depicting the dynamic spring constants of various magneto-springs made up of two-pole magnets when the input deflection amplitude has been changed.
Figure 18:
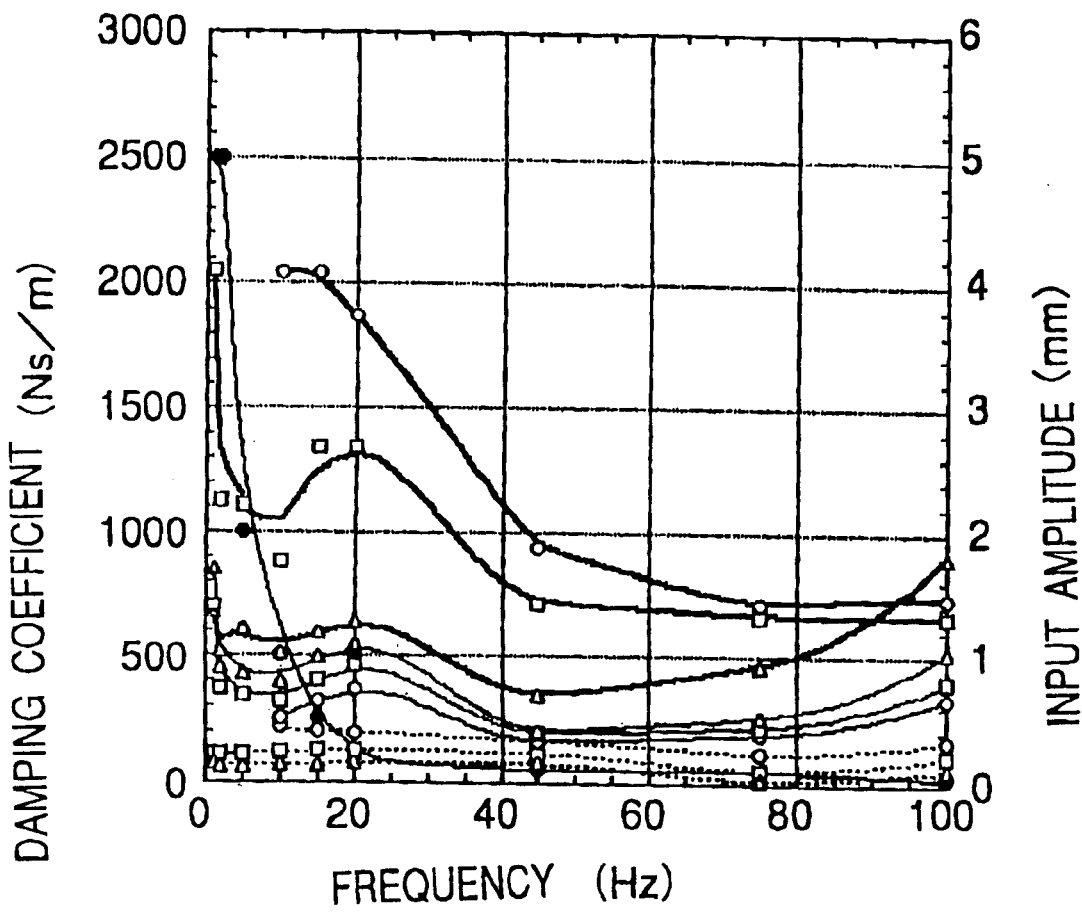
FIG. 18 is a graph depicting the damping coefficients of various magneto-springs made up of two-pole magnets when the input deflection amplitude has been changed.

FIGS. 17 and 18 show the dynamic spring constant and damping coefficient of the magneto-springs, respectively, when a magneto-spring system composed of two-pole magnets with an opposing area of 75×75 mm$^2$ and a thickness of 15 mm (A15), 20 mm (A20), or 25 mm (A25) was moved vertically at various frequencies and at different input deflection amplitudes. While they are affected by the frequency, the dynamic spring constant and damping coefficient are dependent on the size of the magnets and the distance between them. In other words, the dynamic spring constant and damping coefficient can be controlled by controlling the size of the magnets and the distance between them. By utilizing these various characteristics, the resonance frequency will fluctuate due to differences in input acceleration amplitude, and a transfer function with a constant output acceleration amplitude can be made, making it possible to realize various types of passive control.

The vibration characteristics of a non-linear model having a magneto spring are explained hereinafter.

Figure 19:
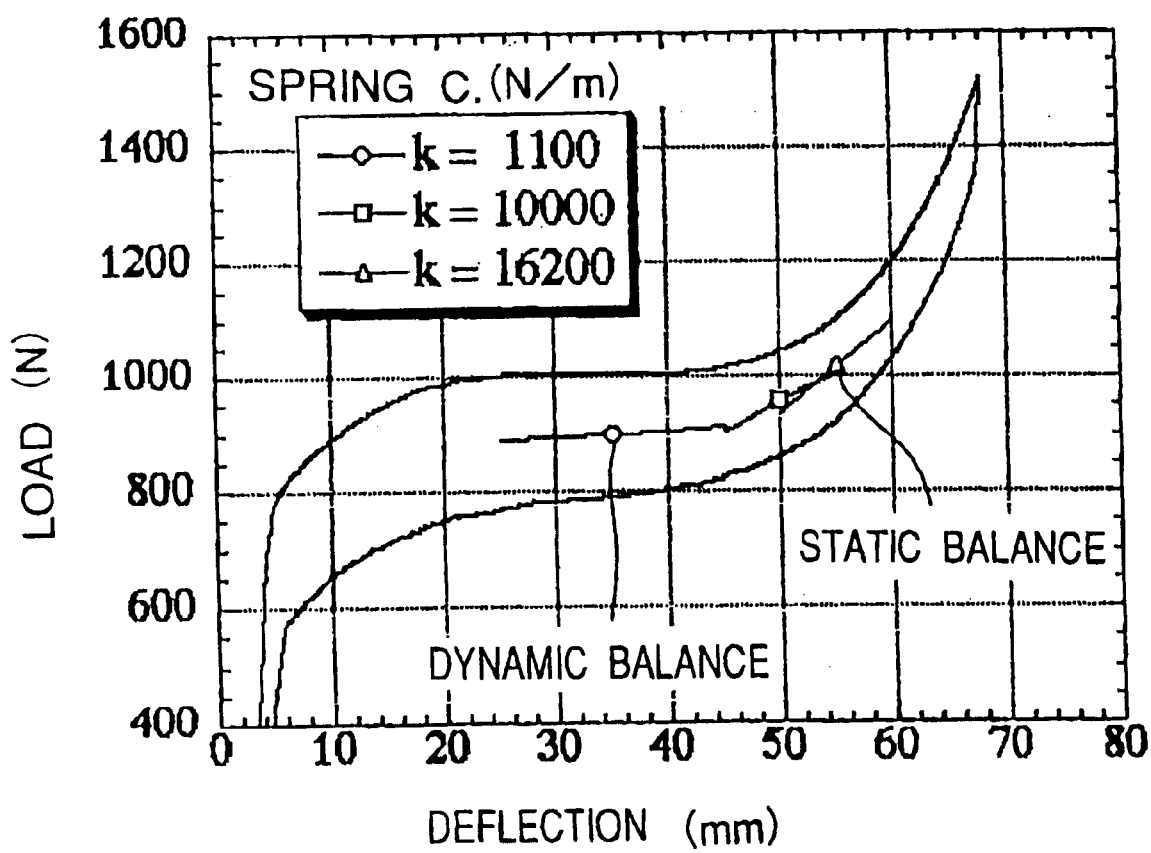
FIG. 19 is a graph depicting the load-deflection characteristics of a single-degree-of-freedom, non-linear model obtained by combining metal springs and a magneto-spring.

The long-stroke characteristics that are provided by the locus of motion shown in FIG. 11 and by the two-pole magnets (A15) shown in FIGS. 17 and 18, having an opposing area of 75×75 mm$^2$ and a thickness of 15 mm, and spaced 10~15 mm from each other were created using metallic springs and a magneto-spring (A20) having an opposing area of 75×75 mm$^2$ and a thickness of 20 mm. The static characteristics in the proximity of the equilibrium point (point Δ in FIG. 19) were equivalent to those of A15. Then, analysis and testing were done with a single-degree-of-freedom, non-linear model of the magneto-spring shown in FIG. 20. This model had load-deflection characteristics shown in FIG. 20. The reason the magnet was changed from A15 to A20 was to create a vibration model that could withstand a large-stroke input and a large-acceleration input by changing the equilibrium point to a point where the distance between the magnets is enlarged.

Figure 20:
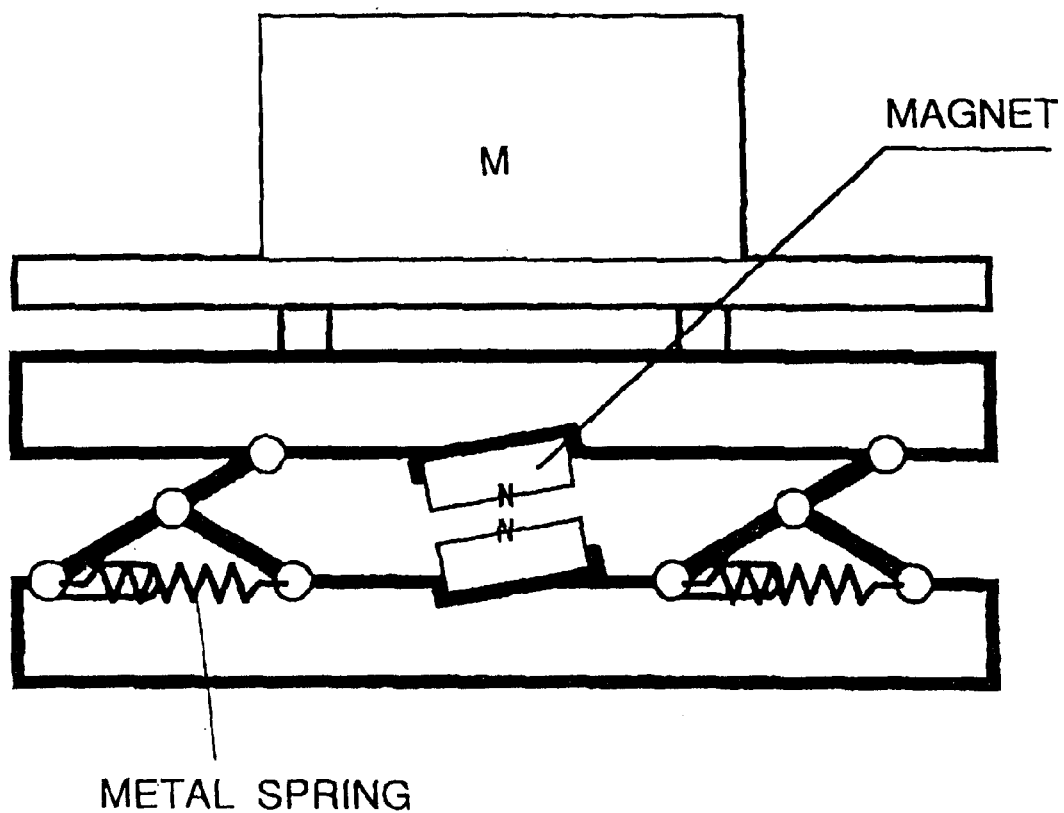
FIG. 20 is a schematic view of the single-degree-of-freedom, non-linear model having the load-deflection characteristics of FIG. 19.
Figure 21:
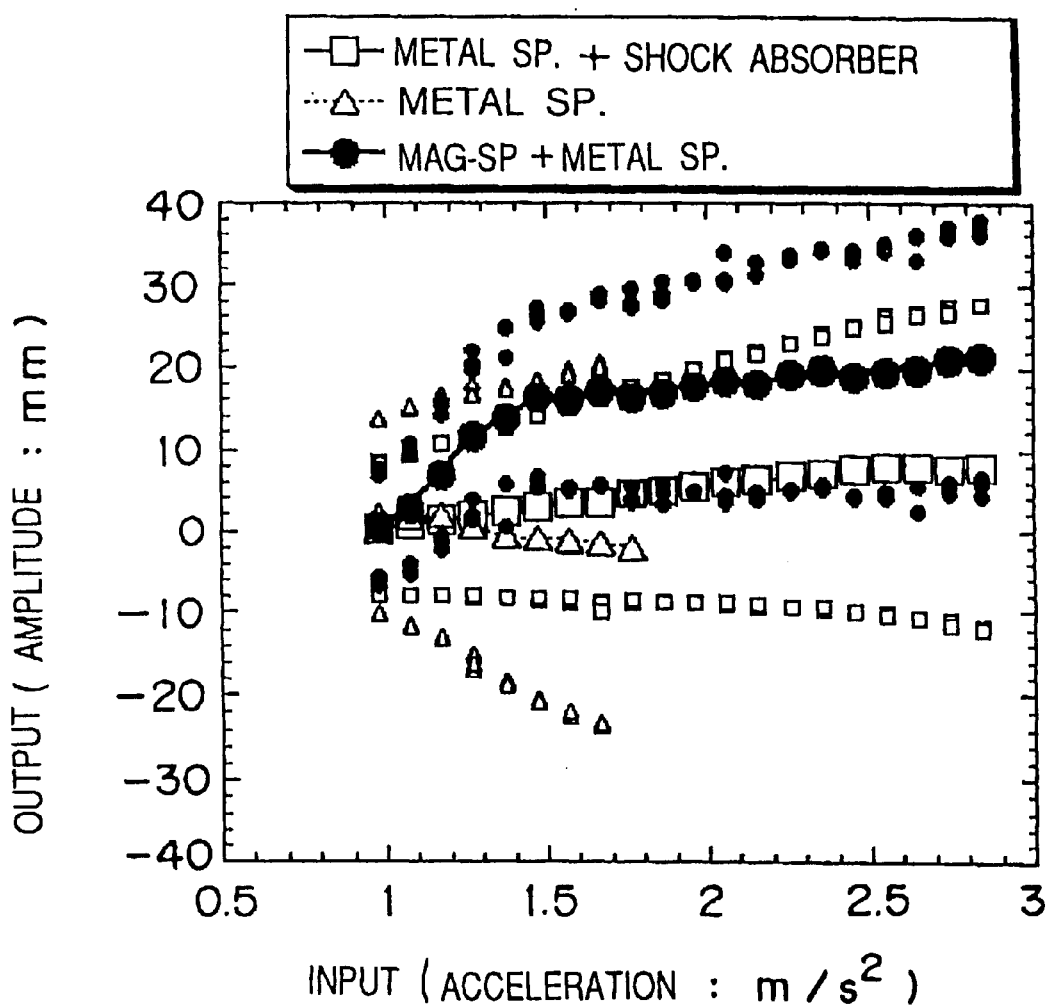
FIG. 21 is a graph depicting the behavior of the balanced point of the single-degree-of-freedom, non-linear model of FIG. 20.

As shown in FIG. 21, the special traits of the single-degree-of-freedom, non-linear model of the magneto-spring are that the equilibrium point shifts in response to the acceleration of input vibration, and the dynamic spring constant and damping coefficient fluctuate. FIG. 21 depicts the behavior of the equilibrium point of the single-degree-of-freedom model of FIG. 20 under varying acceleration of 2 Hz-excitation frequency. The spring constant of approximately 0 N/mm at these two equilibrium points and the vibration equilibrium point, along with the non-linear magneto spring force, revives the input vibration energy, imparts acceleration in the direction opposite to gravity, and creates a state in which gravity is counteracted (hereinafter referred to as "anti-gravity state"), thus providing a riding comfort that is unique to the magneto-spring.

Figure 22:
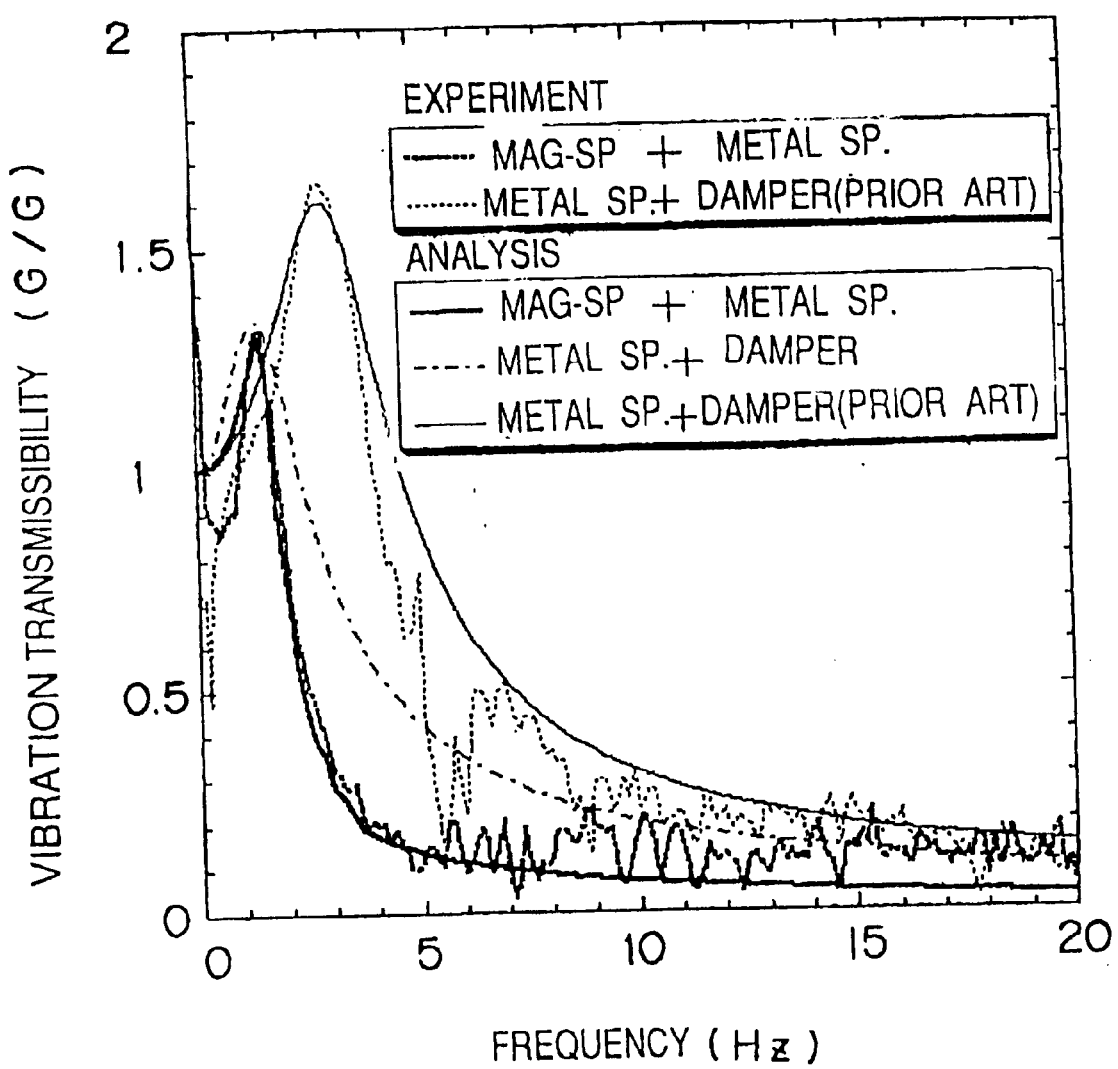
FIG. 22 is a graph depicting experimental results and analytical results of the vibration transmissibility when non-linear models and linear models have been excited with random waves.

FIG. 22 depicts the vibration characteristics and simulation results of an experiment in which a one-degree-of-freedom non-linear model of the magneto-spring and a linear model comprising metal springs and shock absorbers were each loaded with a 90 kg mass, and then excited by random waves that simulated the acceleration at the floor of a one-box type vehicle traveling over the highway (Japan) at a speed of 80 km/hr. The results of this simulation very closely duplicate the actual measurements that were taken. Furthermore, it has the same resonance point as the non-linear model of the magneto-spring. FIG. 22 also depicts the simulation results of a linear model, in which the spring constant and damping coefficient do not fluctuate.

When comparing a magneto-spring non-linear model, a linear model employed in a typical suspension seat composed of metal springs and shock absorbers, and a linear model having the same resonance point as the magneto-spring non-linear model wherein the spring constant does not fluctuate, a significant effectiveness in vibration energy reduction can be seen in the region above 2 Hz, where resonance with the human body is created (see FIG. 22).

Figure 23:
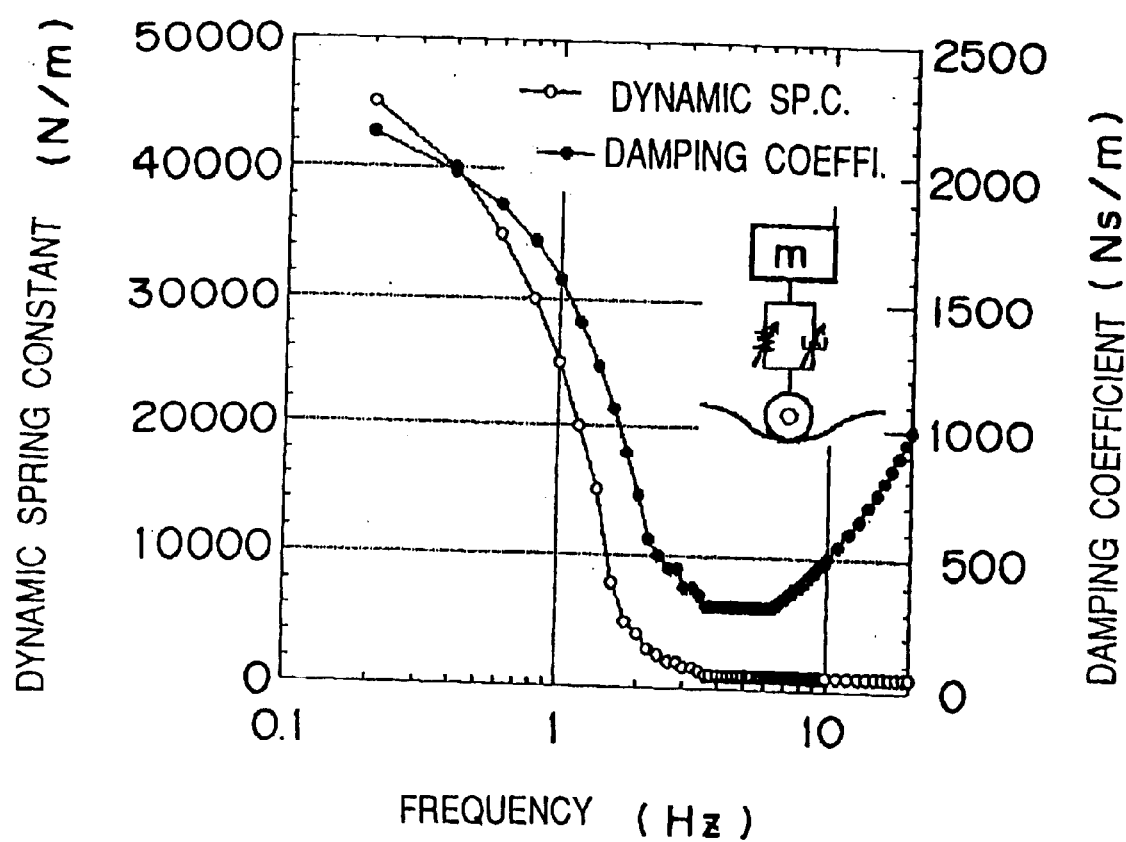
FIG. 23 is a graph depicting parameters and an analytical model of the non-linear model having a magneto-spring.

FIG. 23 depicts an analysis model of the magneto-spring non-linear model and parameters. The parameters were determined based on the experimental results of the dynamic characteristics derived by a fatigue durability machine and on the load-deflection characteristics of the magneto-spring.

Figure 24:
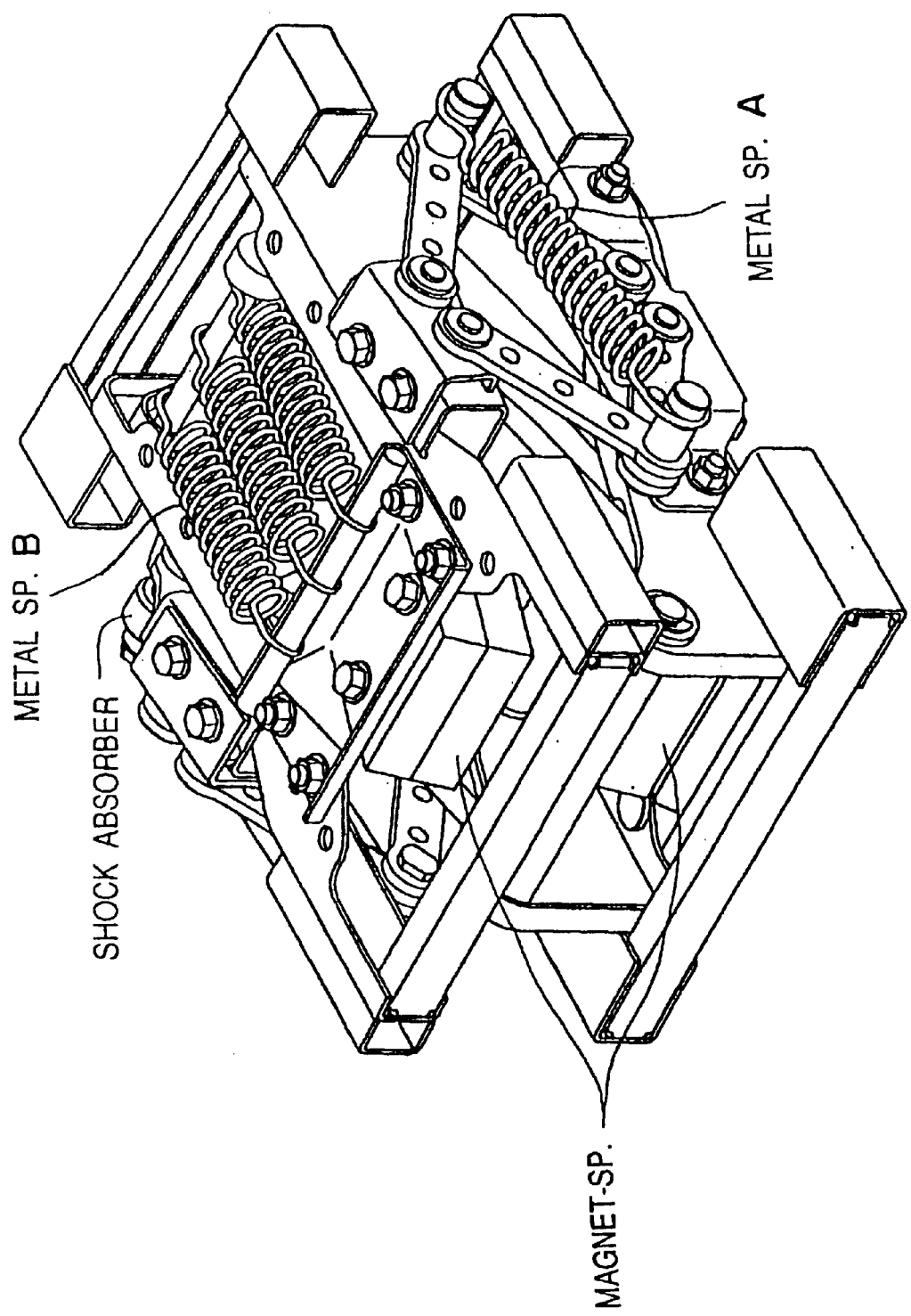
FIG. 24 is a perspective view of a suspension seat (VSUM seat) employing a magneto-spring.

FIG. 24 depicts a vertical suspension using a magneto-spring (hereinafter referred to as VSUM). The VSUM supports the human body and a seat and comprises metal springs and a magneto-spring that continue small vibrations, and a bottoming and topping buffer. The magneto-spring includes a pair of inclined permanent magnets secured respectively to a lower frame and an upper frame vertically movably mounted on the lower frame via pantograph-type link mechanisms disposed on respective sides of the VSUM, while the metal springs include a metal spring A connected at opposite ends thereof to one of the pantograph-type link mechanisms and a plurality of metal springs B connected to a portion of the upper frame. The bottoming and topping buffer include a shock absorber connected at opposite ends thereof to the other pantograph-type link mechanism. It has been proposed that evaluation of the dynamic performance of the suspension seat would be done based on the isolation characteristics under random excitation and on the performance of the bottoming buffer. For that reason, the VSUM seat is designed using two separate mechanical elements exhibiting vibration-isolation performance and shock-absorbing performance, respectively.

Figure 25:
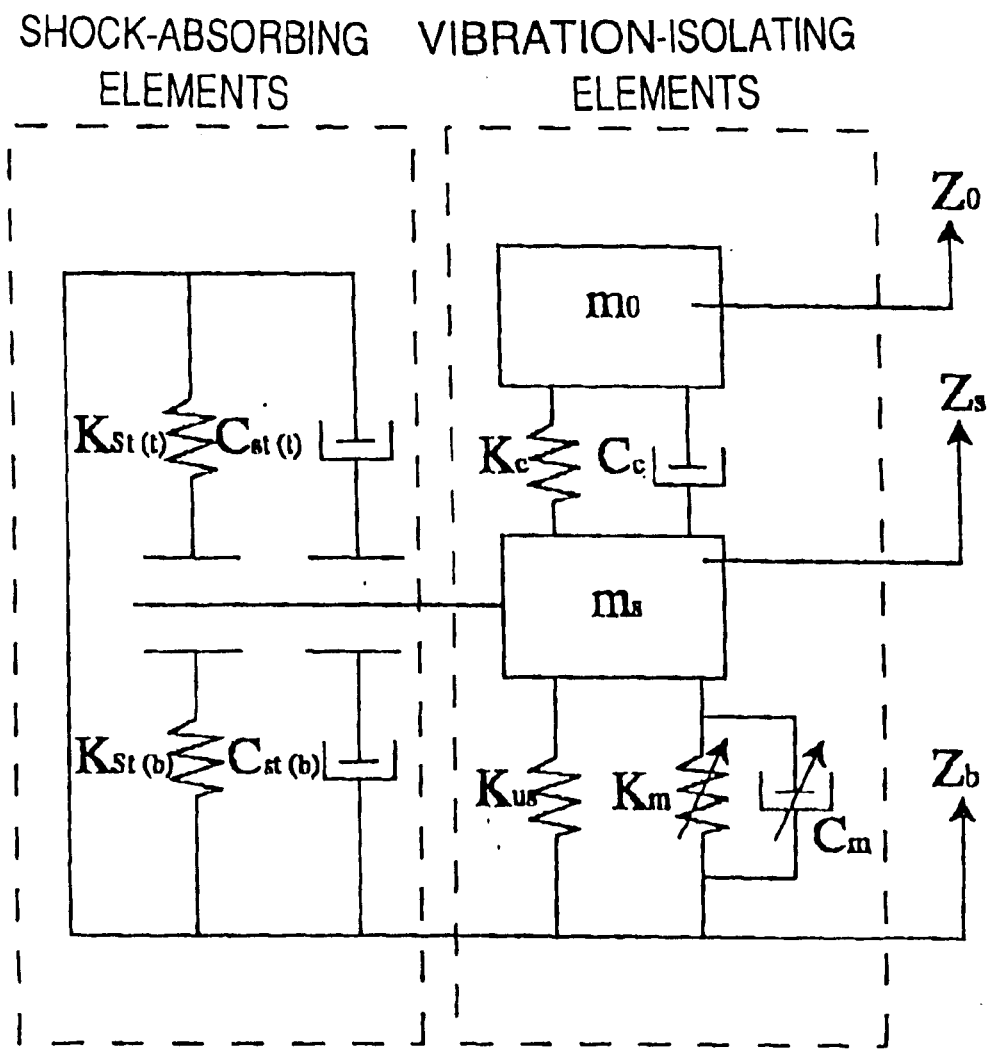
FIG. 25 is a schematic view of a vibration riding-comfort analysis model for the VSUM seat.

The equations derived from the vibration riding-comfort analysis model for the VSUM seat shown in FIG. 25 are shown below:

$$m_o \ddot{z}_0 + C_c(\dot{z}_0 - \dot{z}_s) + K_c(z_0 - z_s) = 0 \quad (23)$$

$$m_s \ddot{z}_s + C_c(\dot{z}_s - \dot{z}_0) + C_m(\dot{z}_s - \dot{z}_b) + K_c(z_s - z_0) + K_m(z_s - z_b) + K_{us}(z_s - z_b) = 0 \quad (24)$$

mo: mass of seat occupant (kg)
ms: mass of suspension seat (kg)
Kc: spring constant of cushion springs ($Nm^{-1}$)
Cc: damping coefficient of cushion ($Nm^{-1}s$)
Cm: damping coefficient of magneto-spring
Kus: spring constant of suspension ($Nm^{-1}$)
Km: spring constant of magneto-spring ($Nm^{-1}$)
Zo: amount of deflection of seat occupant (m)
Zb: amount of deflection of suspension lower frame (m)
Zs: amount of deflection of suspension upper frame (m)
Kst(t): spring constant of top end-stop buffer ($Nm^{-1}$)
Kst(b): spring constant of bottom end-stop buffer ($Nm^{-1}$)
Cst(t): damping coefficient of shock absorber on top end-stop side ($Nm^{-1}s$)
Cst(b): damping coefficient of shock absorber on bottom end-stop side (Nm–1s)

The characteristics of the VSUM seat are created using the static characteristics of the magneto-spring shown in FIGS. 6, 7, 8, 9, and 19, while the amount of deflection amplitude of the load-deflection characteristics is maintained at a lower level.

Figure 26:
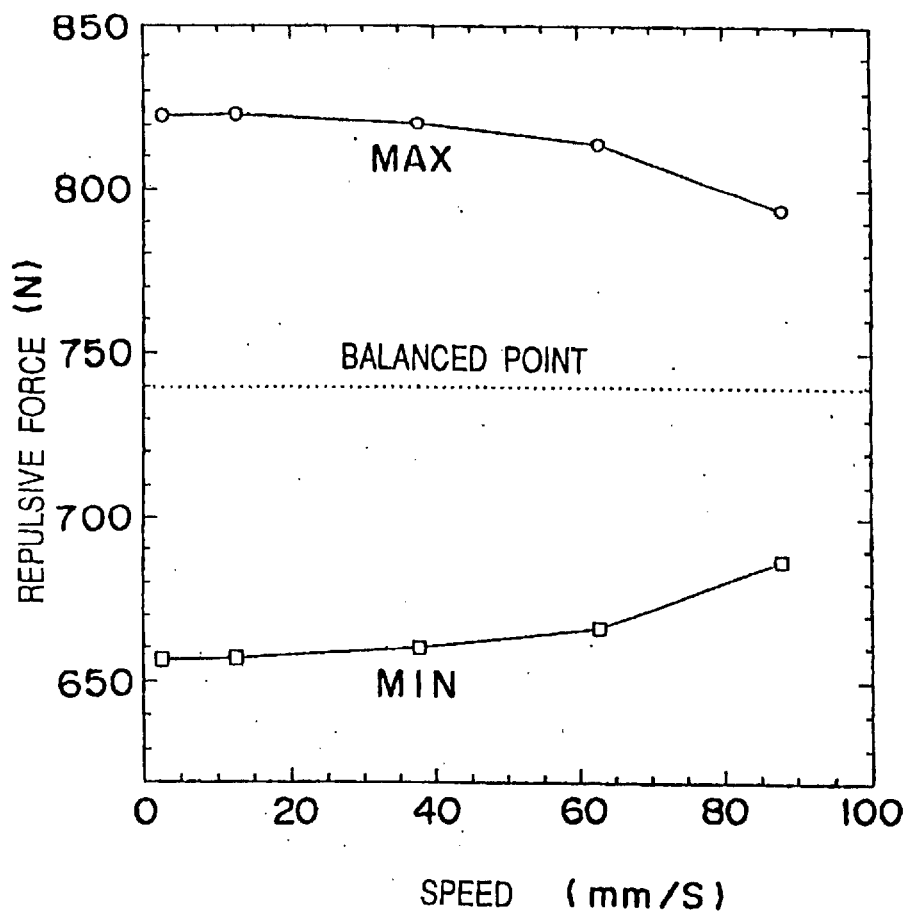
FIG. 26 is a graph depicting the repulsive force when the VSUM seat has been excited with a sine wave having a constant amplitude.
Figure 27:
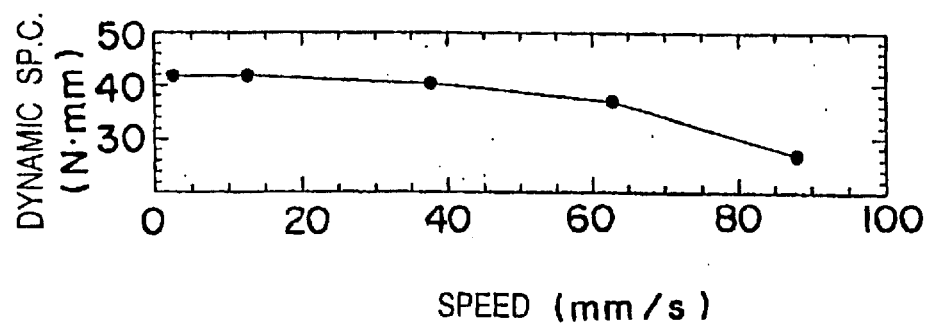
FIG. 27 is a graph depicting the dynamic repulsive force when the VSUM seat has been excited with a sine wave having a constant amplitude.

A magneto-spring system comprising rare-earth magnets differs from ferrite magnets in that because the magnet itself is also a conductor, eddy currents are produced due to electromagnetic induction, thereby causing a braking force to act in the direction in which the movement of the magnet is restricted. In addition, the magnetic field gradient and magnetic flux density also fluctuate. Also, the magnetic flux density decreases due to heat generation by the eddy currents. When the approach speed of the faced magnets is fast, the magnetic flux density and the magnetic field gradient are changed by the eddy currents, resulting in a smaller dynamic spring constant. The VSUM magneto-spring comprises permanent magnets with an opposing area of 75×75 $mm^2$ and a thickness of 20 mm. In this VSUM, the distance between the magnets is 15 mm. If excited with a sine wave of constant 2 mm amplitude, the resulting repulsive forces and dynamic spring constant of this experiment are shown in FIGS. 26 and 27. With the frequency fluctuating from 0.2 Hz to 7 Hz, the dynamic magneto-spring constant fluctuates from 41653 N/mm to 26768 N/mm.

Figure 28:
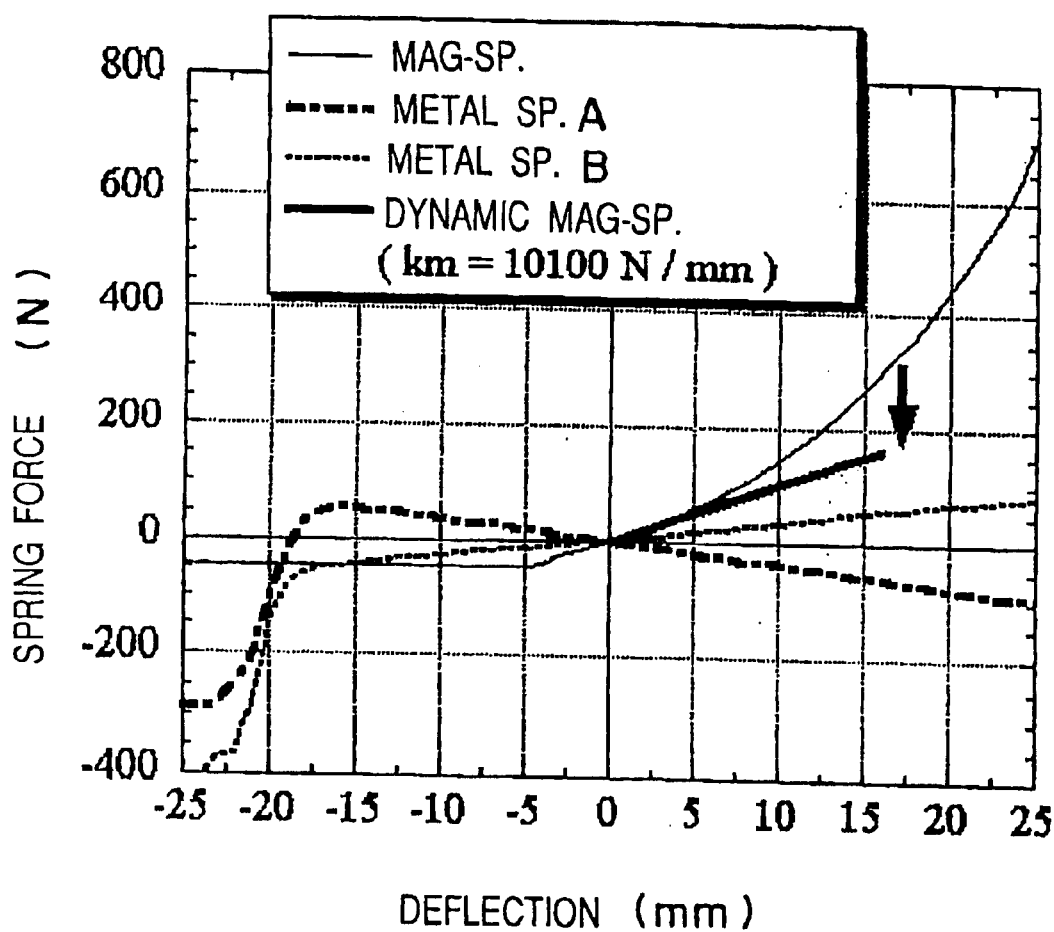
FIG. 28 is a graph depicting the spring force-deflection characteristics of a spring system constituting the VSUM seat.
Figure 29:
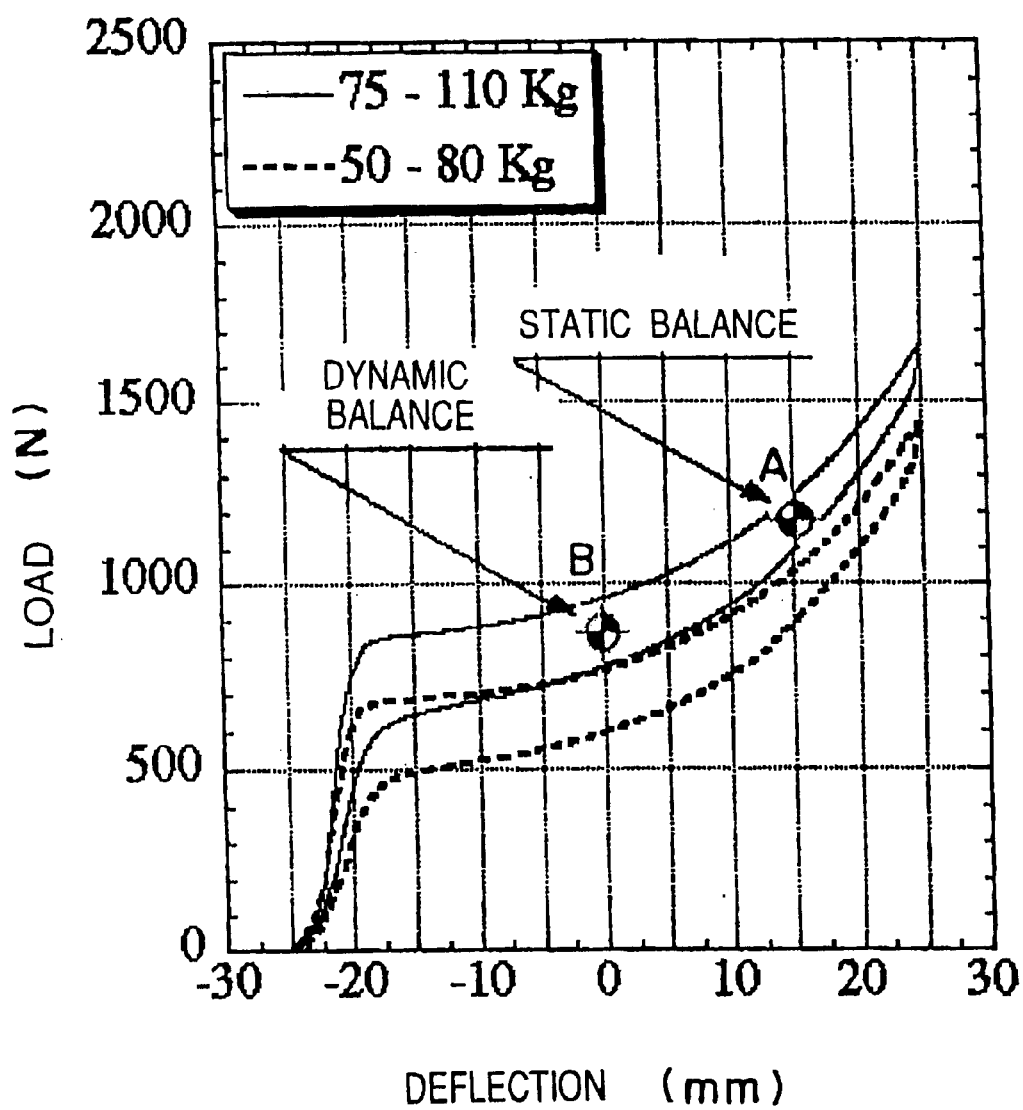
FIG. 29 is a graph depicting the load-deflection characteristics when spring forces in the VSUM seat have been combined.

FIG. 28 shows the characteristics of a spring system constituting the VSUM, and FIG. 29 shows the load-deflection characteristics obtained by combining all spring forces. The magneto-spring is made up of two-pole magnets having a size of s=75×75 $mm^2$ and h=20 mm. The VSUM is required to accommodate the range of 1.5 times the loaded mass within a stroke range of the load-deflection characteristics. By utilizing the non-linearity of the magneto-spring, no adjustment to the loaded mass is required in a mass range of 20 to 30 kg. The metal spring A is employed for the purpose of creating a negative spring constant at the equilibrium point. The metal springs B are used to make adjustments for the loaded mass. The magneto-spring creates a non-linear damping coefficient through phase shifts by utilizing the dynamic spring characteristics that are dependent on amplitude, the non-linear spring force that withstands input, and the small spring constant of a combination spring.

Figure 30:
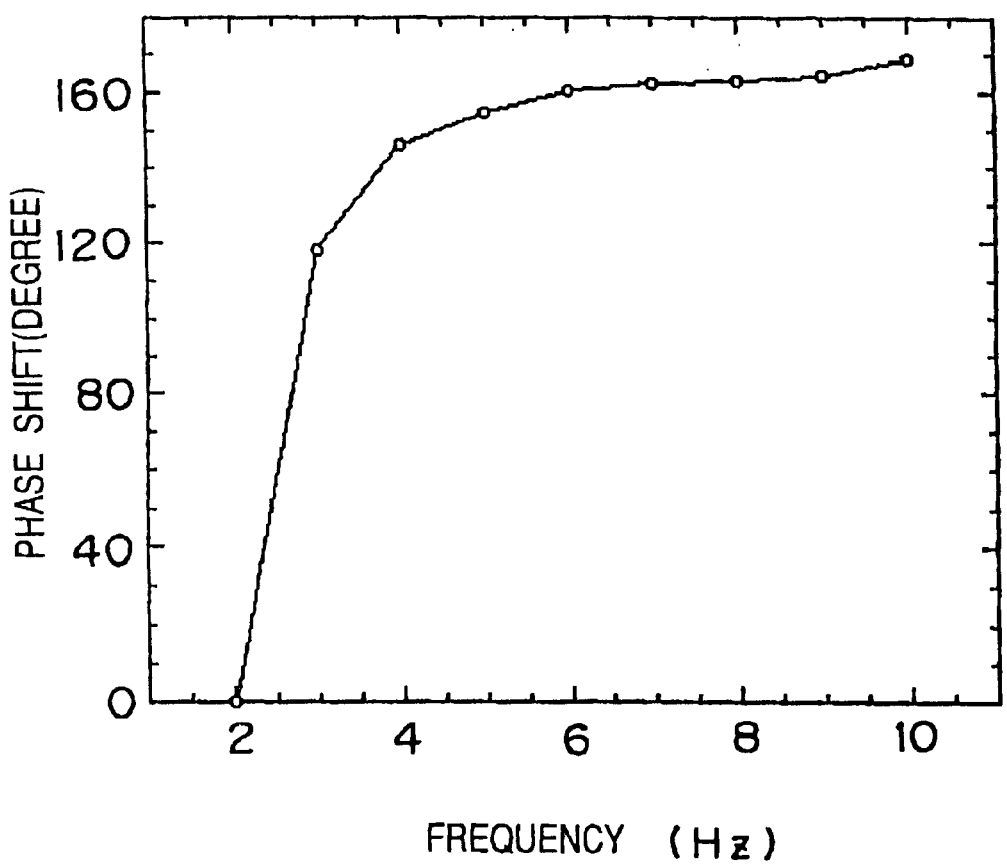
FIG. 30 is a graph depicting the amount of phase shift in the VSUM seat analyzed from excitation experiments.

FIG. 30 is the result of a VSUM phase shift analysis from an experiment in which the VSUM was excited in a range of 2~10 Hz by a sine wave with a deflection amplitude of 3 mm. The VSUM is a mechanism in which the phase shift lags by up to nearly 160° close to the opposite phase at 4 Hz, and vibration energy is attenuated by the phase shifts.

Figure 31A:
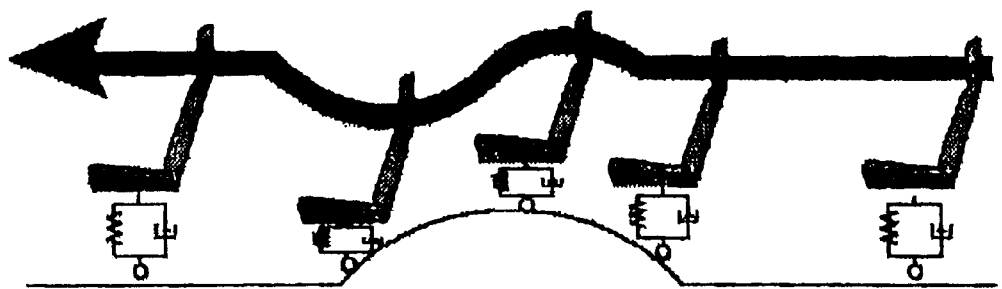
FIG. 31A is a schematic view depicting the behavior of the VSUM seat.
Figure 31B:
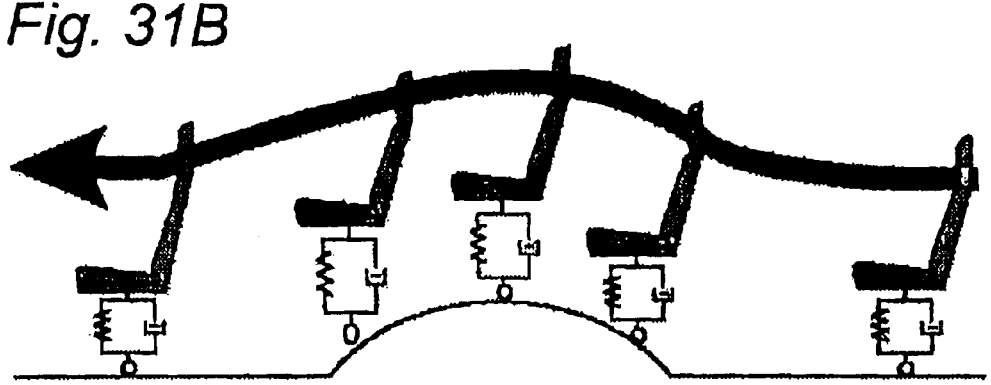
FIG. 31B is a view similar to FIG. 31A, but depicting the behavior of a conventional suspension seat.

When a person weighing 90 kg sits on a VSUM seat that is at a standstill, the person's body mass and the suspension seat's mass are added together, and achieve equilibrium at point A shown in FIG. 29. As shown in FIG. 21, when a deflection excitation over 1.5 $m/s^2$ occurs at 2 Hz in the VSUM seat, the equilibrium point shifts from point A to point B, which in turn becomes a new equilibrium point and at which the vibration is centered. This is due to the fact that the magnetic circuit with a non-linear load-deflection characteristic causes input vibration to be revived, amplified, and transmitted mainly in the upward direction, thus the VSUM seat enters into an 'anti-gravity' state. The new equilibrium point B has a smaller spring constant than equilibrium point A, and the VSUM seat's resonance frequency is also lower than the resonance frequency of static equilibrium point A. If a large forced deflection is applied at equilibrium point B (which is in a state of very small vibration, has a small spring constant, and is unstable under deflection excitation), the new deflection excitation force will cause the VSUM seat to undergo a large relative deflection. The loaded mass and the shock absorber curb that relative deflection (deflection in the direction opposing gravity). If deflection occurs in the direction of gravity, it is repelled by the magnetic field's gradient. When the relative velocity is high, the dynamic spring constant becomes smaller, and the relative deflection amplitude, as well as the damping by phase shifts, becomes larger. For that reason, when the input deflection excitation is large (e.g., over very bad road conditions), those effects are further increased, and the vibration transmissibility is decreased. Moreover, this relative deflection feels like J-type motion, creating a riding comfort (under vibration) similar to the "sky hook" effects. Because the independent motion of the magneto-spring corresponds to the direction anticipated by a person in relation to forced deflection, the unpleasant feeling, such as that felt when riding in an elevator, is alleviated. As shown in FIGS. 31A and 31B, mechanisms that produce phase shifts based on viscous damping by a shock absorber, a spring constant around the equilibrium point that is close to zero, and a curvature of the load-deflection characteristic curve in the bottoming direction from the equilibrium point, show behavioral differences in relation to a convex surface. Arrows indicate changes in eye level in relation to the convex surface.

In the conventional suspension seat, the shock absorber is used for damping the vibration, and over convex surfaces, there is a lag in reaction time. This causes a sensation of being pulled upward and remaining there.

Using a triaxial electromotive exciter having a 60 mm stroke and a uniaxial hydraulic exciter having a 100 mm stroke, a subject is seated on the seats with load-deflection characteristics shown in Table 3 and FIGS. 32 to 39, and each seat is then shaken at random frequencies. The transmissibility was found based on the acceleration of a platform of the exciter and the vertical acceleration of an SAE pad, which is placed behind the subject's tuber ischiadicum and in which an accelerometer is embedded.

TABLE 3

| Seat | Kind | Stroke (mm) |
| --- | --- | --- |
| A | Air suspension | 130 |
| B | Air suspension | 115 |
| C | Magneto-spring | 50 |
| D | Metal spring type suspension | 95 |
| E | Metal spring type suspension | 75 |
| F | Metal spring type suspension | 75 |
| G | Metal spring type suspension | 135 |
| H | Metal spring type suspension | 50 |
| VSUM | Magneto-spring | 50 |

Figure 32:
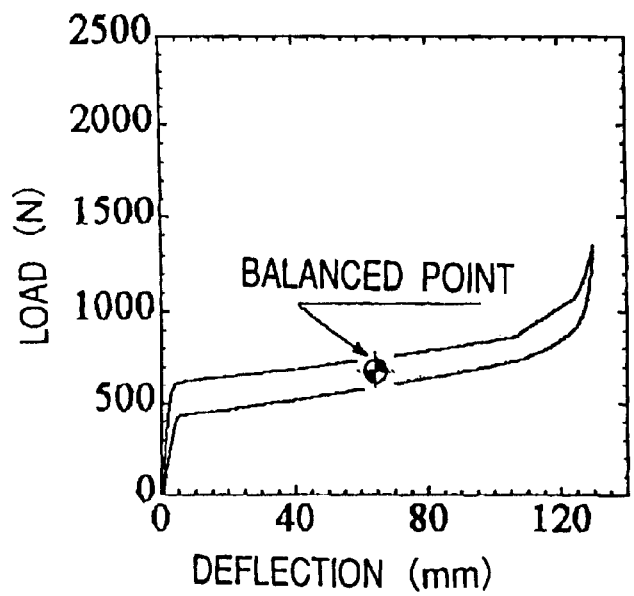
FIG. 32 is a graph depicting the load-deflection characteristics of an air spring type suspension seat.
Figure 33:
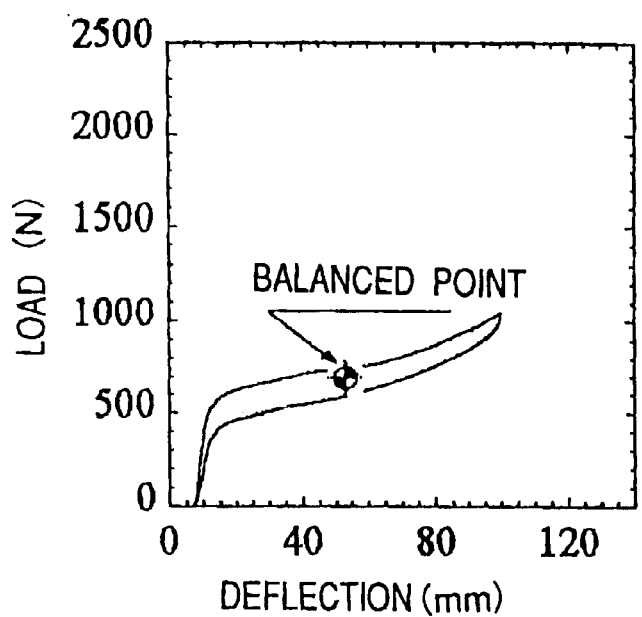
FIG. 33 is a graph similar to FIG. 32, but depicting the load-deflection characteristics of another air spring type suspension seat.
Figure 34:
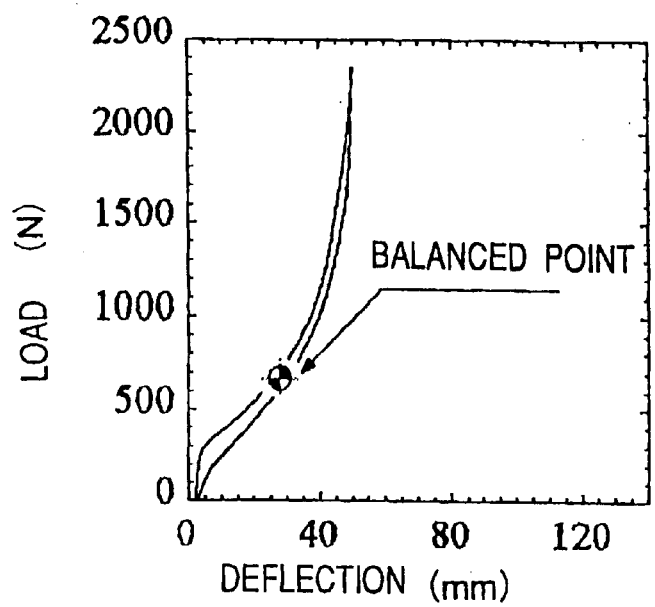
FIG. 34 is a graph similar to FIG. 32, but depicting the load-deflection characteristics of a magneto-spring type suspension seat.
Figure 35:
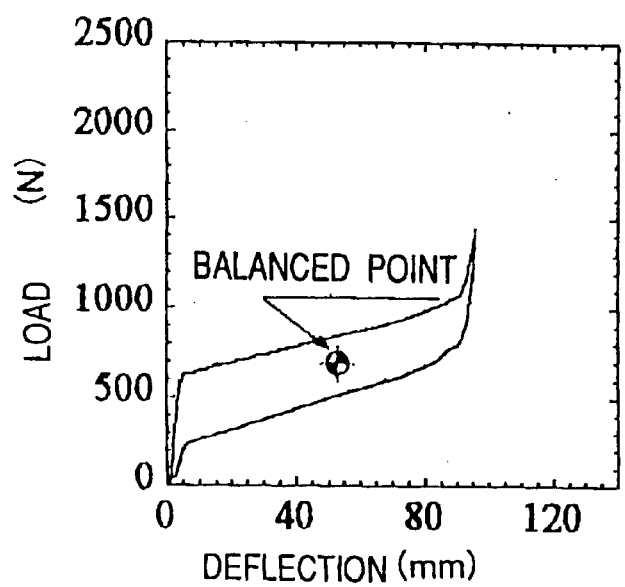
FIG. 35 is a graph similar to FIG. 32, but depicting the load-deflection characteristics of a metal spring type suspension seat.
Figure 38:
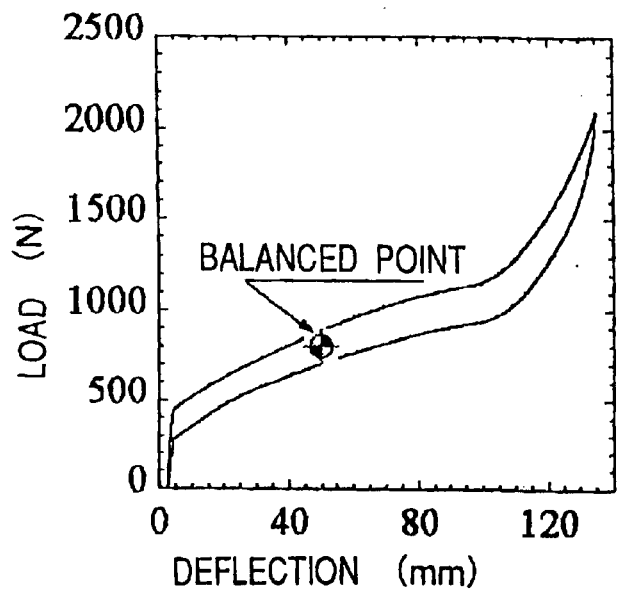
FIG. 38 is a graph similar to FIG. 32, but depicting the load-deflection characteristics of a still further metal spring type suspension seat.
Figure 39:
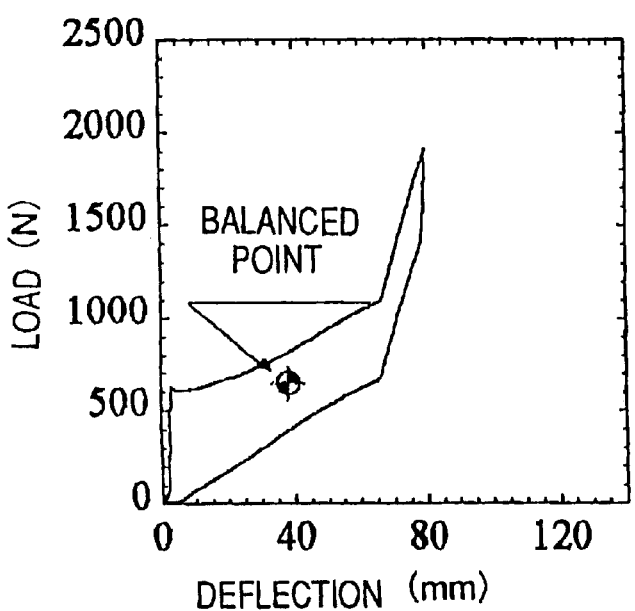
FIG. 39 is a graph similar to FIG. 32, but depicting the load-deflection characteristics of another metal spring type suspension seat.

Seat A of FIG. 32 has a small spring constant of 2650 N/m and a large suspension stroke of 130 mm. This is an air suspension seat, with excellent vibration absorption and shock absorption. Seat B of FIG. 33 has a small spring constant of 3250 N/m and a small suspension stroke of 100 mm. Additionally, because shock absorption is achieved by a shock absorber with a low damping force, this is an air-suspension seat that lays an emphasis on its vibration absorbing properties. Seat C of FIG. 34 is a magneto-spring suspension seat having a non-linear spring constant and also having a stroke of half the conventional suspension stroke, wherein no load-deflection adjustment is required with respect to the loaded mass. Seat D of FIG. 35 has a spring constant of 4940 N/m and a reduced suspension stroke of 95 mm, and includes a shock absorber having a large damping force. This seat is a metal spring suspension seat which attempts to optimize both the vibration and shock absorption properties. Seat E of FIG. 36 has a spring constant of 4590 N/m and a reduced suspension stroke of 75 mm, and includes a shock absorber having a large damping force. This seat is also a metal spring suspension which attempts to optimize both the vibration and shock absorbing properties. Seat F of FIG. 37 has a spring constant of 6930 N/m and a reduced suspension stroke of 75 mm, and includes a shock absorber having a small damping force. This seat is a metal spring suspension seat that lays emphasis on its vibration absorbing properties. Seat G of FIG. 38 is a metal spring suspension seat which aims at shock absorption through a combination of a shock absorber with a low damping force and a spring constant of 7100 N/m, along with a suspension stroke of 135 mm, and also aims at optimum vibration absorption. Seat H of FIG. 39 is also a metal spring suspension seat and mainly focuses on shock absorption, with a combination of a spring constant of 10550 N/m, and a shock absorber with a large damping force. The VSUM seat has the load-deflection characteristics shown in FIG. 29. Although the range for which the VSUM seat does not require load-deflection adjustments to compensate for the loaded mass is smaller than that of Seat C, it attempts to optimize both vibration and shock absorption by making use of its characteristics wherein the spring constant is nearly or substantially zero around the dynamic equilibrium point. It also aims at optimizing shock absorption and alleviating the sensation of bottoming by utilizing an 'anti-gravity' state, a shock absorber, and repulsive forces of the magnets.

Exciting waveforms were determined based on test runs that were carried out using a van-type vehicle on the highways in Japan. There were used various random waves as shown in Table 4 and reproduced by an electromotive triaxial exciter from vertical acceleration of a vehicle floor at a position above the rear axle, and transformed sine waves of 2 Hz frequency and 15 m/s$^2$ acceleration amplitude reproduced by a uniaxial hydraulic exciter and obtained from DR-12 random waves shown in Table 4 by multiplying the largest shock waves' acceleration amplitude by 1.2.

To verify the anti-shock capabilities of damping by the phase shift and damping by the shock absorber, transformed sine waves of 1.5 Hz frequency and 5 m/s$^2$ acceleration amplitude were used.

Figure 40:
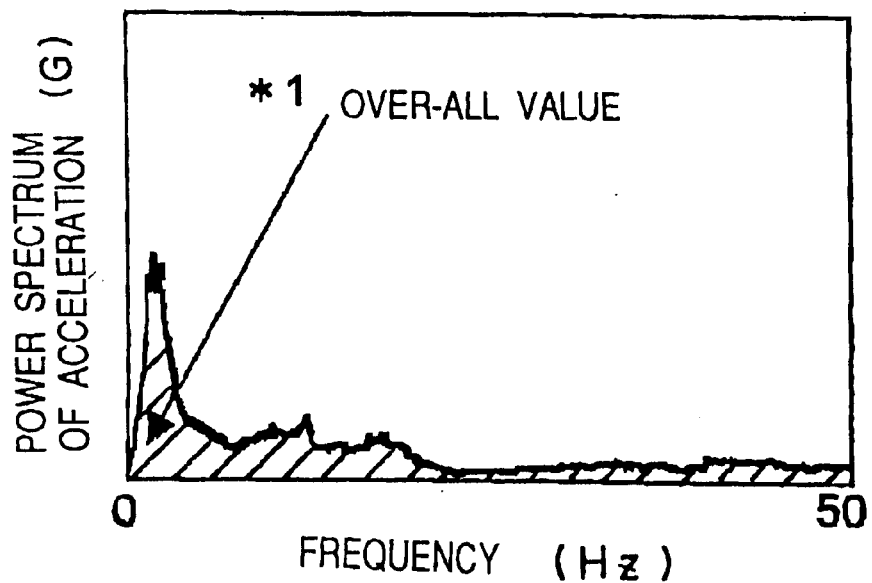
FIG. 40 is a graph depicting overall values of input acceleration when a van-type vehicle is travelling.
Figure 41:
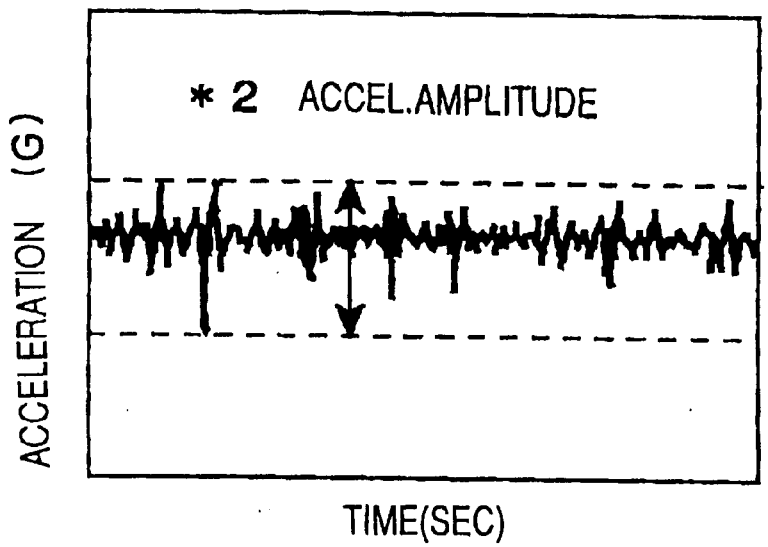
FIG. 41 is a graph depicting the maximum input acceleration amplitude in acceleration time series data when the van-type vehicle is travelling.

FIGS. 40 and 41 show the special characteristics of the exciting waveforms in Table 4 and show the travel speed of the van-type vehicle and overall values of input acceleration in the range of 0~50 Hz, as well as the maximum input acceleration amplitude in acceleration time series data.

TABLE 4

| No. DR | Name of Expressway | Velocity (km/h) | *1 Over-all value (m/s$^2$) | *2 Amplitude acceleration (m/s$^2$) |
| --- | --- | --- | --- | --- |
| 1 | Sanyo: near Fukuyama | 80 | 1.10 | 6.83 |
| 3 | Bantan: — | 80 | 1.10 | 9.00 |
| 4 | Chugoku: near Kasai | 80 | 0.62 | 3.45 |
| 6 | Meishin: near Koura | 85 | 0.92 | 3.67 |
| 9 | Toumei: near Toyota | 85 | 1.04 | 7.36 |
| 12 | Shuto: — | 80 | 1.88 | 12.52 |
| 13 | Shuto: near Haneda | 80 | 1.28 | 10.79 |

Figure 42:
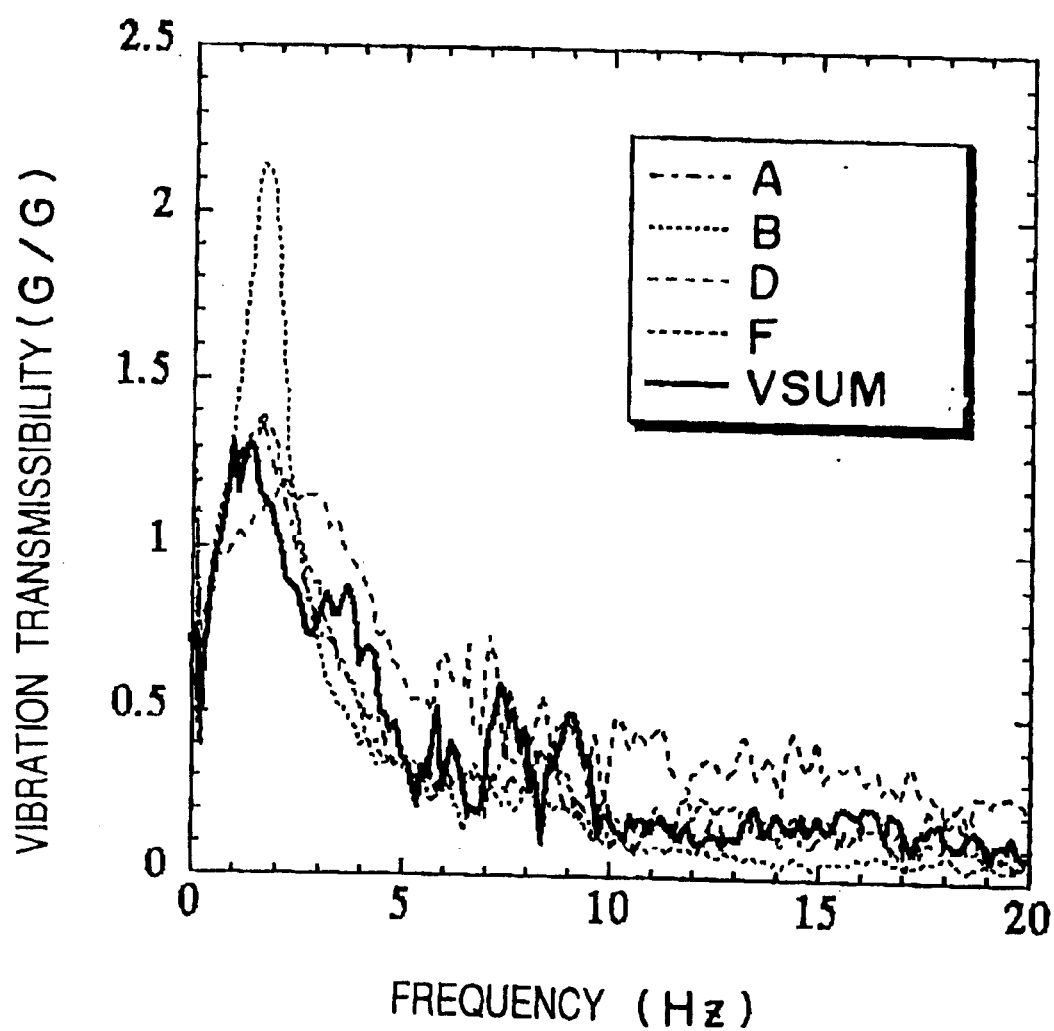
FIG. 42 is a graph depicting the frequency characteristics when an air spring type suspension seat, a metal spring type suspension seat, and the VSUM seat have been excited with random waves.

The metal-spring suspension seats with a small stroke generally have a tendency toward bottoming when a large impact force is applied. The air suspension seats have a larger suspension stroke, and bottoming (bottom stop impact) is alleviated by attenuating an impact force with the shock absorber. FIG. 42 shows the frequency characteristics (when excited by DR-12 random input) of the air suspension seat shown in Table 3, the metal spring seats A, B, D, and F, which exhibit typical vibration characteristics for that seat type, and the VSUM seat. The weight of the subject was 82 kg.

Figure 43:
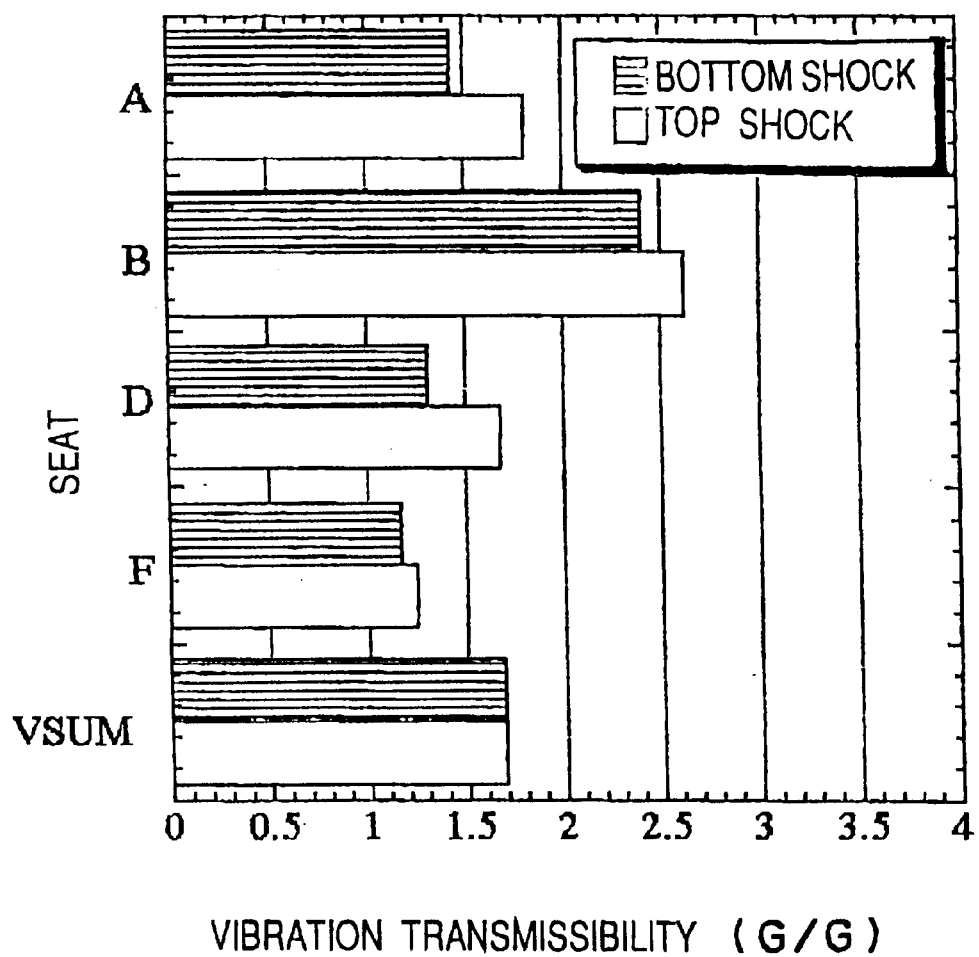
FIG. 43 is a graph depicting transient ride comfort when vibration of 5 m/s$^2$ at 1.5 Hz has been input.
Figure 44:
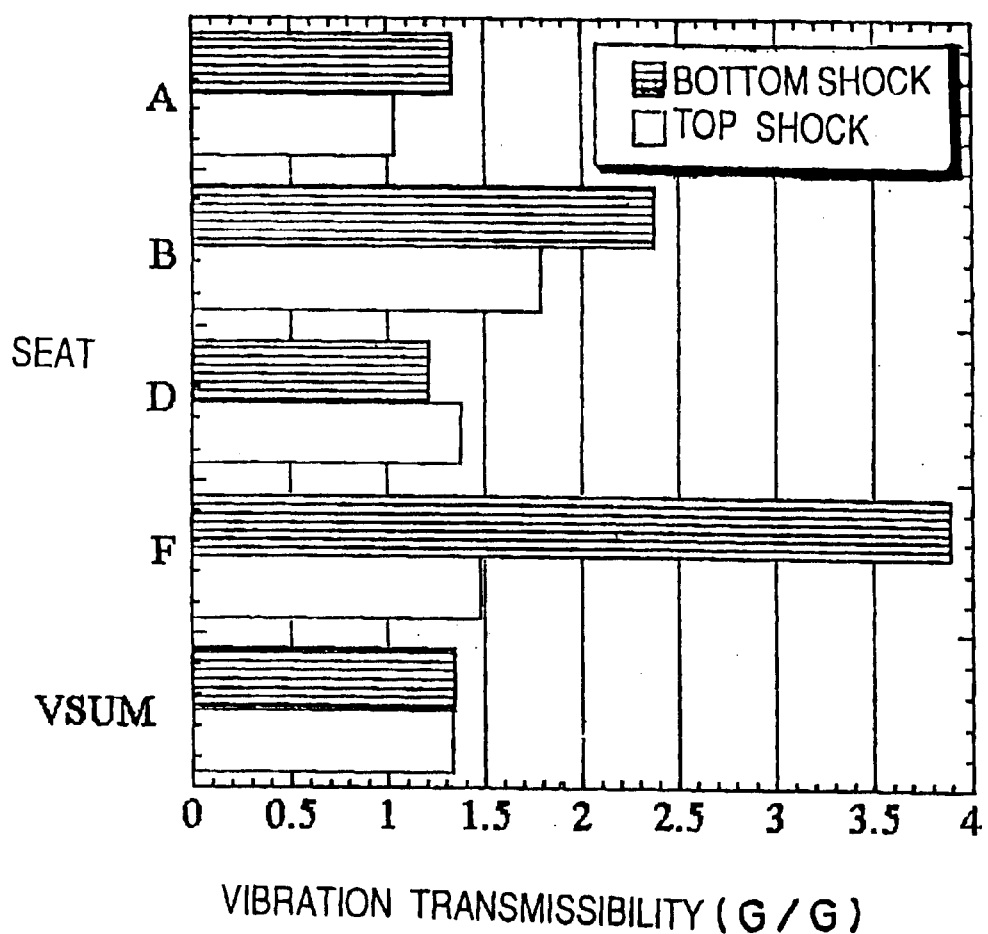
FIG. 44 is a graph depicting transient ride comfort when vibration of 15 m/s$^2$ at 2 Hz has been input.

FIGS. 43 and 44 show the results of an evaluation done on transient ride comfort in relation to impulsive input, similar to going over bumps on a road. FIG. 43 is a graph when vibration of 1.5 Hz and 5 m/s$^2$ was input. FIG. 44 is a graph when impulsive vibration of 2 Hz and 15 m/s$^2$ was input.

Seat A exhibits both vibration and shock absorption. This seat is difficult to cause to undergo the bottoming and has superior vibration characteristics over all frequency ranges. Seat B has a low resonance frequency, but exhibits a high vibration transmissibility of 2.15 (G/G). It has a strong spring feeling and is excellent for vibration absorption, but problems remain with its shock absorption qualities. In seat D, the transmissibility is high in the frequencies beyond 5 Hz due to the effect of the shock absorber. Although its vibration characteristics are not so good, it is a suspension seat with good shock absorption, even in the smaller stroke ranges. Seat F has excellent vibration absorption properties, but because its damping system utilizes phase shifts caused by a shock absorber of which the damping force changes between the expanding and contracting directions, its shock absorbing qualities are lacking, and bottoming occurs. When comparing the shock-absorbing qualities of Seat F and the VSUM seat, the shock absorber of the VSUM seat does not work when 5 m/s$^2$ vibration has been input at 1.5 Hz, but works when 15 m/s$^2$ impact vibration has been input at 2 Hz.

The shock absorber of the VSUM seat is also set at a large damping coefficient, so it has very effective impact-absorbing qualities in the smaller stroke range.

The VSUM seat has a spring constant of 10000 N/m at the equilibrium point when the loaded mass is subjected to very small vibration. This is a bit higher than that of the conventional suspension seat. Because damping is achieved through phase shifts, the VSUM seat has good vibration absorbing qualities in the lower frequency range.

Why its transmissibility characteristics are slightly lacking in the range of 7~10 Hz range is explained hereinafter. During travelling, there is a certain frequency component (wheel base component) that is determined by the time from when front wheels cross a rough spot in the road, until rear wheel cross that same spot. That frequency is dependent on the travel speed and the wheel base itself. The frequency $f_{HB}$ of the wheel base component is as follows.

$$f_{HB} = V \cdot L^{-1} \tag{25}$$

In this equation, V is the travel speed (m/s) and L is the wheel base (m). A vehicle traveling at 80 km/h will receive shock input when going over seams in the road, or rough surfaces. This input ranges from 7 Hz to 10 Hz, and is an impulsive or periodic input. Because the VSUM seat utilizes damping by the phase shifts, it is not equipped to handle this type of impulsive input as well, so its acceleration increases. However, the acceleration transmissibility is lower than 0.5 G/G, and as can be seen from FIGS. 43 and 44, the VSUM seat exhibits excellent shock absorption, so the acceleration is held to a low level, and does not significantly effect to the ride comfort.

Overall, it can be concluded that the suspension characteristics of the VSUM seat very closely duplicate those of the air suspension seat.

Figure 45:
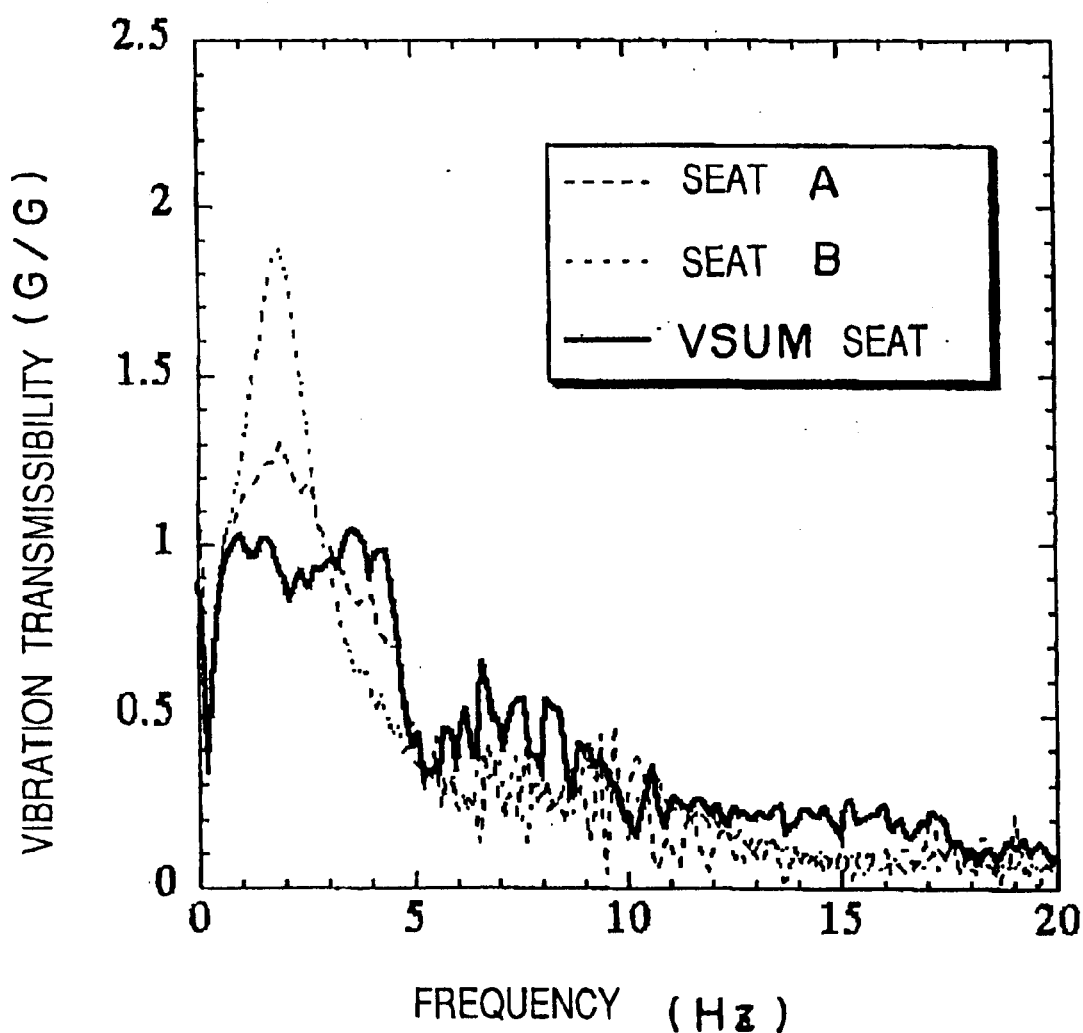
FIG. 45 is a graph depicting the frequency characteristics when various seats including the VSUM seat have been excited with different random waves.

FIG. 45 shows the frequency characteristics of seats A and B, and the VSUM seat when input spectrum DR-1 was applied. The weight of the subject was 60 kg. When comparing the air suspension seat (with it's good vibration characteristics) and the VSUM seat, when exposed to small input acceleration of DR-1's input spectrum, the VSUM exhibits characteristics in the lower frequency ranges that are completely unique compared to any other seats. The resonance crest, which is near 2 to 3 Hz, is damped by the phase shift, so the vibration transmissibility is held to a low level of 1.0 (G/G). Moreover, when exposed to input spectrum DR-12 having a large acceleration amplitude, phase shifts are facilitated up to nearly 3 Hz by the energy reviving and amplifying effects of the magneto-spring utilizing input vibration. Although its transmissibility is slightly high at a resonant crest (1.3 (G/G)), it has nearly the same vibration characteristics as the air suspension seat having a 130 mm stroke.

Figure 46:
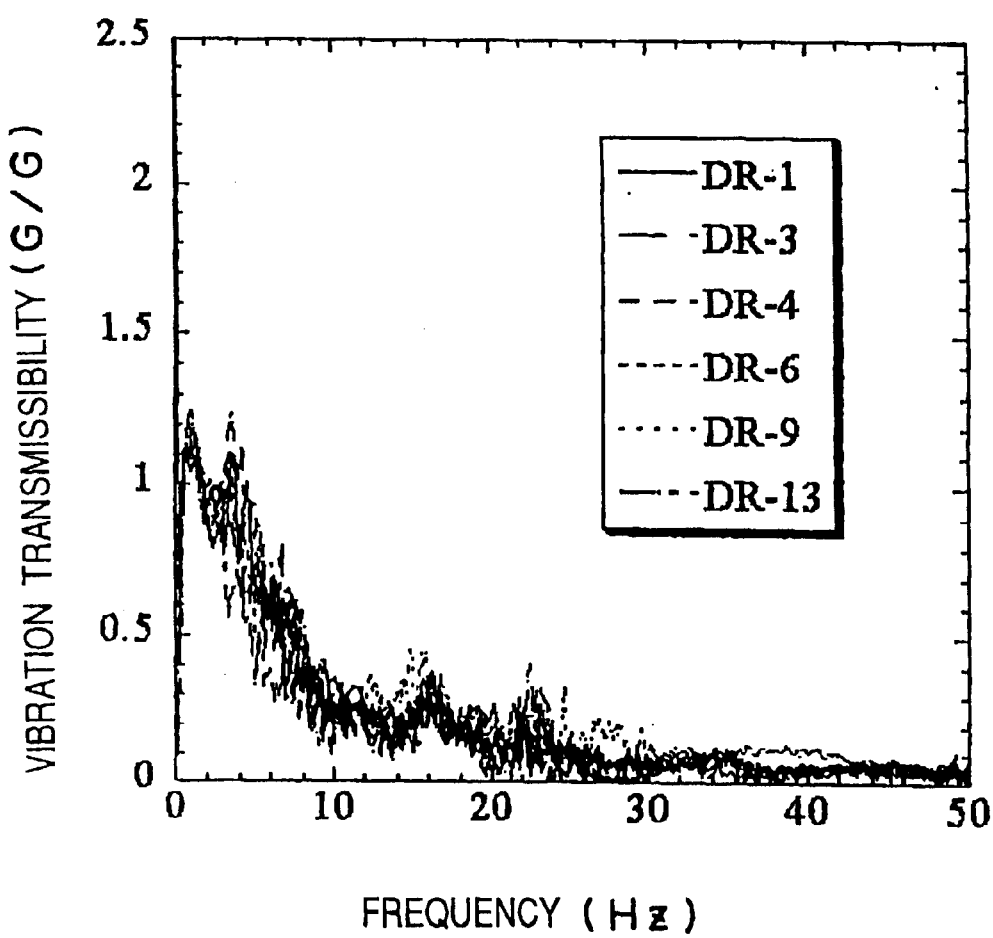
FIG. 46 is a graph depicting the frequency characteristics in the vertical direction of the VSUM seat when traveling over highway roads.

FIG. 46 depicts the frequency characteristics in the vertical direction of the VSUM seat when traveling over highway roads as stated in Table 4. The non-linear magneto-spring characteristics exhibit little dependency on the input, and a high level of robustness is evident.

Figure 47:
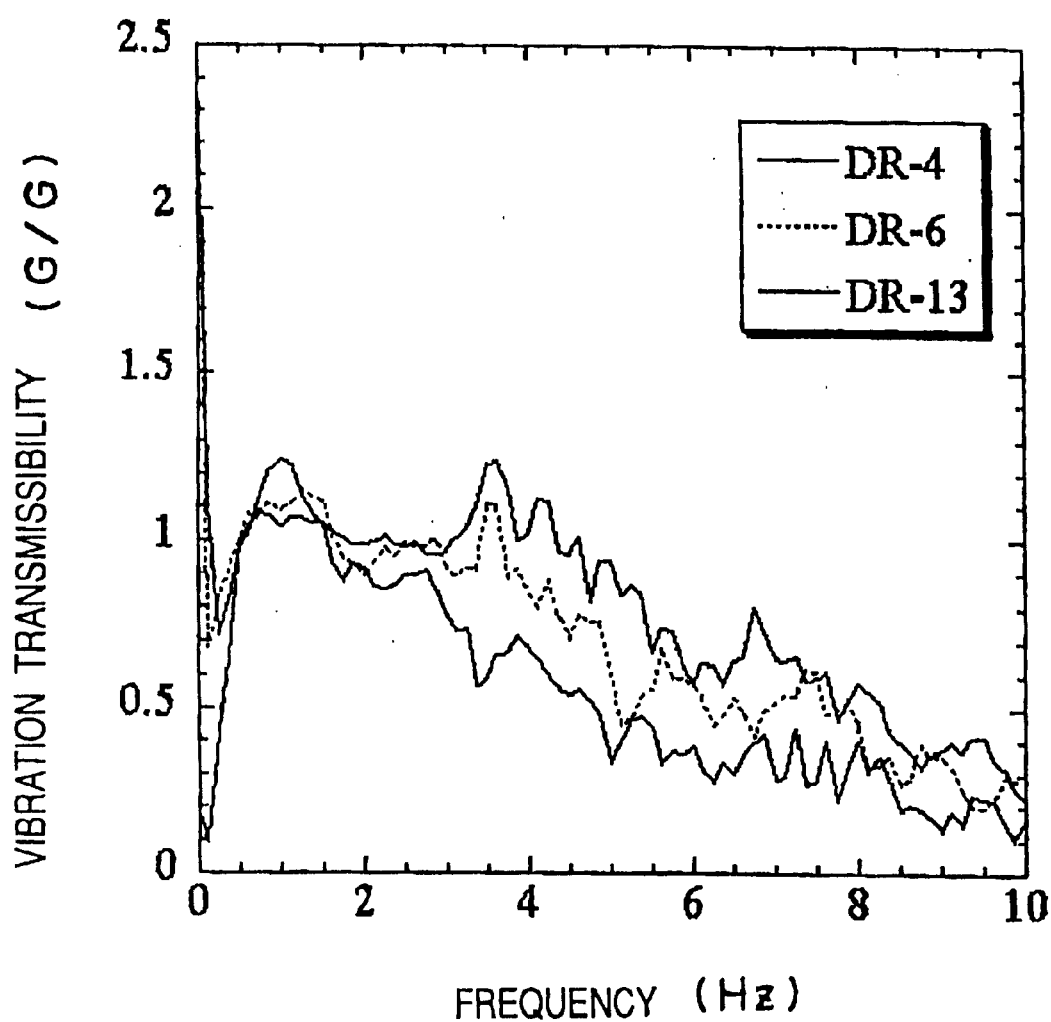
FIG. 47 is a graph depicting the vibration transmissibility of the VSUM seat when input acceleration amplitude has been changed.

FIG. 47 depicts the results of an investigation of vibration transmissibility characteristics caused by the differences in input acceleration amplitude. When the input spectrum has a high amount of vibration energy, the phase shift lags even in the low frequency range. The transmissibility at the resonant crest is close to 1.0 (G/G), and the transfer function closely resembles quasi-active controls.

Figure 48:
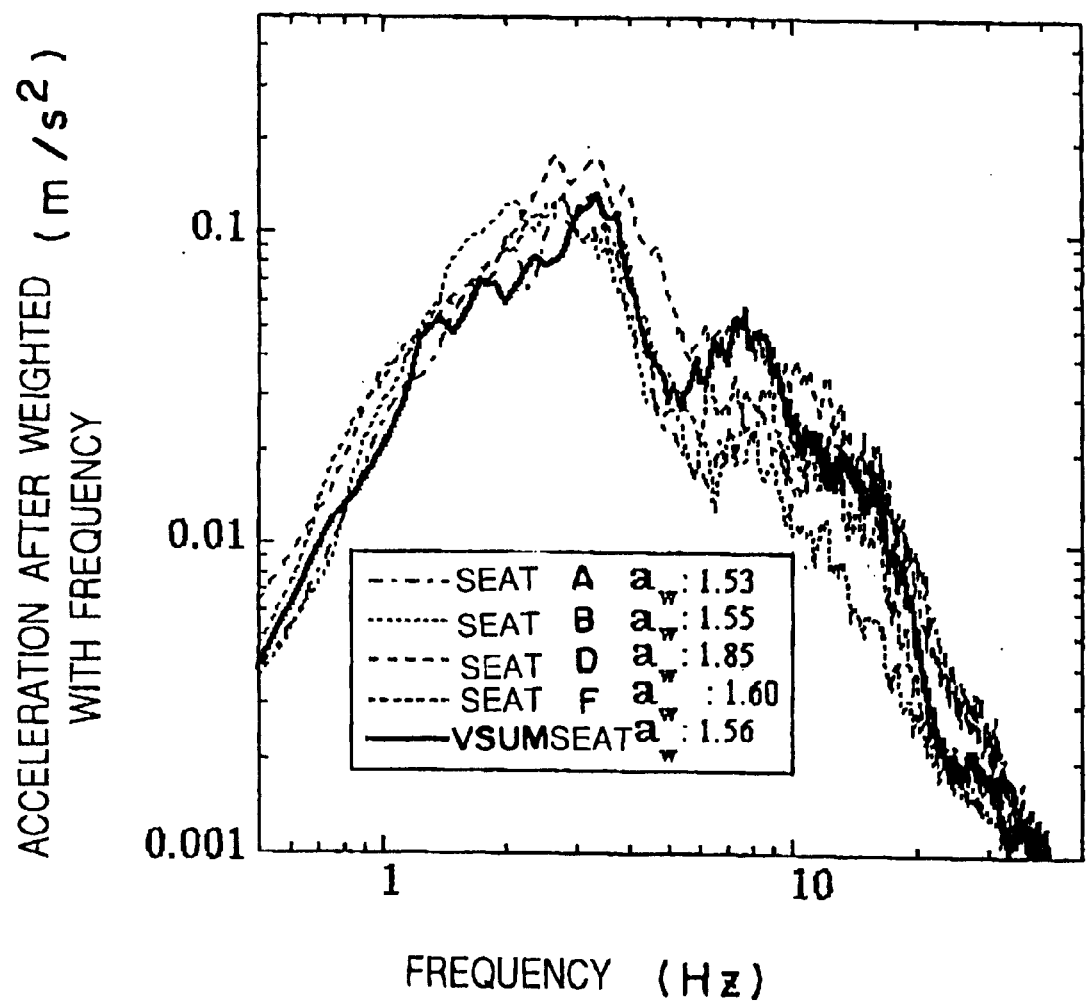
FIG. 48 is a graph depicting the weighted ride comfort evaluation with respect to the frequency characteristics of FIG. 42.
Figure 49:
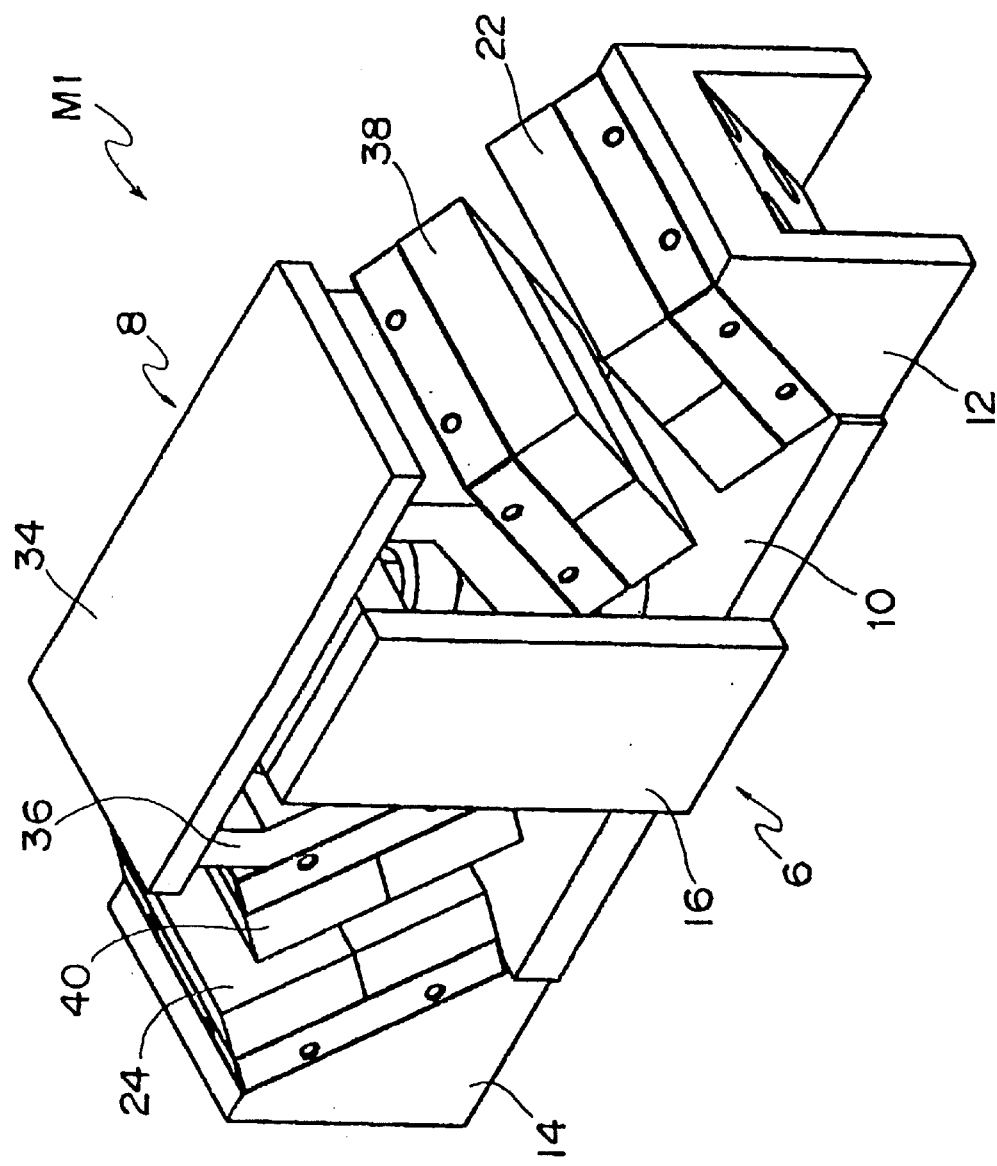
FIG. 49 is a perspective view of a vibration mechanism according to a first embodiment of the present invention.
Figure 50:
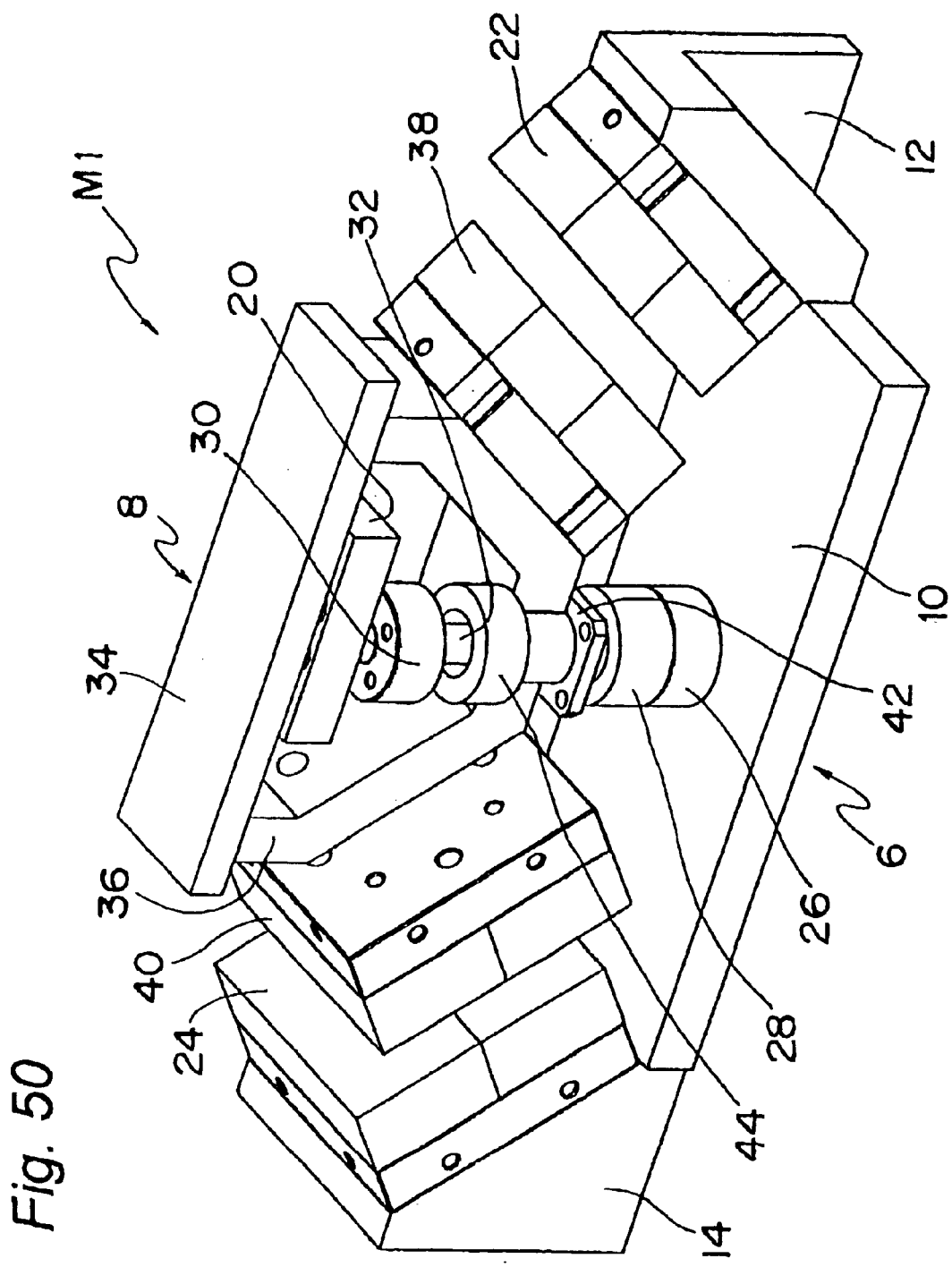
FIG. 50 is a partially cutaway perspective view of the vibration mechanism of FIG. 49.

FIG. 48 shows the weighted ride comfort evaluation done on seats shown in FIG. 42 based on ISO2631-1; 1997(E). Excitation was caused by random input DR-12, and the weight of the subject was 82 kg.

In all of the various frequency ranges, vibrational energy is absorbed, and the occupant felt little fatigue: at 0–2 Hz, a "wavy" motion that causes motion sickness; at around 5 Hz, a "bobbing" motion in which mainly the torso and vision are affected; at around 10 Hz, a shaking motion felt mainly in the lower limbs, at around 20 Hz, a pounding motion that is accompanied by noise; and at 30 Hz and above, a "buzzing" type of vibration. The acceleration at around 8 Hz where the resonance of internal organs occurs is slightly high, but does not reach a level that would be considered a problem. The air suspension exhibits excellent vibration absorption in the higher frequency ranges and the VSUM exhibits excellent vibration absorption in the range below 2 Hz, in which a wavy motion occurs. The VSUM seat achieves approximately the same vibration absorbing capability as the air suspension seat, but with a stroke only half as long as that of the air suspension seat. The value of $a_w$, mentioned in ISO2631-1: 1997(E), is nearly the same as well.

$a_w$ is the sum total of the acceleration from 0 to 50 Hz with weighed spectra and is given by the following equation:

$$a_w = \left[ \sum_i (w_i a_i)^2 \right]^{\frac{1}{2}} \tag{26}$$

Wi is the weighted spectra function, per ISO2631-1: 1997 (E), and $a_I$ indicates actual measured acceleration, in which a frequency analysis was done on the vertical vibration at the occupant's hip joint.

FIG. 32 The vibration characteristics of several suspension seats according to ISO 2631-1: 1997 (E) (weighted spectra)

The specific construction to provide the static spring constant k≈0 in a predetermined range is explained with the magnet arrangement shown in FIGS. 11, 13 or 15.

FIGS. 49 to 53 depict a vibration mechanism M1 according to a first embodiment of the present invention. As shown therein, the vibration mechanism M1 includes a stationary frame 6 and a movable frame 8 vertically movably mounted on the stationary frame 6.

The stationary frame 6 includes a generally rectangular base plate 10, a pair of inclined stands 12, 14 secured to opposite ends of the base plate 10, respectively, a pair of side plates 16, 18 secured at lower ends thereof to respective sides of a central portion of the base plate 10, and an upper stationary plate 20 secured to upper ends of the side plates 16, 18. The inclined stands 12, 14 are inclined downwardly (V-shaped) towards the inside and each of them has a two-pole magnet 22, 24 shown in, for example, FIG. 2B and secured to an upper surface thereof A lower stopper 28 is secured to the center of the base plate 10 via a spacer 26, while an upper stopper 30 is secured to the center of the upper stationary plate 20. The lower stopper 28 and the upper stopper 30 hold lower and upper ends of a slide shaft 32, respectively.

On the other hand, the movable frame 8 includes a top plate 34, a generally V-shaped bracket 36 secured to a lower surface of the top plate 34, and two two-pole magnets 38, 40 secured to inclined portions 36a, 36a formed on respective sides of the bracket 36. A slide bearing 42 and a contact member 44 are mounted to a lower portion of the bracket 36, and the slide shaft 32 is loosely inserted into the slide bearing 42.

The two-pole magnets 22, 24 secured to the inclined stands 12, 14 are spaced from and extend parallel to the two-pole magnets 38, 40 secured to the bracket 36, respectively, with like magnetic poles opposed to each other.

Figure 51:
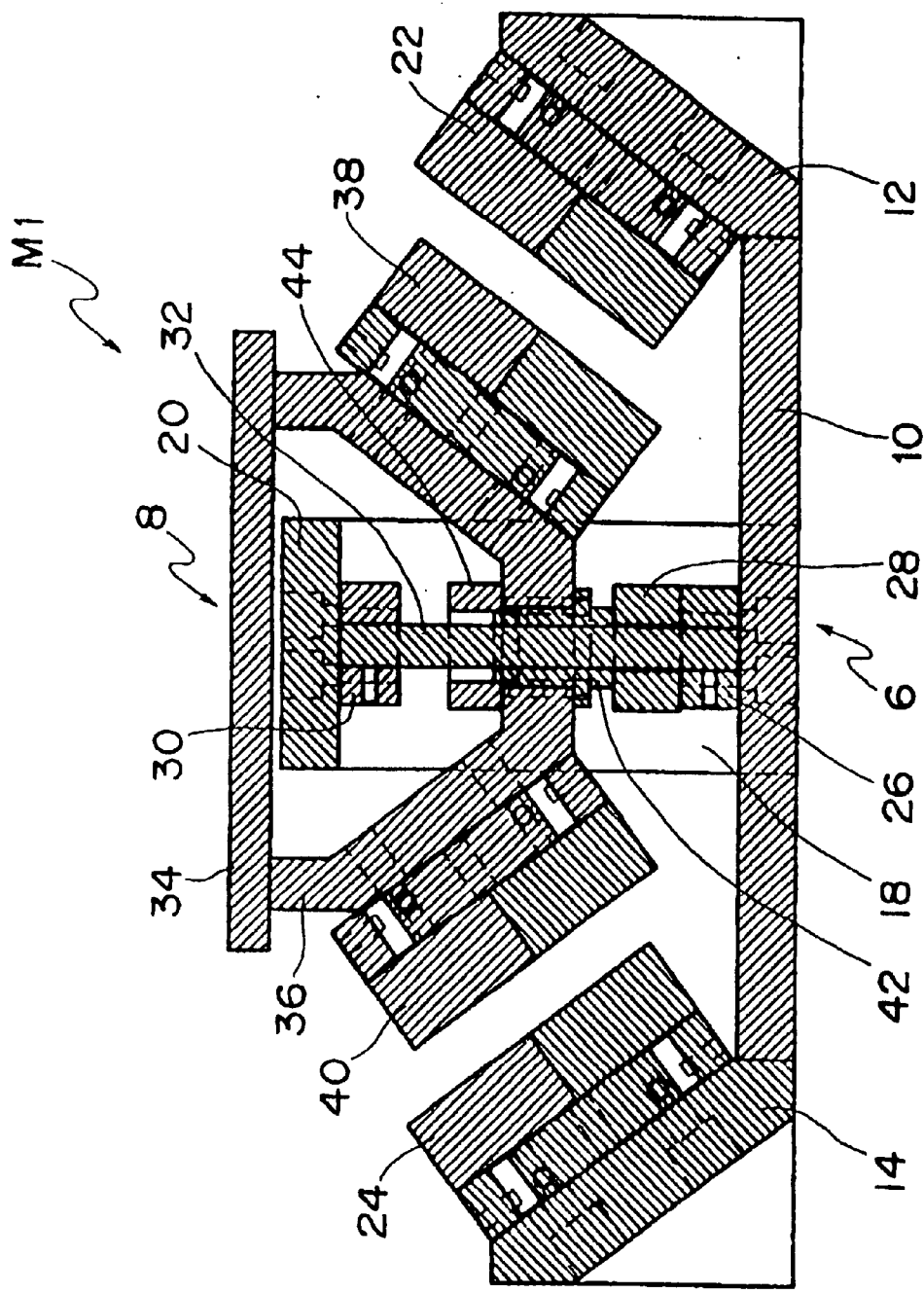
FIG. 51 is a vertical sectional view of the vibration mechanism of FIG. 49.
Figure 52:
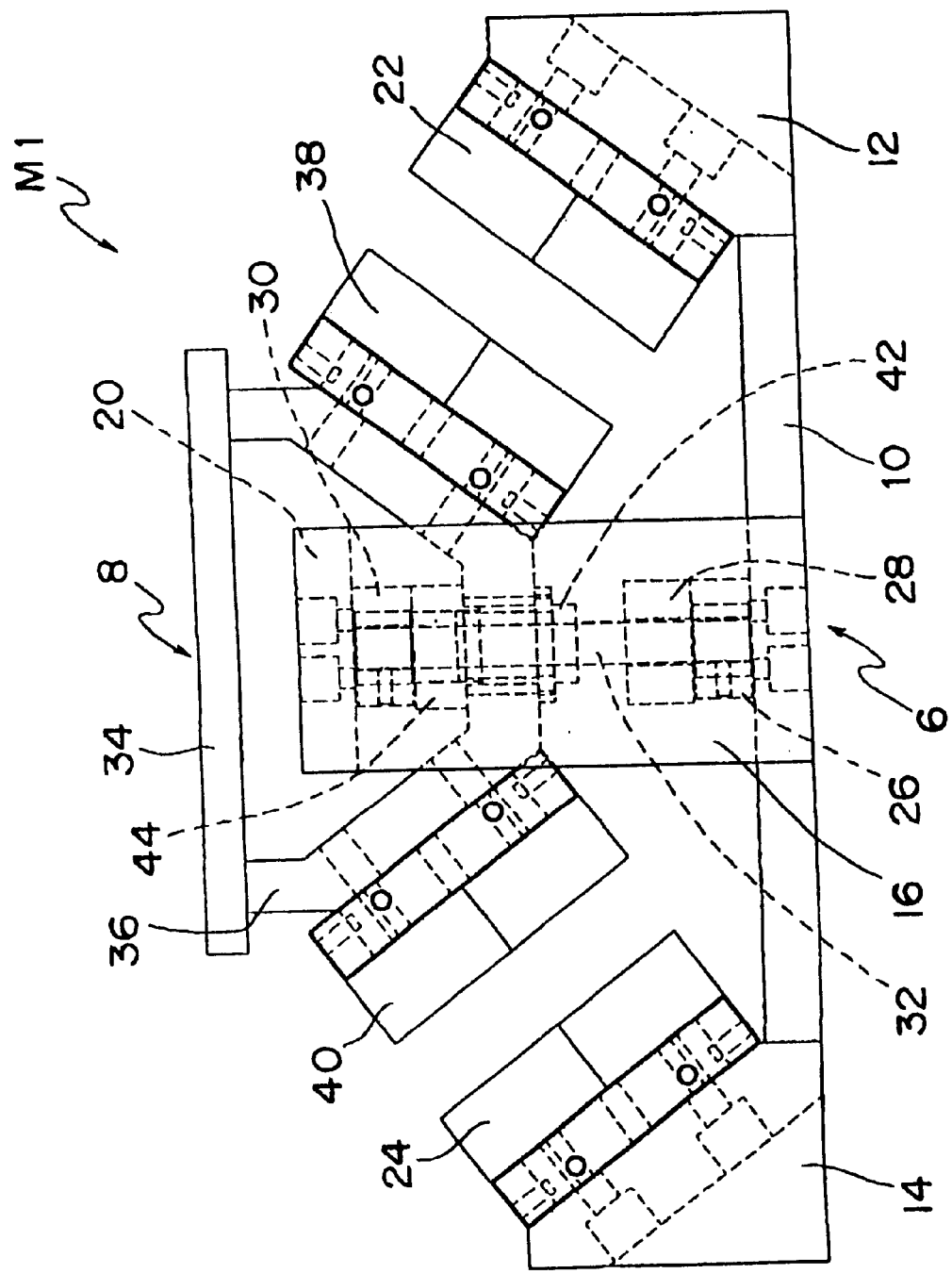
FIG. 52 is a front view of the vibration mechanism of FIG. 49.
Figure 53:
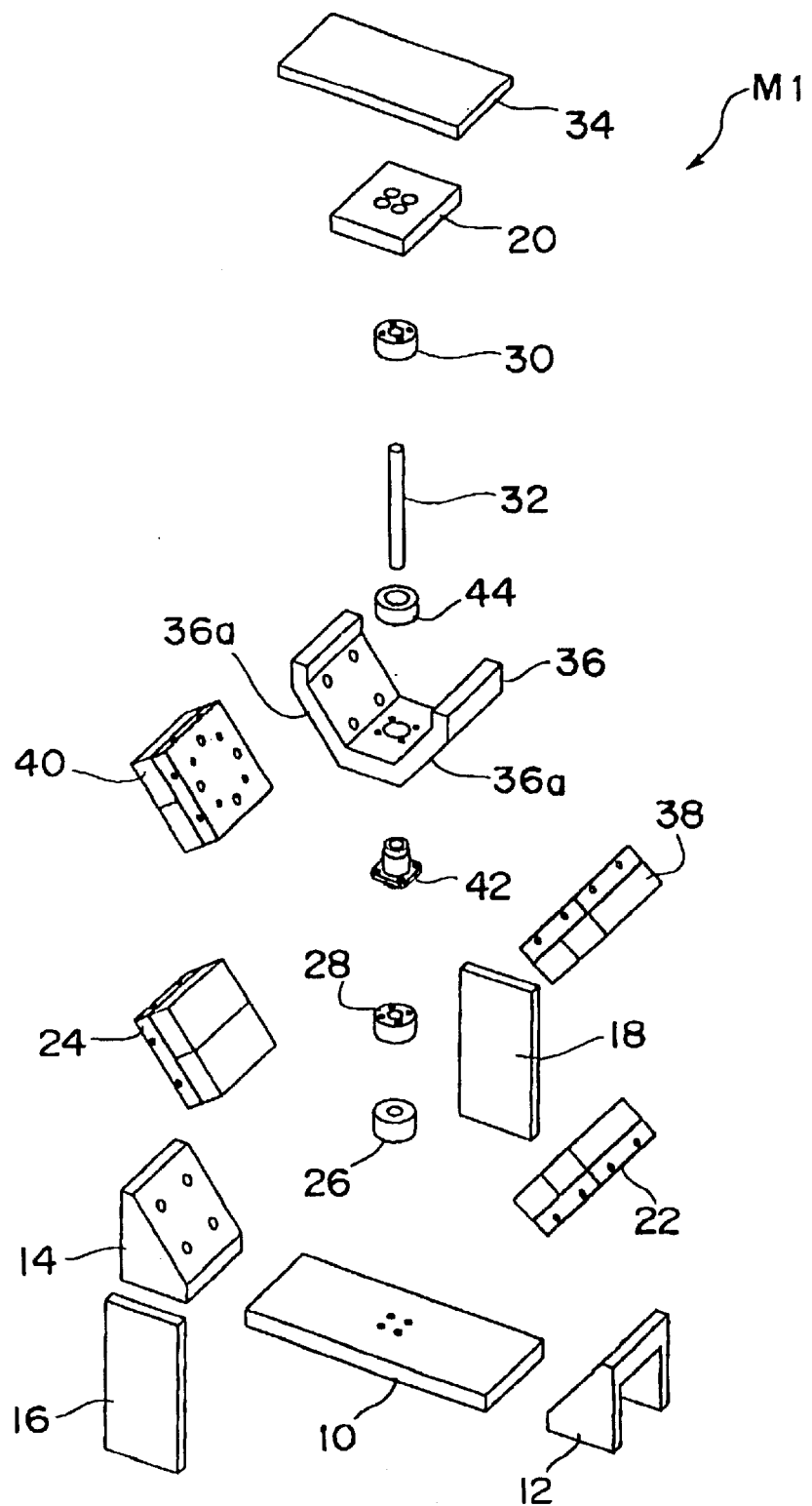
FIG. 53 is an exploded perspective view of the vibration mechanism of FIG. 49.
Figure 54:
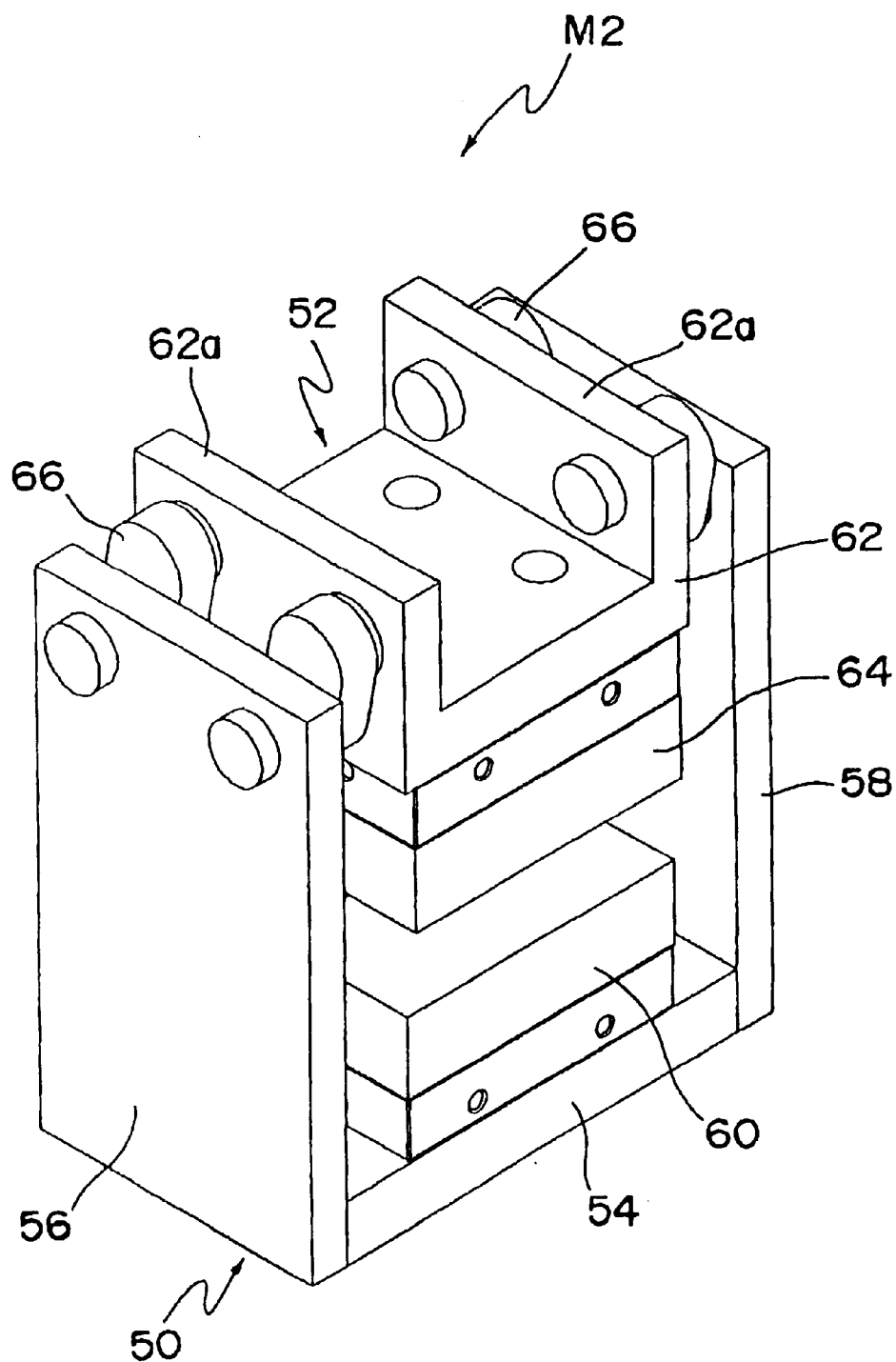
FIG. 54 is a perspective view of a vibration mechanism according to a second embodiment of the present invention.
Figure 55:
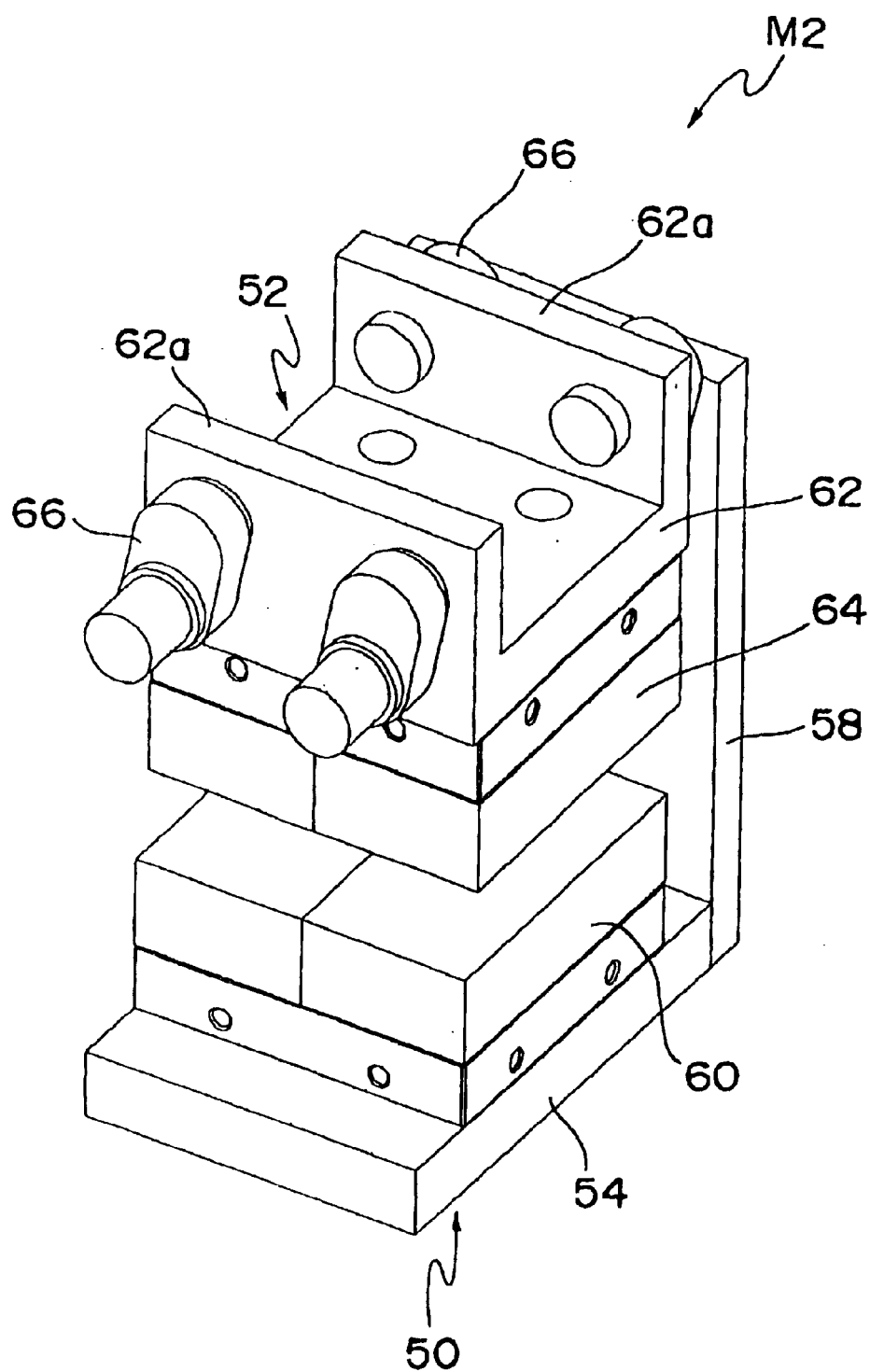
FIG. 55 is a partially cutaway perspective of the vibration mechanism of FIG. 54.
Figure 56:
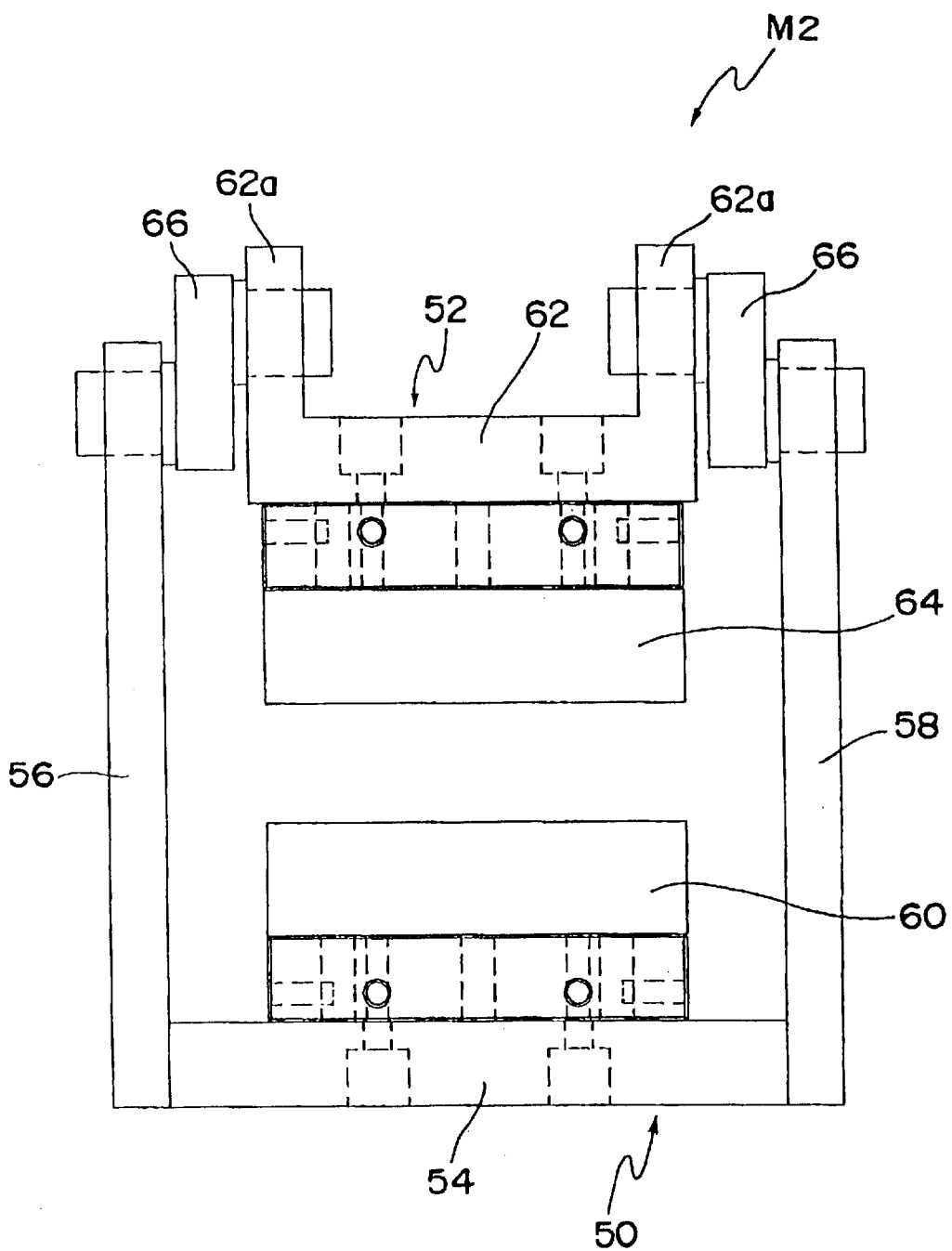
FIG. 56 is a front view of the vibration mechanism of FIG. 54.
Figure 58:
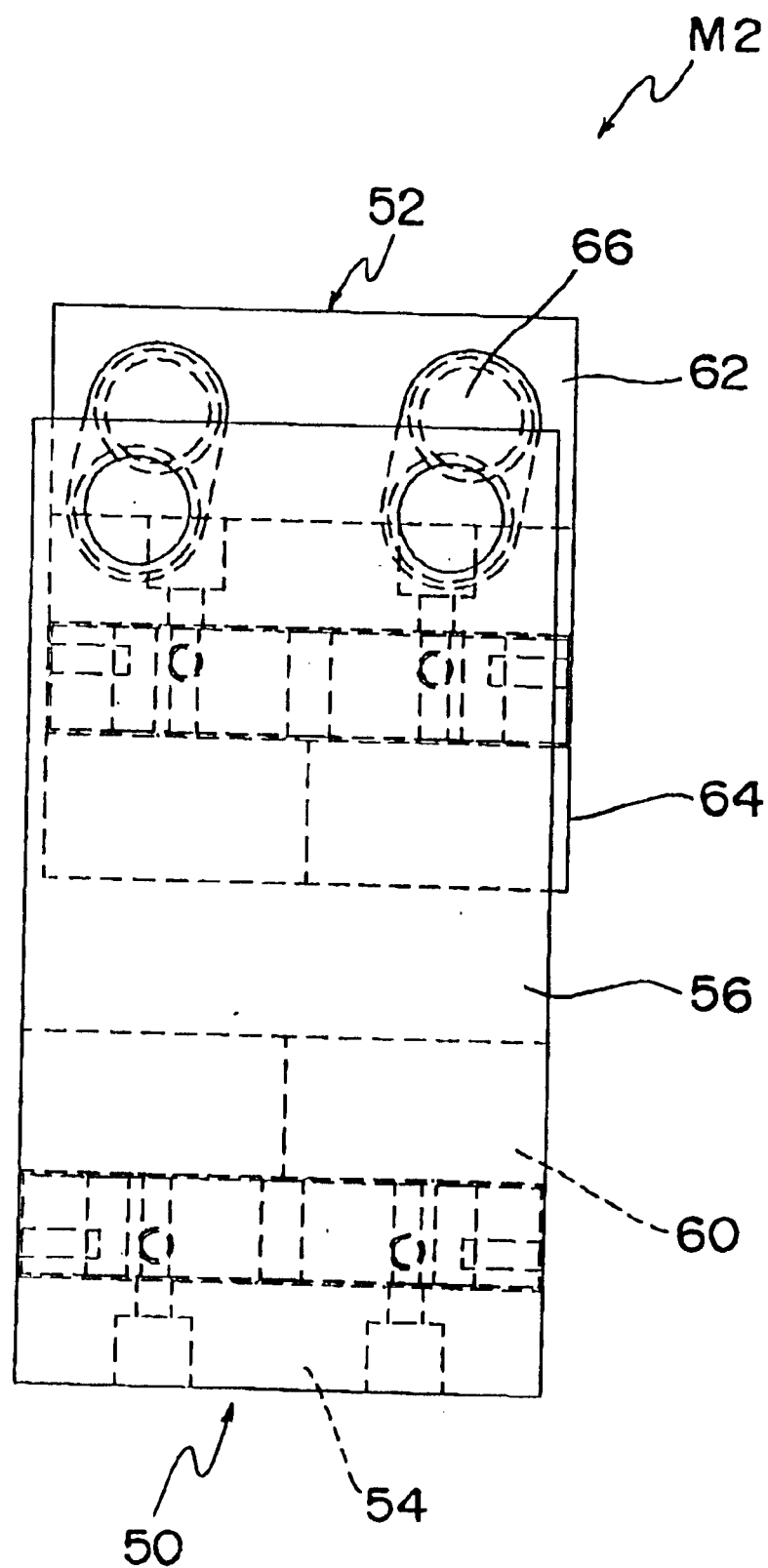
FIG. 58 is a side view of the vibration mechanism of FIG. 54 when a movable frame has reached the highest position.
Figure 59:
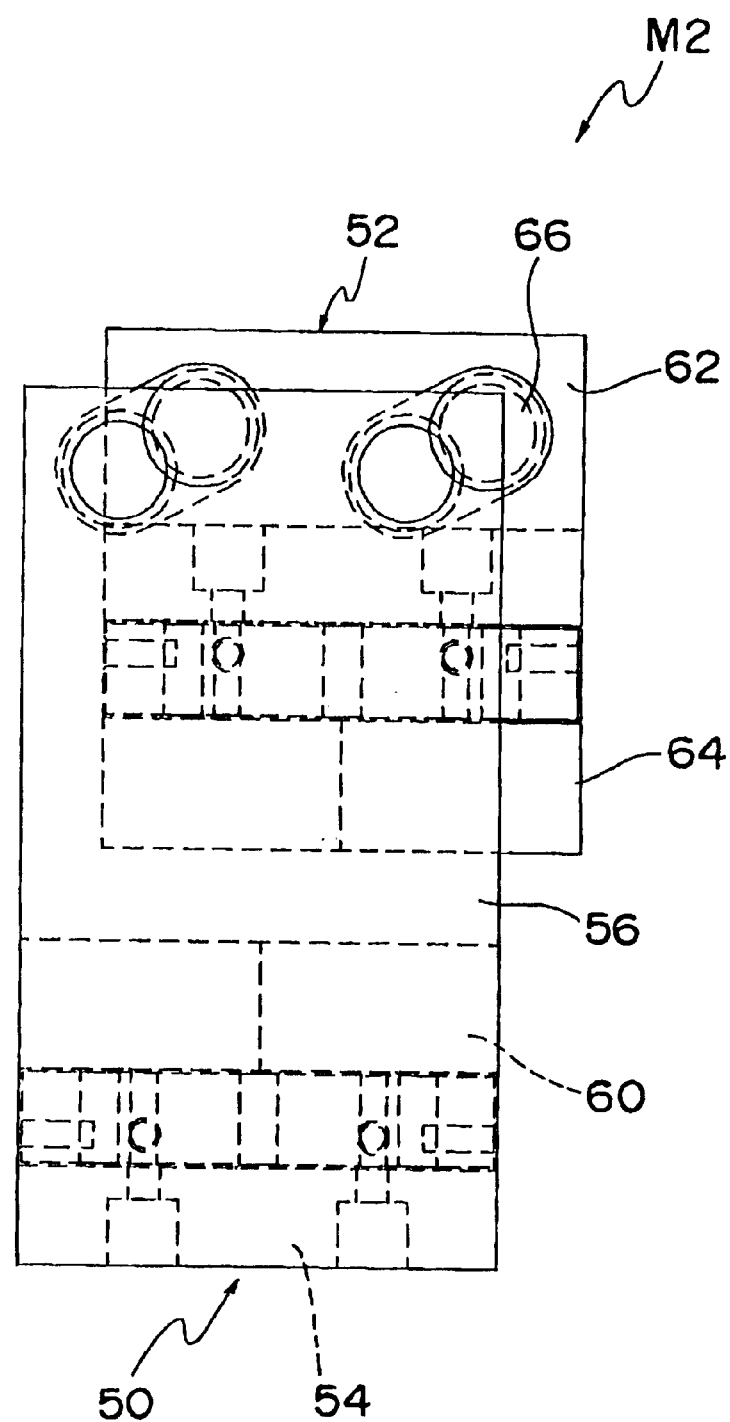
FIG. 59 is a side view of the vibration mechanism of FIG. 54 when the movable frame has reached the lowest position.

In the vibration mechanism M1 of the above-described construction, the movable frame 8 can move vertically along the slide shaft 32 between the bottom dead center, at which the slide bearing 42 is brought into contact with the lower stopper 26, as shown in FIG. 51, and the top dead center at which the contact member 44 is brought into contact with the upper stopper 30, as shown in FIG. 52.

Accordingly, if the spring constant around the equilibrium point is set to nearly or substantially zero (k≈0) by appropriately selecting the size and the angle of inclination of the two-pole magnets 22, 24, 38, 40 depending on a loaded mass placed on the top plate 34 of the movable frame 8, the vibration mechanism M1 can be used for a vibration isolating mechanism such, for example, as a suspension unit, an engine mount or the like. The reason for this is that even if vibration is input to one of the stationary frame 6 and the movable frame 8 that is caused to float by means of repulsive forces of the opposed two-pole magnets 22, 24, 38, 40, the other of the stationary frame 6 and the movable frame 8 is hardly affected by the input vibration.

FIGS. 54 to 59 depict a vibration mechanism M2 according to a second embodiment of the present invention, which includes a stationary frame 50 and a movable frame 52 rotatably mounted on the stationary frame 50.

The stationary frame 50 includes a base plate 54, a pair of side plates 56, 58 secured at lower ends thereof to opposite ends of the base plate 54, and a two-pole magnet 60 secured to the center of the base plate 54.

On the other hand, the movable frame 52 includes a generally U-shaped rocking member 62 and a two-pole magnet 64 secured to a lower surface of the rocking member 62. The two-pole magnet 64 confronts the two-pole magnet 60 on the stationary frame 50 with like magnetic poles opposed to each other. The rocking member 62 has two opposing side walls 62a, 62a each having two round holes 62b, 62b defined therein. One end of a crank shaft 66 is loosely inserted into each round holes 62b, while the other end of the crank shaft 66 is similarly loosely inserted into a round hole 56a (or 58a) defined in an upper portion of the side plate 56 (or 58) of the stationary frame 50.

In the vibration mechanism M2 of the above-described construction, the spring constant around the equilibrium point can be set to nearly zero (k≈0) within a predetermined range in which the opposing area decreases as the upper magnet 64 moves towards the lower magnet 60 or within another predetermined range in which the opposing area increases as the upper magnet 64 moves away from the lower magnet 60 (for example, within a range from FIG. 58 to FIG. 59), by appropriately selecting the size of the two-pole magnets 60, 64 and the radius of rotation of the crank shafts 66, . . . , 66 depending on a loaded mass placed on the movable frame 52.

Although in the above-described vibration mechanism M2 the two two-pole magnets 60, 64 are disposed horizontally, they may be inclined as in the vibration mechanism M1 so long as they extend parallel to each other.

Figure 2A:
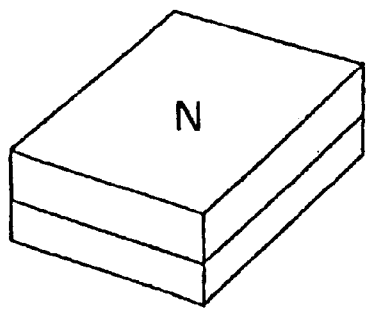
FIG. 2A is a perspective view of a single-pole permanent magnet.
Figure 2B:
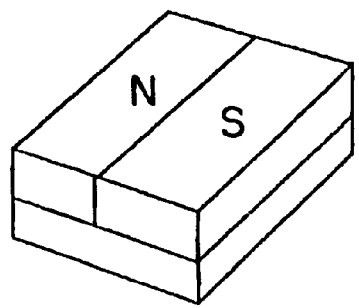
FIG. 2B is a view similar to FIG. 2A, but depicting a two-pole permanent magnet.
Figure 2C:
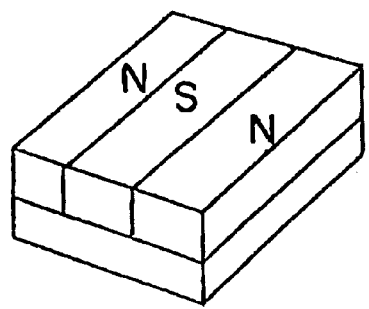
FIG. 2C is a view similar to FIG. 2A, but depicting a three-pole permanent magnet.
Figure 2D:
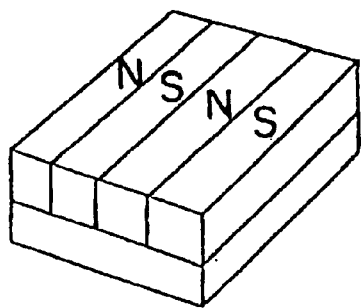
FIG. 2D is a view similar to FIG. 2A, but depicting a four-pole permanent magnet with magnetic poles positioned in a side-by-side fashion.
Figure 2E:
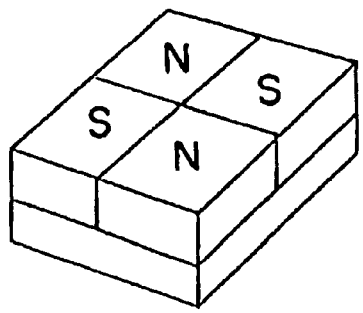
FIG. 2E is a view similar to FIG. 2A, but depicting another four-pole permanent magnet with magnetic poles positioned at 90° intervals.
Figure 3:
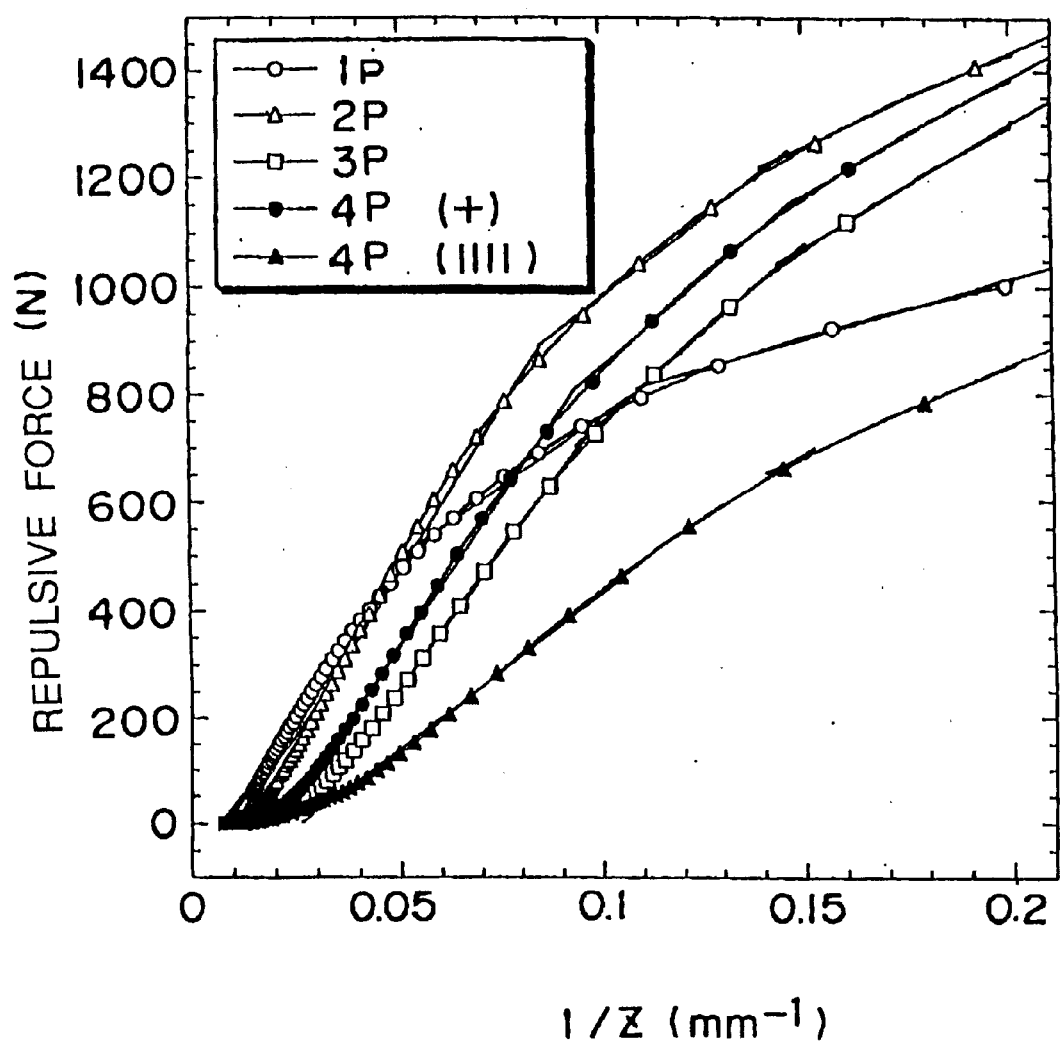
FIG. 3 is a graph depicting a relationship between the distance between two mutually spaced magnets and the repulsive force thereof when the magnets shown in FIGS. 2A to 2E have an opposing area of 75×75 mm$^2$ and a thickness of 20 mm, and like magnetic poles are opposed to each other.

Furthermore, although in the vibration mechanisms M1, M2 shown in FIGS. 49 to 59 a plurality of two-pole magnets 22, 24, 38, 40, 60, 64 are used, other multi-pole magnets shown in FIGS. 2C, 2D, and 2E may be used.

Figure 60:
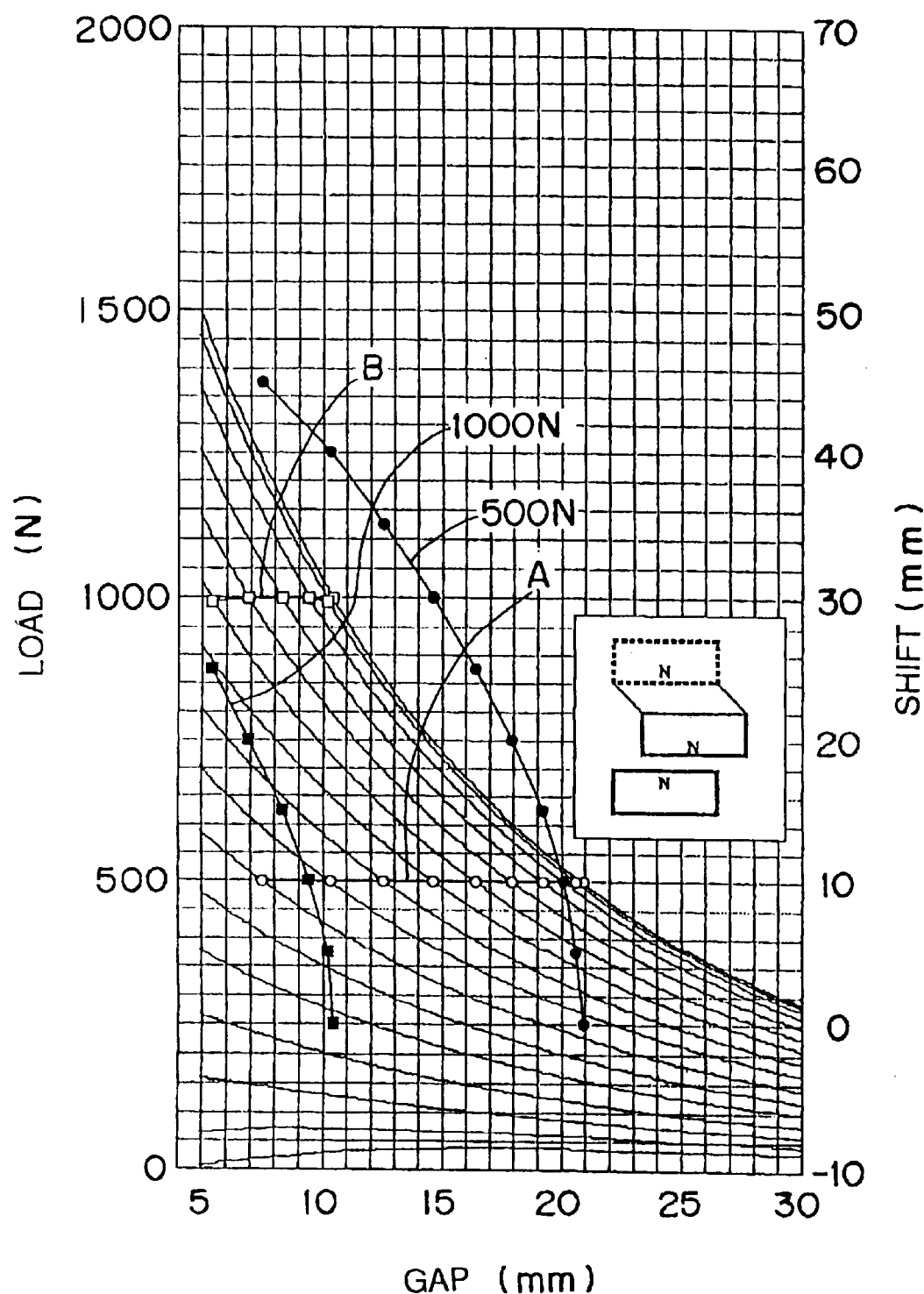
FIG. 60 is a graph depicting a relationship between the load and the gap when one of two single-pole magnets has been moved parallel to the other with like magnetic poles opposed to each other.

FIG. 60 is a graph indicating a relationship between the load and the gap or distance between the magnets when one of the two two-pole magnets having an opposing area of 75×75 mm² and a thickness of 20 mm has been shifted relative to the other in a parallel state with like magnetic poles opposed to each other. The amount of shift was changed by 5 mm in the range of 0–75 mm.

In this graph, lines A and B indicate loads of 500 N and 1000 N, respectively. If one of the magnets is moved relative to the other in a manner in which the relationship between the amount of shift and the amount of gap follows one of those lines (by appropriately selecting the locus of motion), the load can be made constant or the spring constant can be set to nearly zero (k≈0).

Figure 61:
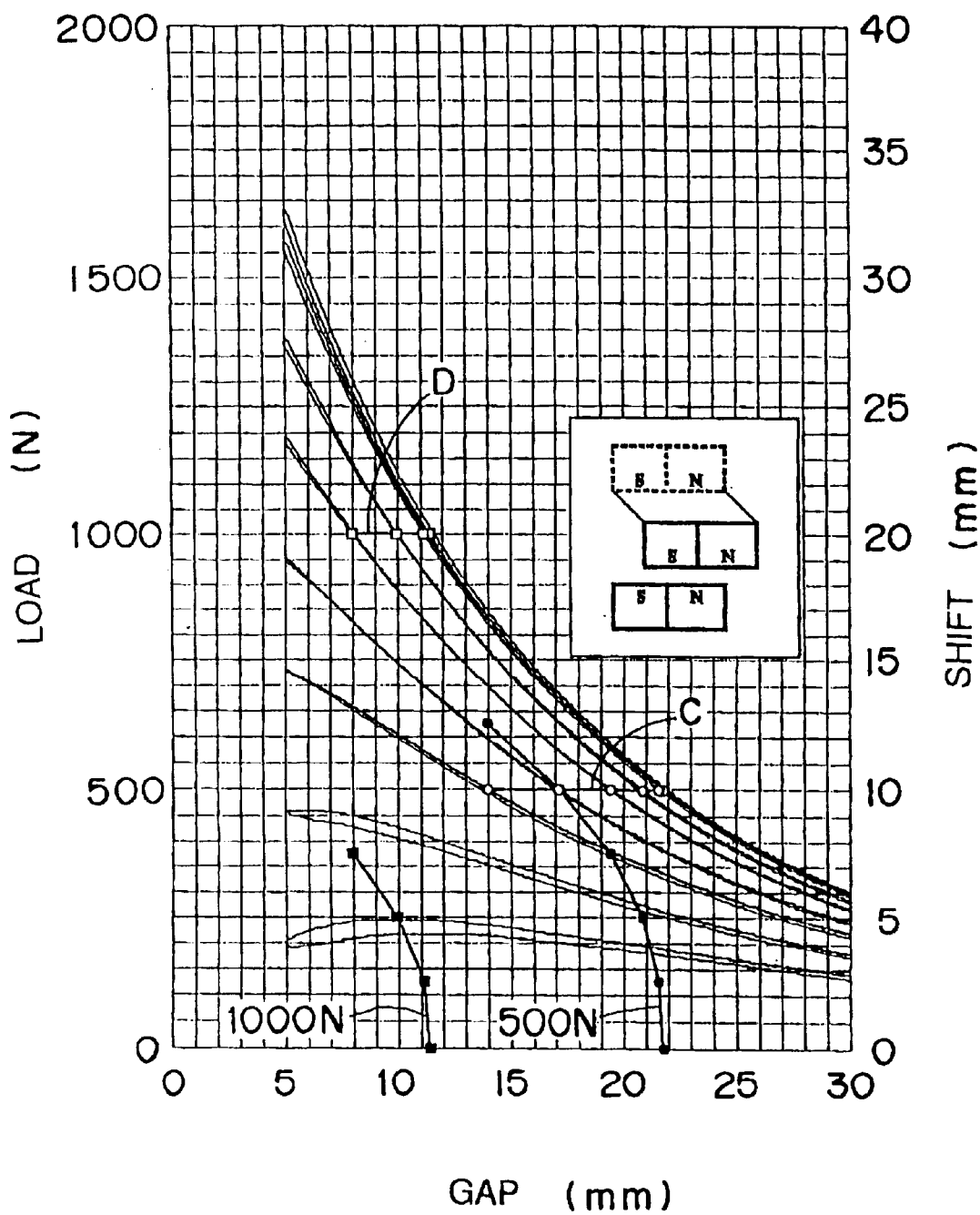
FIG. 61 is a graph depicting a relationship between the load and the gap when one of two two-pole magnets has been moved relative to the other from a state in which like magnetic poles are opposed to each other so that the opposing area of opposite magnetic poles may increase gradually.

FIG. 61 is a graph indicating a relationship between the load and the gap or distance between the magnets when one of the two two-pole magnets having an opposing area of 75×75 mm² and a thickness of 20 mm has been shifted relative to the other from a state in which like magnetic poles are opposed to each other so that the opposing area of opposite magnetic poles may increase gradually. The amount of shift was changed by 2.5 mm in the range of 0–17.5 mm.

In this graph, lines C and D indicate loads of 500 N and 1000 N, respectively. The load can be made constant or the spring constant can be set to nearly zero (k≈0) by appropriately selecting the locus of motion of one of the two-pole magnets relative to the other.

In the case of a repulsive-type magneto-spring, the constant load (the repulsive force given by Equation (2) is constant) is achieved, for example, by increasing the opposing area with an increase in the amount of gap so that the accumulated magnetic energy may be made substantially constant. As shown in FIGS. 60 and 61, the load can be made constant over a wide gap range, making it possible to provide a vibration mechanism having a large stroke.

Figure 62:
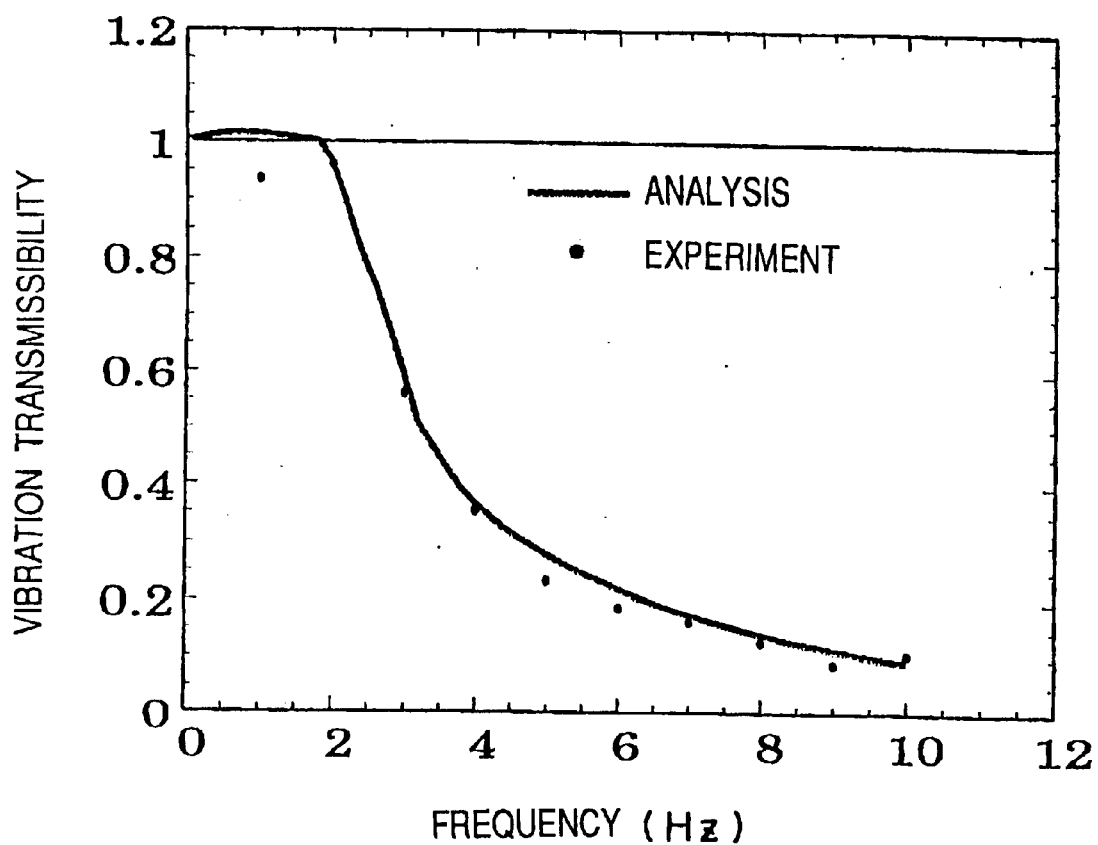
FIG. 62 is a graph depicting the frequency characteristics of a magneto-spring model having a spring constant of substantially zero.
Figure 63:
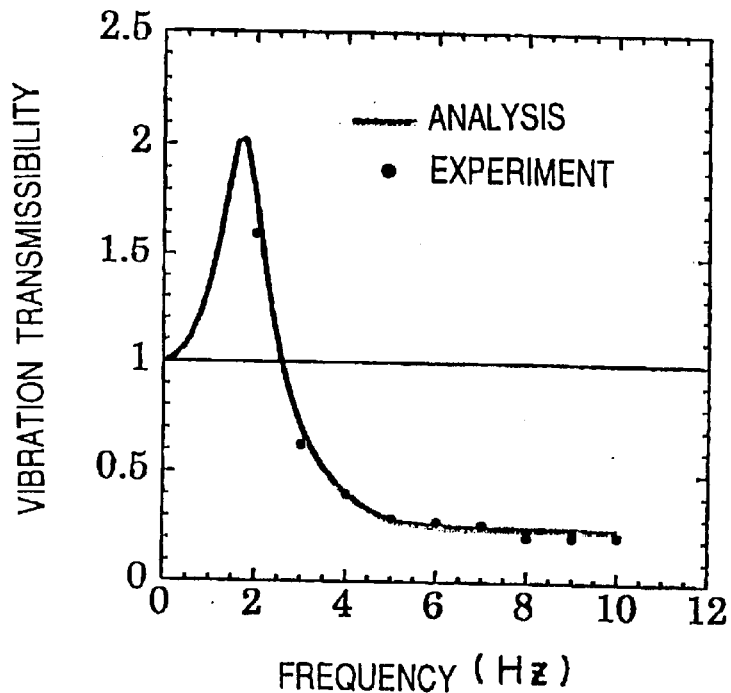
FIG. 63 is a graph depicting the frequency characteristics of a metal spring model.
Figure 64:
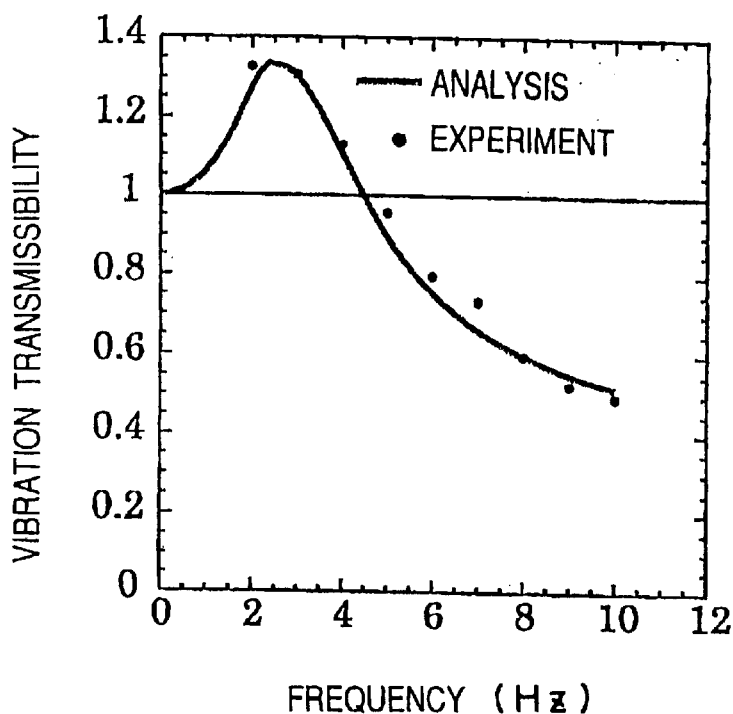
FIG. 64 is a graph depicting the frequency characteristics of a metal spring-damper model.

FIGS. 62, 63 and 64 depict the frequency characteristics of a magneto-spring model having a spring constant of approximately zero, those of a metal spring model, and those of a metal spring-damper model, respectively.

As can be seen from the graphs of FIGS. 62 to 64, the magneto-spring model having a spring constant of approximately zero has no resonant point in the low-frequency region and is, hence, superior in shock absorption, and also provides a good vibration isolating performance even in the high-frequency region, while the metal spring model or the metal spring-damper model has a resonant point in the low-frequency region and is inferior to the magneto-spring model in shock absorption.

Figure 65:
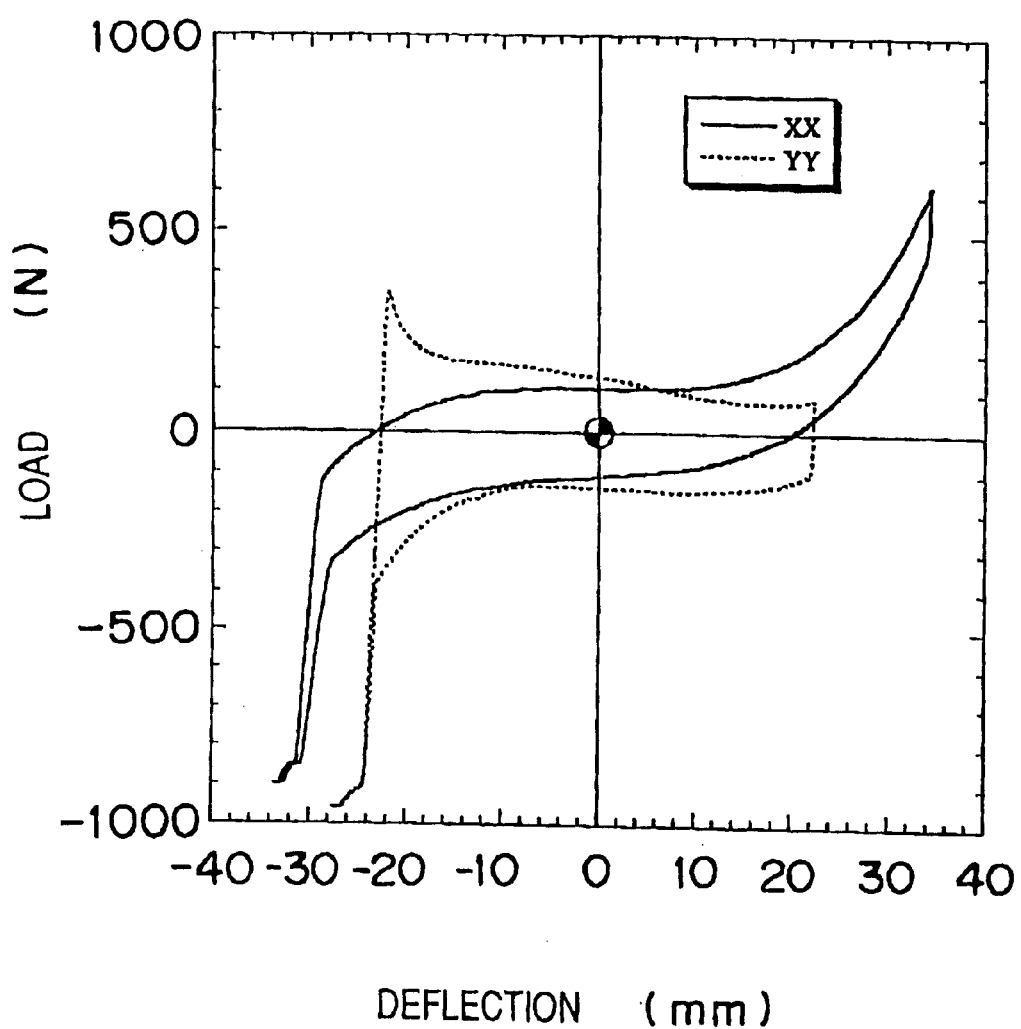
FIG. 65 is a graph depicting the load-deflection characteristics of a VSUM seat when a bottoming (bottom shock) and topping (top shock) buffer has been removed.

FIG. 65 depicts the load-deflection characteristics (measured vales) of vibration models in the form of XX or YY. The model XX has two X-shaped links on each side of the vibration model of FIG. 20, wherein the mounting angle of the magnets is 0° and the stroke between the top and bottom dead centers is 70 mm.

The model YY has two Y-shaped links on each side of the vibration model, as shown in FIG. 20, wherein the mounting angle of the magnets is 10° and the stroke between the top and bottom dead centers is 50 mm. The model XX has a smaller hysteresis loss including structural damping and frictional damping than that of the model YY.

In FIG. 65, when the spring constant of the model XX is expressed by g(x), it is given by:

$$g(x)=k_1 x+k_3 x^3$$

$$k_1=50 \text{ N/m}$$

$$k_3=11\times 10^6 \text{ N/m} \tag{27}$$

Although the state in which the spring constant is approximately zero is made by combining metal springs and a magneto-spring, the stroke is large because the metal springs are used.

When the hysteresis loss and the coefficient of friction are expressed by F and α, respectively, the equation of motion is given by:

$$m\ddot{x} + c(\dot{x} - \dot{y}) + k_1(x - y) + k_3(x - y)^3 + \tag{28}$$

$$\frac{4}{\pi} Fa\left(\cos\omega t - \frac{1}{3}\cos 3\omega t + \frac{1}{5}\cos 5\omega t \cdots \right) +$$

$$h_1(x - y) + h_3(x - y)^3 = 0$$

Figure 66:
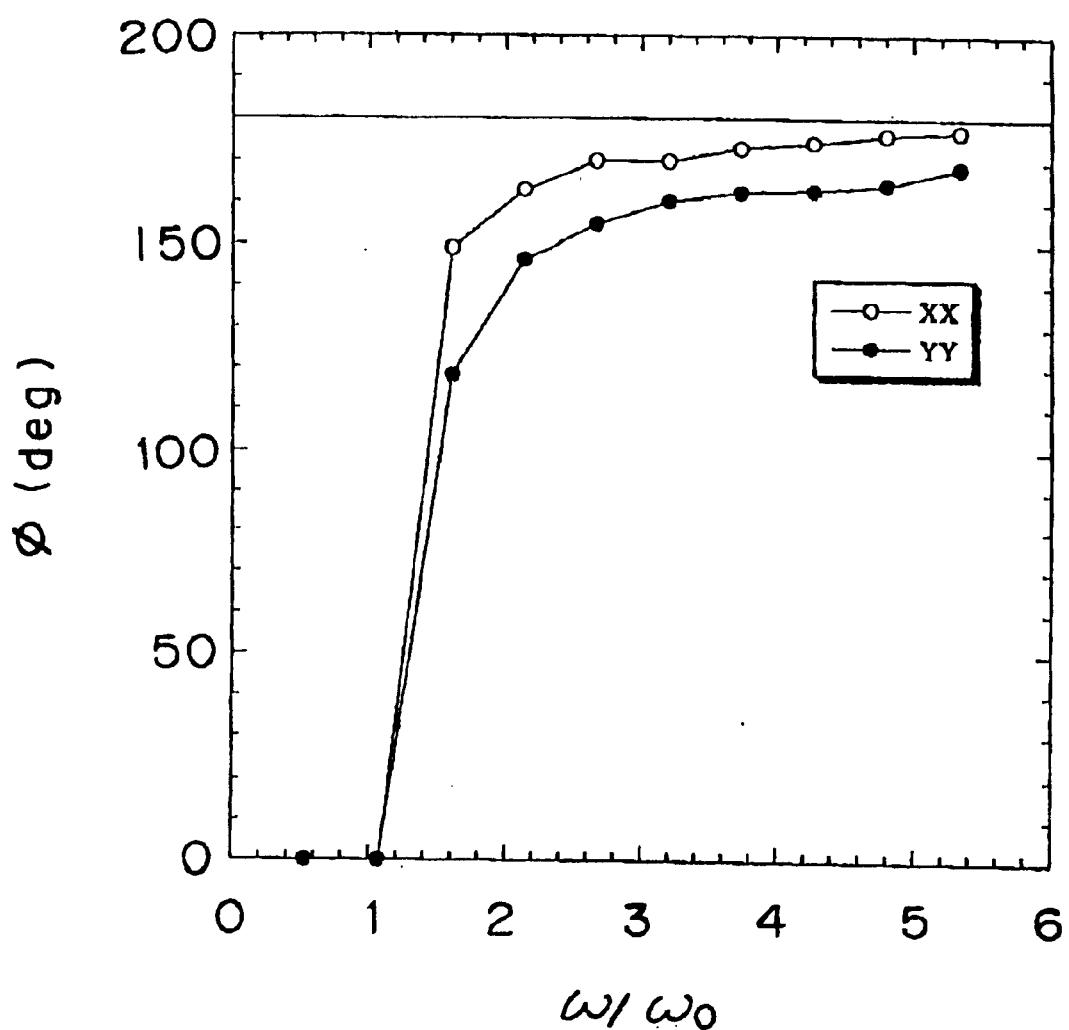
FIG. 66 is a graph depicting phase curves when a sine wave having a constant amplitude has been input.

FIG. 66 depicts phase curves (analyzed values) when a sine wave having a fixed amplitude with a forced deflection of $y=6\times 10^{-3}$ m has been input. When the hysteresis loss is reduced, the phase curve shifts from [YY] to [XX]. Accordingly, an anti-phase occurs easily even in the low-frequency region, reducing the vibration transmissibility and improving the vibration isolating performance. The phase shift ($\phi$) is given by:

$$\phi = \tan^{-1}\left(\frac{ca\omega}{ka + \frac{3}{4}k\beta a^3 - ma\omega^2}\right) \tag{29}$$

Figure 67:
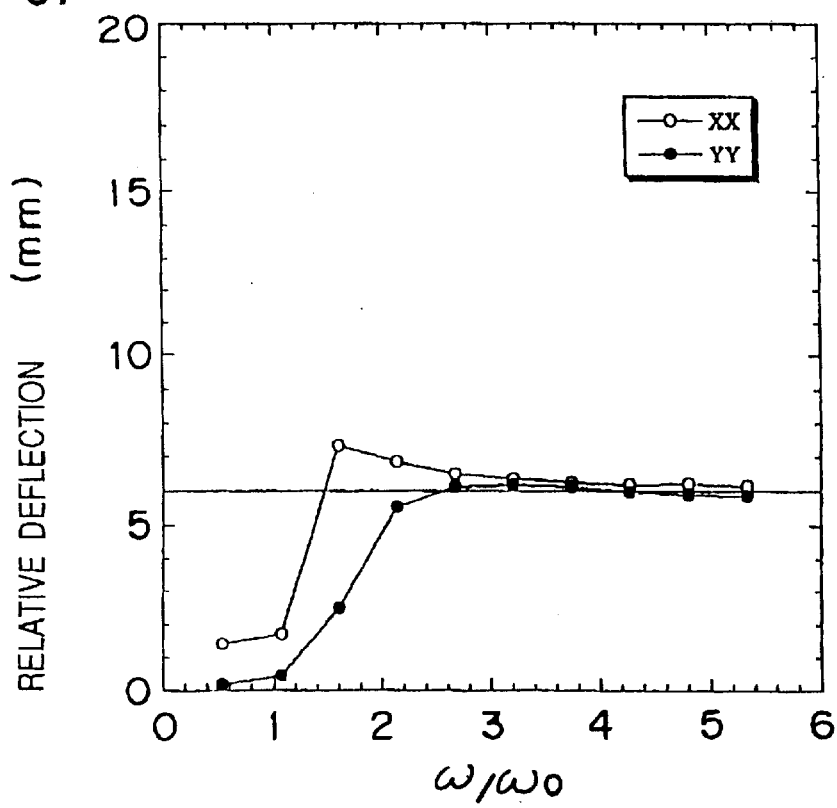
FIG. 67 is a graph depicting relative deflection curves obtained by deflection excitation when a sine wave having a constant amplitude has been input.

FIG. 67 depicts relative deflection curves (measured values) obtained by deflection excitation when a sine wave having a fixed amplitude with a forced deflection of $y=6\times 10^{-3}$ m has been input. The relative displacement is affected by the hysteresis loss.

Figure 68:
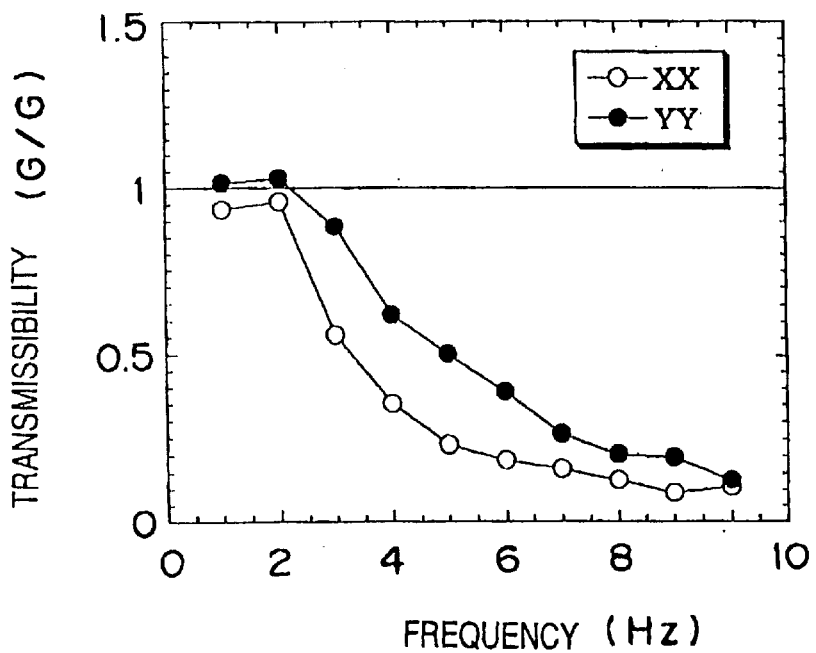
FIG. 68 is a graph depicting resonance curves when a sine wave having a constant amplitude has been input.
Figure 69A:
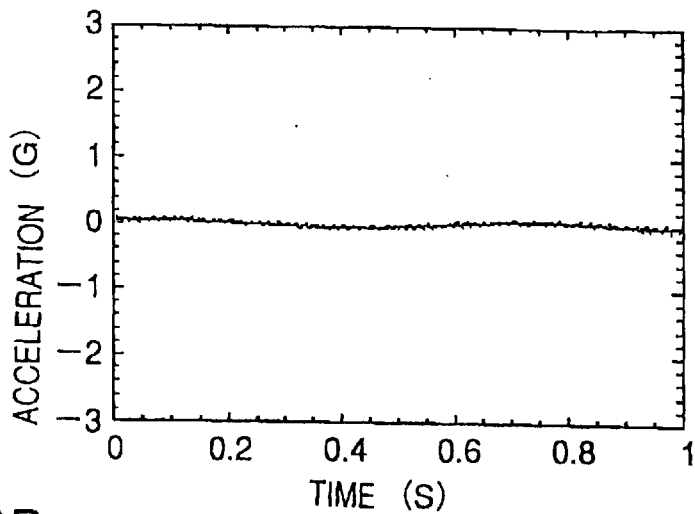
FIG. 69A is a graph depicting a relationship between input acceleration and output acceleration when vibration of an amplitude of 12 mm and a frequency of 1 Hz has been input to a VSUM seat.
Figure 69B:
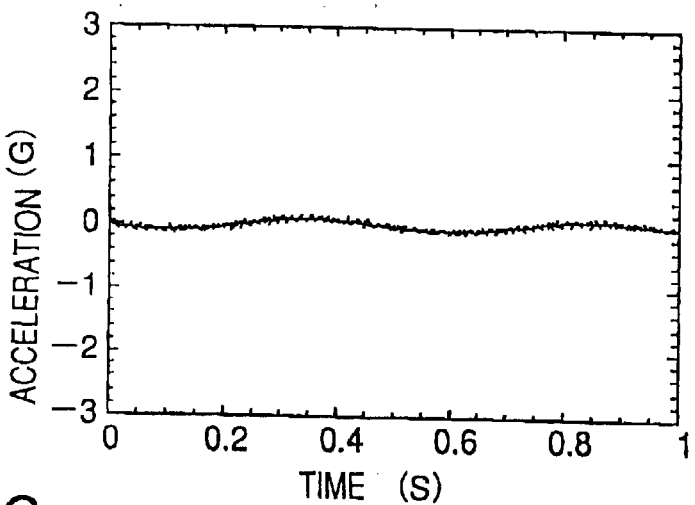
FIG. 69B is a graph similar to FIG. 69A, but depicting a relationship when vibration of an amplitude of 12 mm and a frequency of 2 Hz has been input.
Figure 69C:
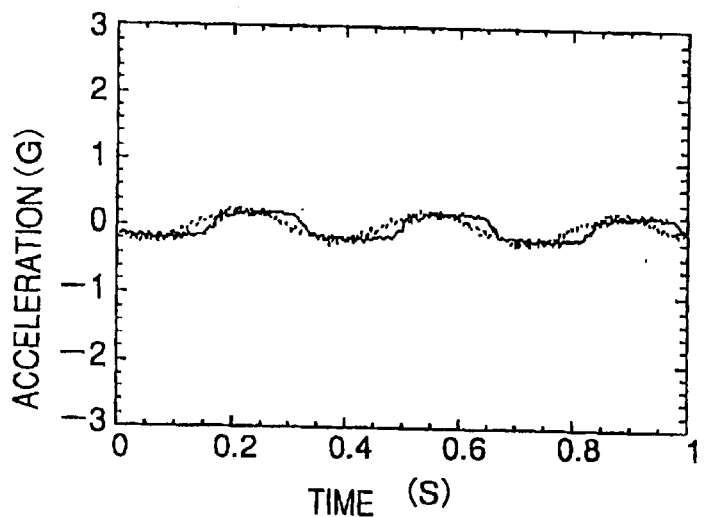
FIG. 69C is a graph similar to FIG. 69A, but depicting a relationship when vibration of an amplitude of 12 mm and a frequency of 3 Hz has been input.
Figure 70A:
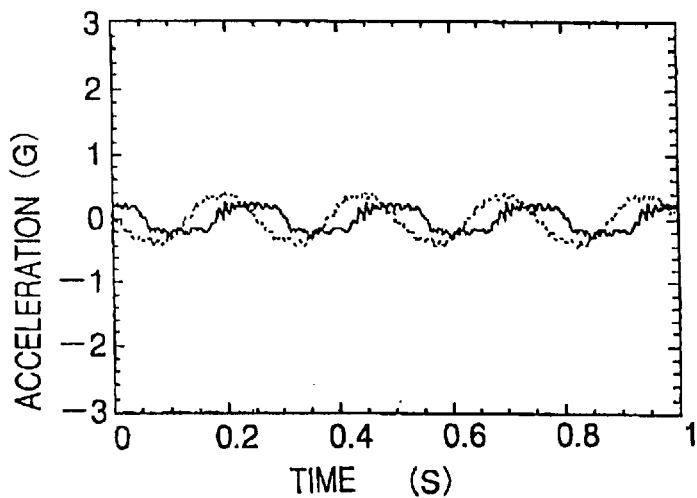
FIG. 70A is a graph similar to FIG. 69A, but depicting a relationship when vibration of an amplitude of 12 mm and a frequency of 4 Hz has been input.
Figure 70B:
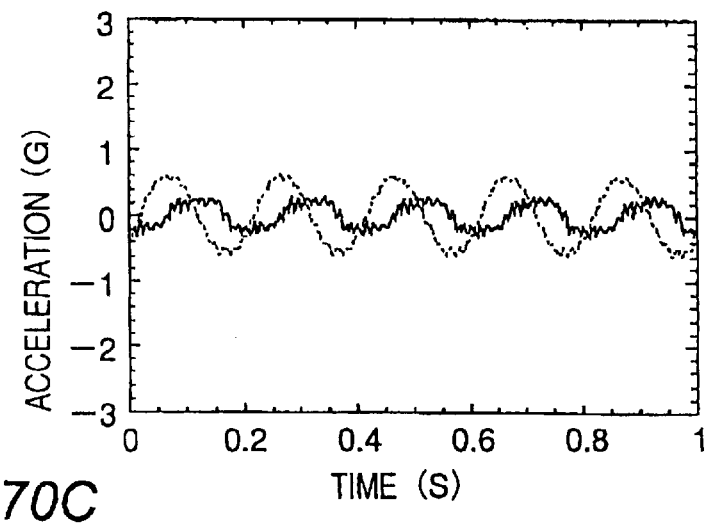
FIG. 70B is a graph similar to FIG. 69A, but depicting a relationship when vibration of an amplitude of 12 mm and a frequency of 5 Hz has been input.
Figure 70C:
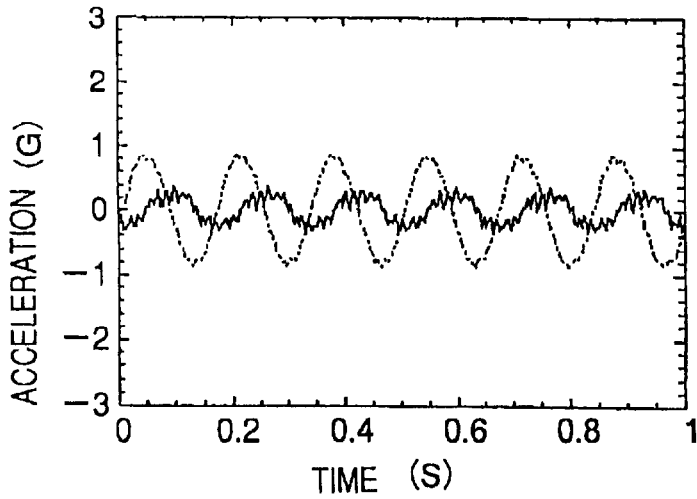
FIG. 70C is a graph similar to FIG. 69A, but depicting a relationship when vibration of an amplitude of 12 mm and a frequency of 6 Hz has been input.
Figure 71A:
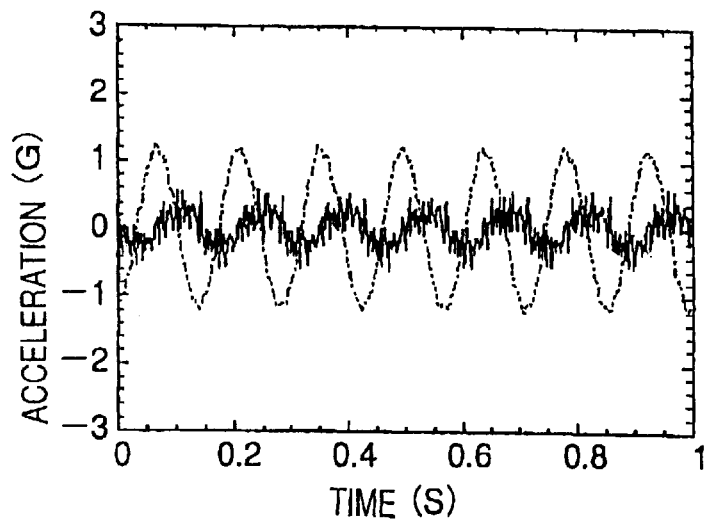
FIG. 71A is a graph similar to FIG. 69A, but depicting a relationship when vibration of an amplitude of 12 mm and a frequency of 7 Hz has been input.
Figure 71B:
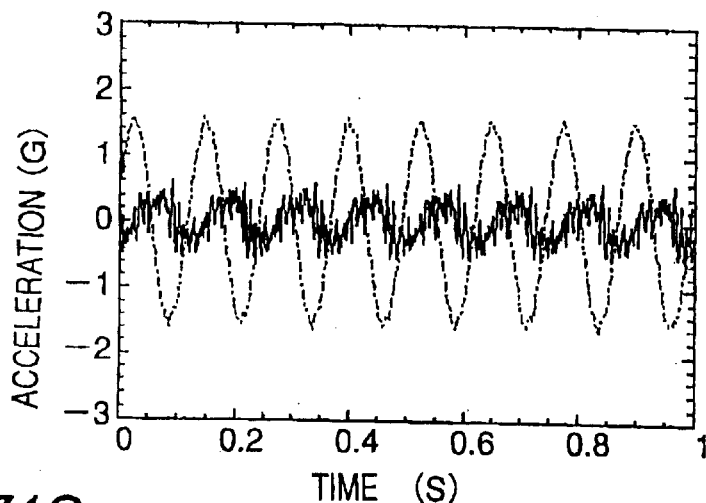
FIG. 71B is a graph similar to FIG. 69A, but depicting a relationship when vibration of an amplitude of 12 mm and a frequency of 8 Hz has been input.
Figure 71C:
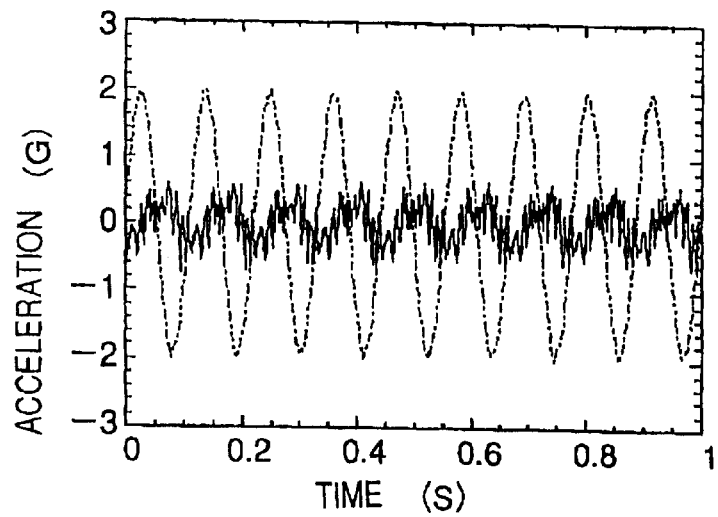
FIG. 71C is a graph similar to FIG. 69A, but depicting a relationship when vibration of an amplitude of 12 mm and a frequency of 9 Hz has been input.
Figure 72:
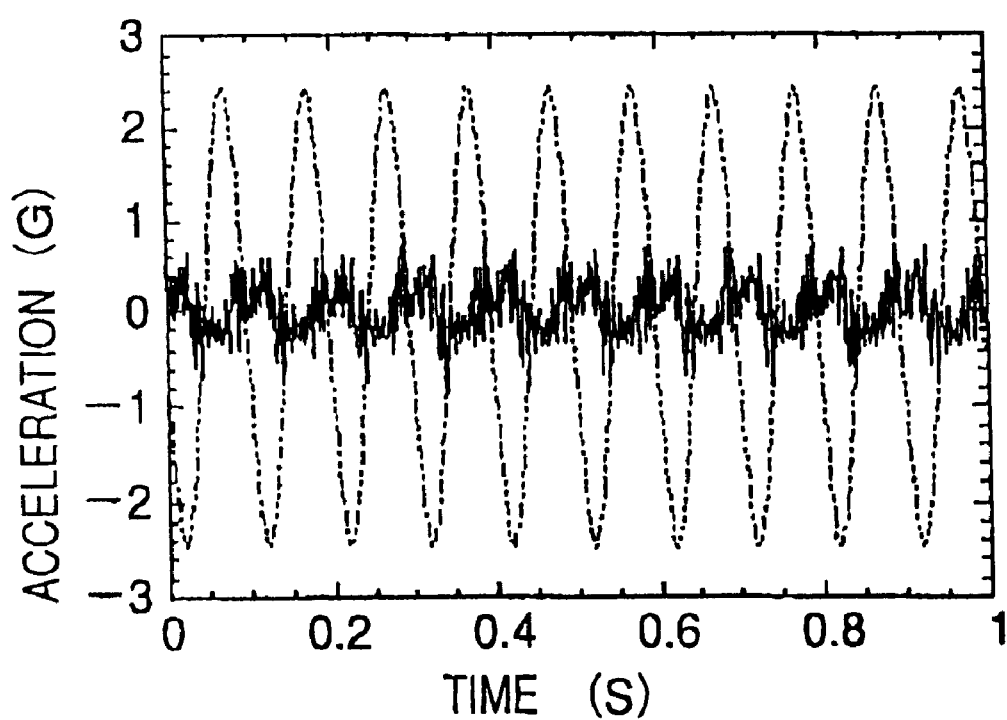
FIG. 72 is a graph similar to FIG. 69A, but depicting a relationship when vibration of an amplitude of 12 mm and a frequency of 10 Hz has been input.
Figure 73A:
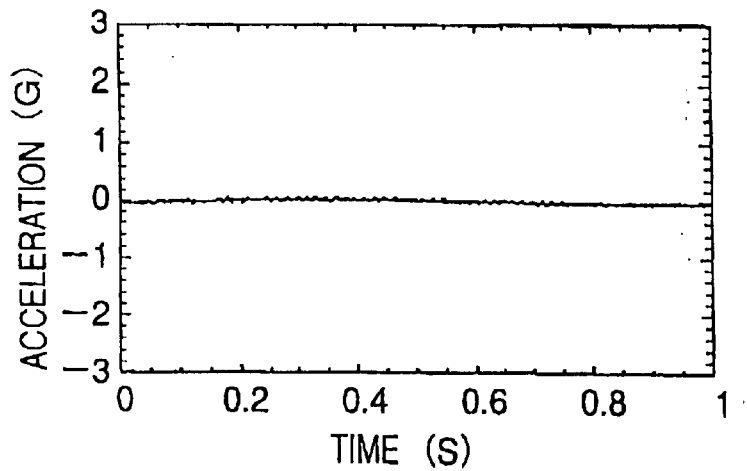
FIG. 73A is a graph depicting a relationship between input acceleration and output acceleration when vibration of an amplitude of 12 mm and a frequency of 1 Hz has been input to another VSUM seat.
Figure 73B:
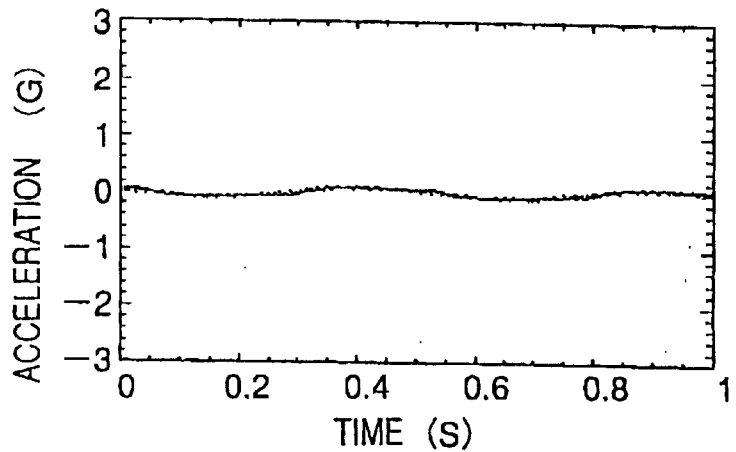
FIG. 73B is a graph similar to FIG. 73A, but depicting a relationship when vibration of an amplitude of 12 mm and a frequency of 2 Hz has been input.
Figure 73C:
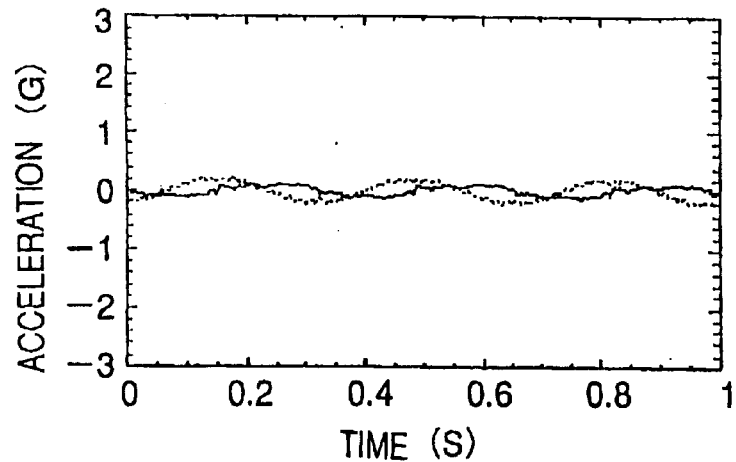
FIG. 73C is a graph similar to FIG. 73A, but depicting a relationship when vibration of an amplitude of 12 mm and a frequency of 3 Hz has been input.
Figure 74A:
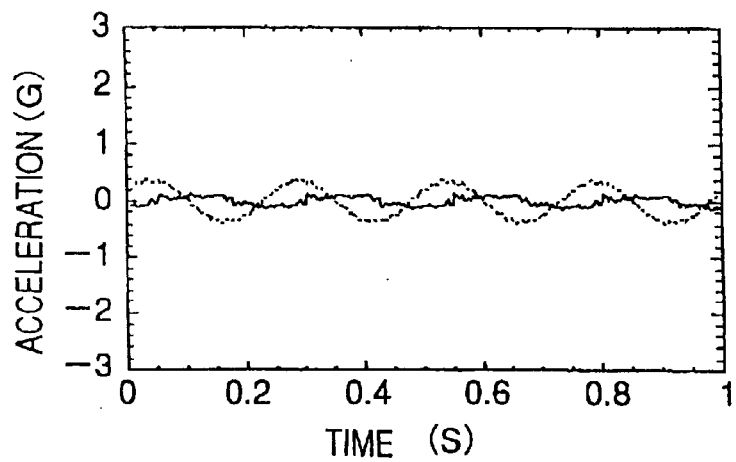
FIG. 74A is a graph similar to FIG. 73A, but depicting a relationship when vibration of an amplitude of 12 mm and a frequency of 4 Hz has been input.
Figure 74B:
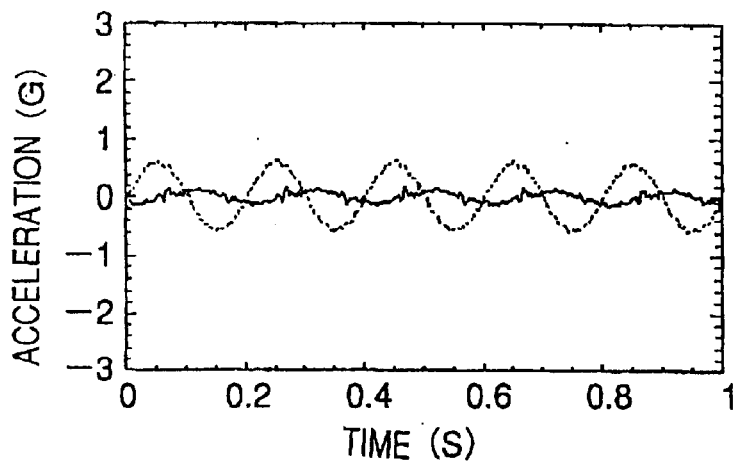
FIG. 74B is a graph similar to FIG. 73A, but depicting a relationship when vibration of an amplitude of 12 mm and a frequency of 5 Hz has been input.
Figure 74C:
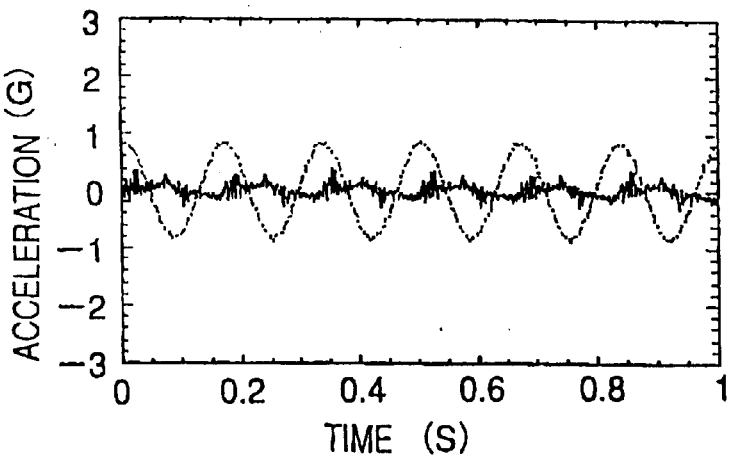
FIG. 74C is a graph similar to FIG. 73A, but depicting a relationship when vibration of an amplitude of 12 mm and a frequency of 6 Hz has been input.
Figure 75A:
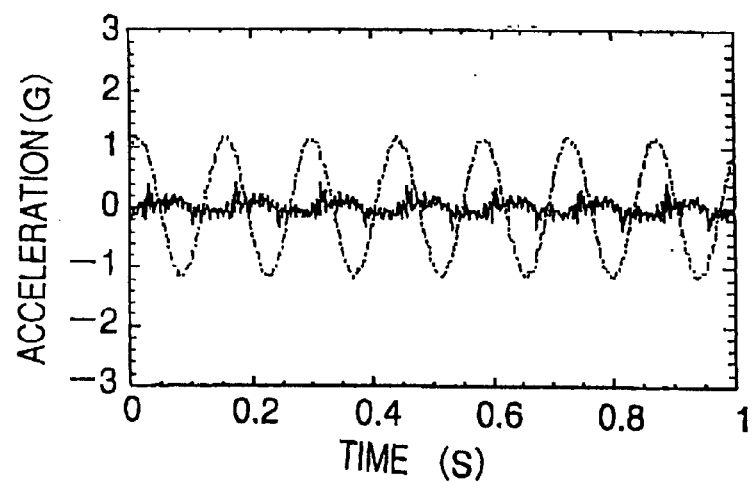
FIG. 75A is a graph similar to FIG. 73A, but depicting a relationship when vibration of an amplitude of 12 mm and a frequency of 7 Hz has been input.
Figure 75B:
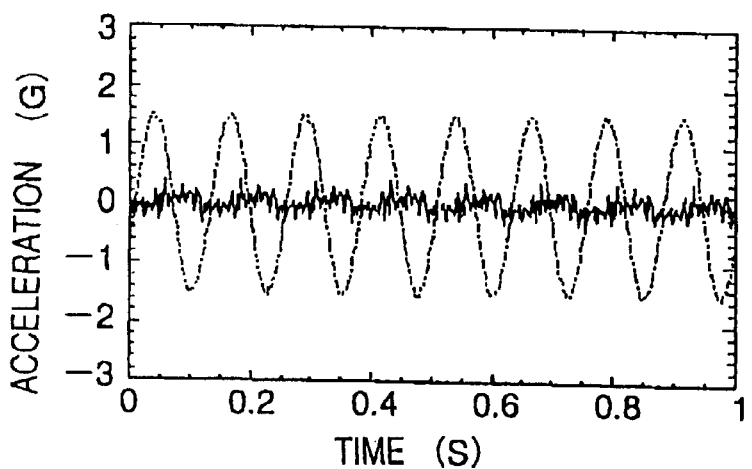
FIG. 75B is a graph similar to FIG. 73A, but depicting a relationship when vibration of an amplitude of 12 mm and a frequency of 8 Hz has been input.
Figure 75C:
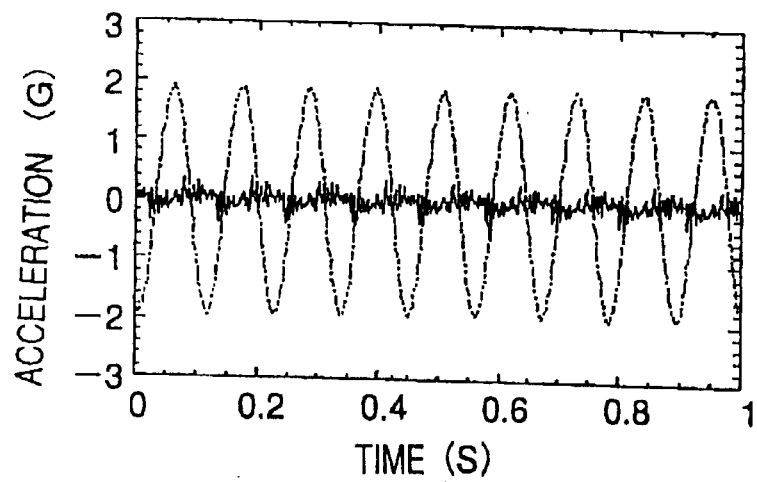
FIG. 75C is a graph similar to FIG. 73A, but depicting a relationship when vibration of an amplitude of 12 mm and a frequency of 9 Hz has been input.
Figure 76:
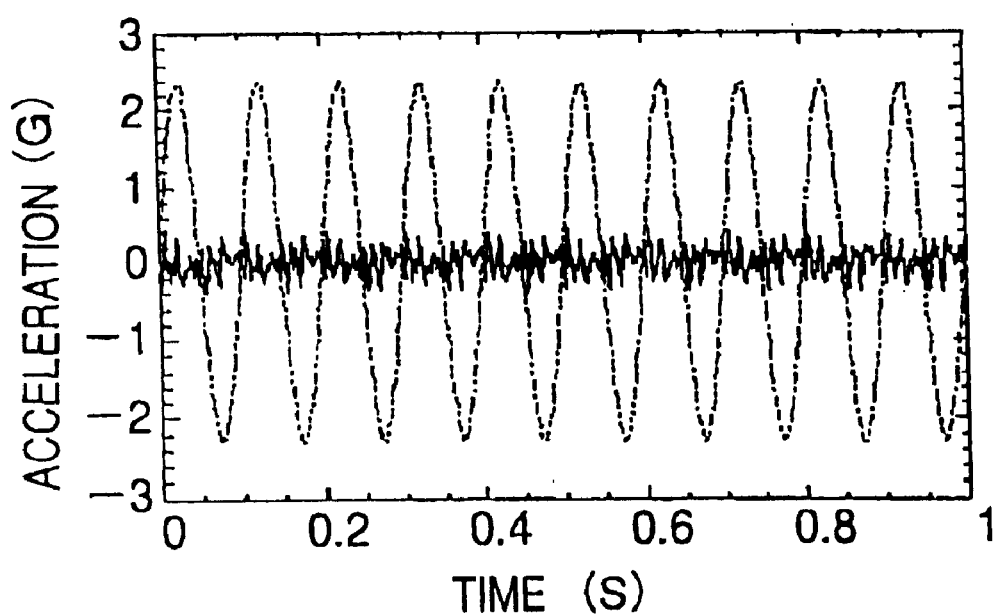
FIG. 76 is a graph similar to FIG. 73A, but depicting a relationship when vibration of an amplitude of 12 mm and a frequency of 10 Hz has been input.

FIG. 68 depicts resonance curves (measured values) when a sine wave having a fixed amplitude with a forced deflection of $y=6\times 10^{-3}$ m has been input. Because the strength of stability around the equilibrium point or balanced point is minimized, the hysteresis loss has a significant effect on the acceleration transmissibility.

It is to be noted that the experimental values and the vibration transmissibility were calculated from the vertical acceleration on the platform of the exciter and the vertical acceleration of a loaded mass of 100 kg on the model XX or YY. The relative deflection becomes approximately equal to the input amplitude by making use of damping by a phase difference after the resonant point in a very small vibration region up to 1 Hz, and by excitation caused by a leakage magnetic field in a region over 1 Hz. The phase shift exceeds 150°, which is close to the anti-phase. With a reduction in hysteresis, the hardened spring characteristics having a spring constant of quasi-zero and soft non-linearity cause phase curves and relative deflection curves to move to a low-frequency region. As a result, the phase shift and relative deflection become large, and a state close to the anti-phase is created, thus reducing the vibration level. The damping by disturbance cancellation exhibits a high vibration isolating performance throughout the entire frequency region, compared with the conventional viscous damping. As shown in FIG. 68, the vibration transmissibility is smaller than 1.0, resulting in non-resonance.

FIGS. 69A–69C, FIGS. 70A–70C. FIGS. 71A–71C, and FIG. 72 depict relationships between input acceleration and output acceleration when vibration having an amplitude of 12 mm and a frequency of 1–10 Hz has been input to the model YY. Even if the input acceleration varies, the output acceleration varies little and, hence, it can be seen that the model YY is superior in vibration absorption.

FIGS. 73A–73C, FIGS. 74A–74C, FIGS. 75A–75C, and FIG. 76 depict relationships between input acceleration and output acceleration when vibration having an amplitude of 12 mm and a frequency of 1–10 Hz has been input to the model XX. In connection with the hysteresis loss, the vibration transmissibility of the model XX is smaller than that of the model YY.

FIG. 77 depicts analyzed values and actually measured values of the relative deflection caused by deflection excitation when a sine wave having a constant amplitude with a forced deflection of $y=6\times 10^{-3}$ m has been input. It can be seen from this graph that they coincide with each other as a whole $\omega/\omega_0$ is given by:

$$\left(\frac{\omega}{\omega_0}\right)^2 = \frac{1}{a^2 - Y^2}\left[\left\{\frac{3}{4}\beta a^4 + (1 - 2\varsigma^2)a^2 - \frac{4F\alpha Y}{\pi k}\right\}^2 \pm \right. \tag{30}$$

$$\left. a\sqrt{\left(\frac{3}{16}\beta Y^2 - \varsigma^2\right)3\beta a^4 + \left\{4\varsigma^2(\varsigma^2 - 1) - \frac{3}{2}\beta Y\left(\frac{4F\alpha}{\pi k} - Y\right)^2\right\}a^2 + \left(\frac{4F\alpha}{\pi k} - Y\right)^2 + \frac{16F\alpha Y}{\pi k}\varsigma^2}\right]$$

Figure 78:
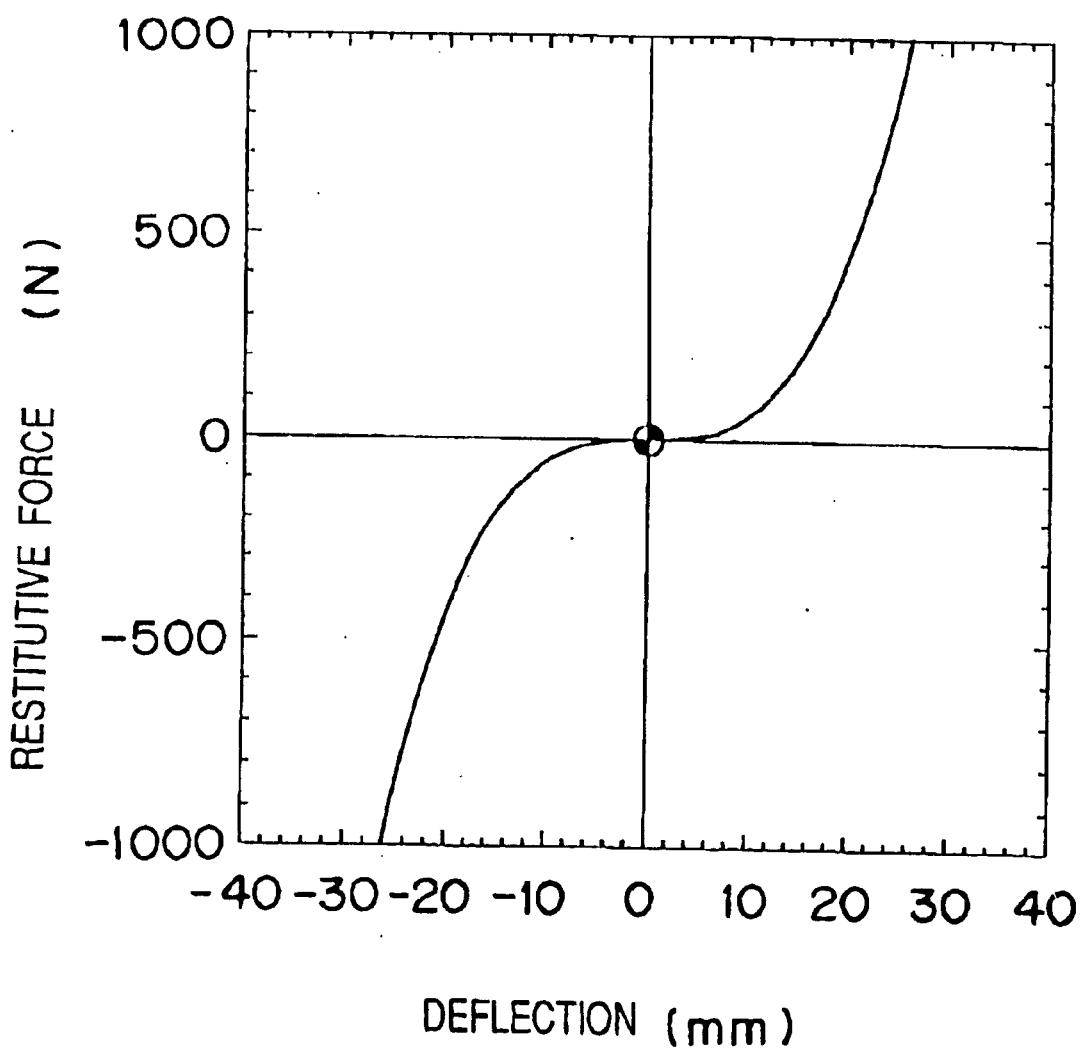
FIG. 78 is a graph depicting the non-linear characteristics when the spring constant has been set substantially zero by only a magneto-spring.

FIG. 78 depicts non-linear characteristics obtained by setting the spring constant to be substantially zero with only a magneto-spring, as in the vibration mechanism M1 shown in FIGS. 49 to 53 and the vibration mechanism M2 shown in FIGS. 54 to 59. The magnetic energy accumulated between opposing repulsive magnets can be made constant by controlling the opposing area of and the distance between the magnets, i.e., by making the repulsive force given by Equation (2) constant, making it possible to obtain hardened non-linear spring characteristics. When the spring constant in such characteristics is g(x), $$g(x) = k_1 x + k_3 x^3$$

$$k_1 = 50 \text{ N/m}$$

$$k_3 = 55\times 10^6 \text{ N/m} \tag{31}$$

FIG. 79 depicts relative deflection curves (analyzed values) obtained by deflection excitation when a sine wave having a constant amplitude with a forced deflection of $y=6\times 10^{-3}$ m has been input to the non-linear characteristics in which the spring constant is set to substantially zero with the use of only a magneto-spring. The relative deflection occurs in a low-frequency region, and improvement in vibration transmissibility is expected in the low-frequency region.

In that case, the equation of motion and $\omega/\omega_0$ are given by:

$$m\ddot{x} + c(\dot{x} - \dot{y}) + k_1(x - y) + k_3(x - y)^3 + h_1(x - y) + h_3(x - y)^3 = 0 \tag{32}$$

$$\left(\frac{\omega}{\omega_0}\right)^2 = \frac{a^2}{a^2 - Y^2}\left[1 + \frac{3}{4}\beta a^2 - 2\varsigma^2 \pm \right. \tag{33}$$

$$\left. \sqrt{\left[\frac{Y}{a}\left(1 + \frac{3}{4}\beta a^2\right)\right]^2 - 3\beta a^2\varsigma^2 - 4\varsigma^2(1 - \varsigma^2)}\right]$$

FIG. 80 depicts phase curves (analyzed values) when a sine wave having a constant amplitude with a forced deflection of $y=6\times 10^{-3}$ m has been input to the non-linear characteristics in which the spring constant is set to substantially zero with the use of only a magneto-spring. It can be seen from this graph that the anti-phase easily occurs even in a low-frequency region by reducing the hysteresis loss to improve the stability, thus reducing the vibration transmissibility and improving the vibration isolating performance.

Figure 81:
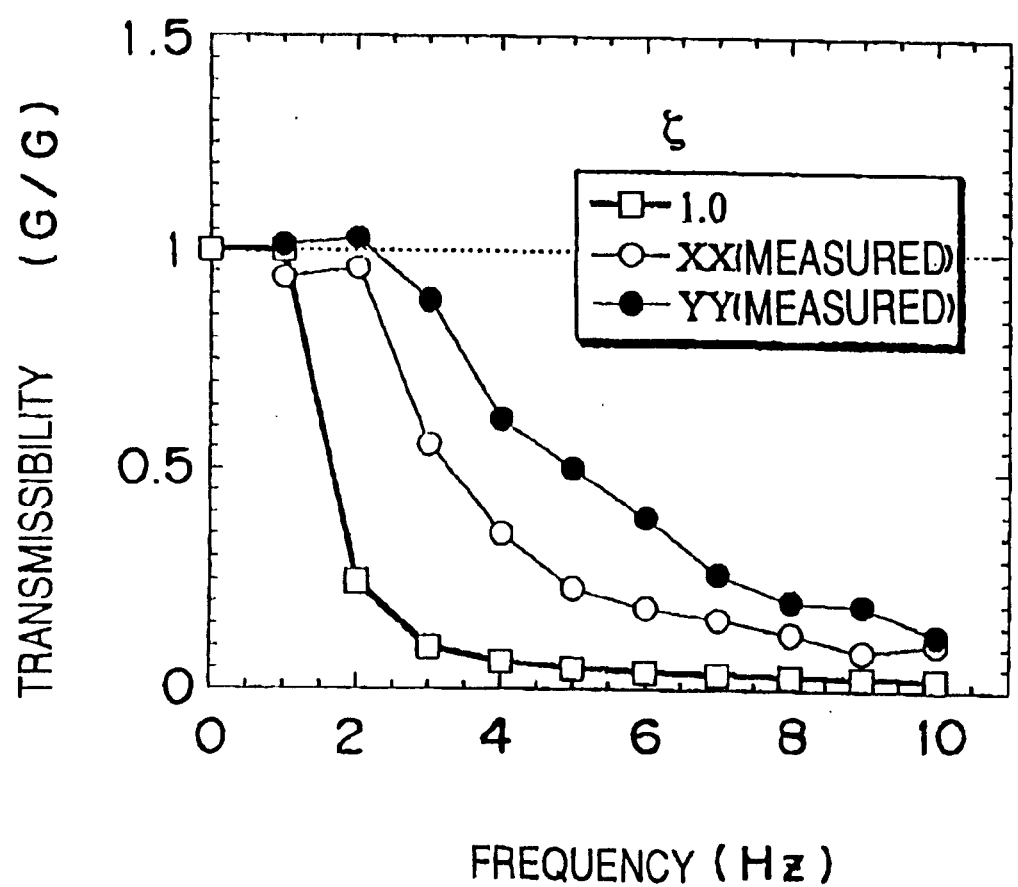
FIG. 81 is a graph depicting resonance curves when a sine wave having a constant amplitude has been input to the non-linear characteristics obtained by setting the spring constant substantially zero with the use of only a magneto-spring.
Figure 82A:
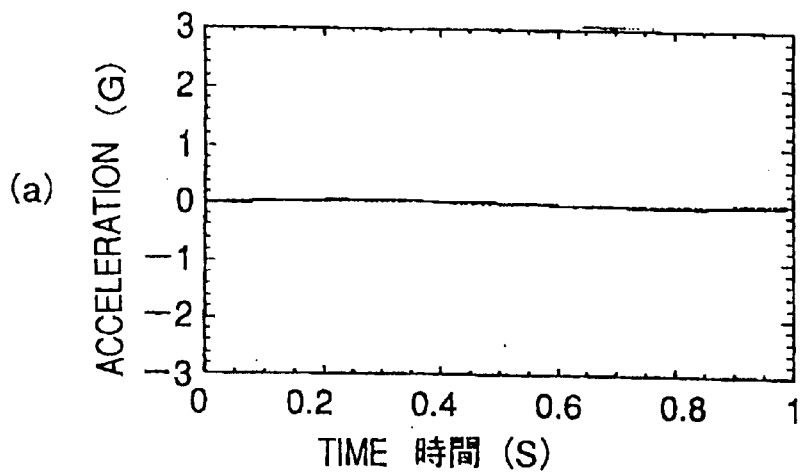
FIG. 82A is a graph depicting a relationship between input acceleration and output acceleration when vibration of an amplitude of 12 mm and a frequency of 1 Hz has been input to the non-linear characteristics obtained by setting the spring constant substantially zero with the use of only a magneto-spring.
Figure 82B:
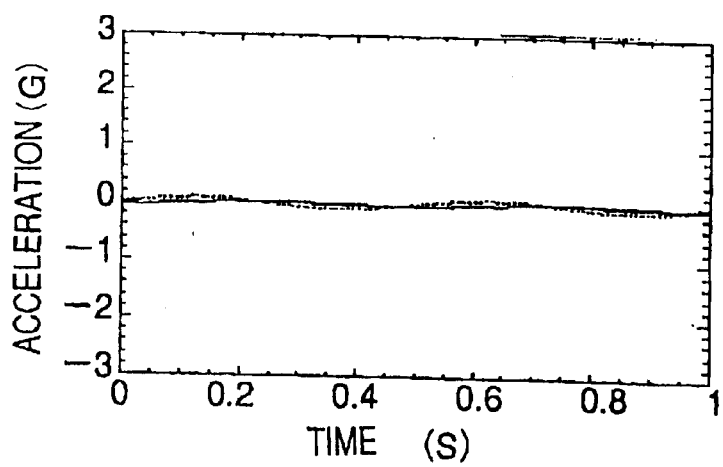
FIG. 82B is a graph similar to FIG. 82A, but depicting a relationship when vibration of an amplitude of 12 mm and a frequency of 2 Hz has been input.
Figure 82C:
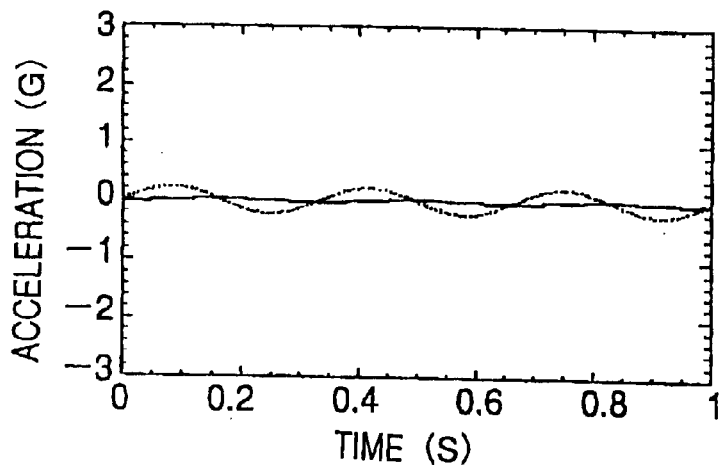
FIG. 82C is a graph similar to FIG. 82A, but depicting a relationship when vibration of an amplitude of 12 mm and a frequency of 3 Hz has been input.
Figure 83A:
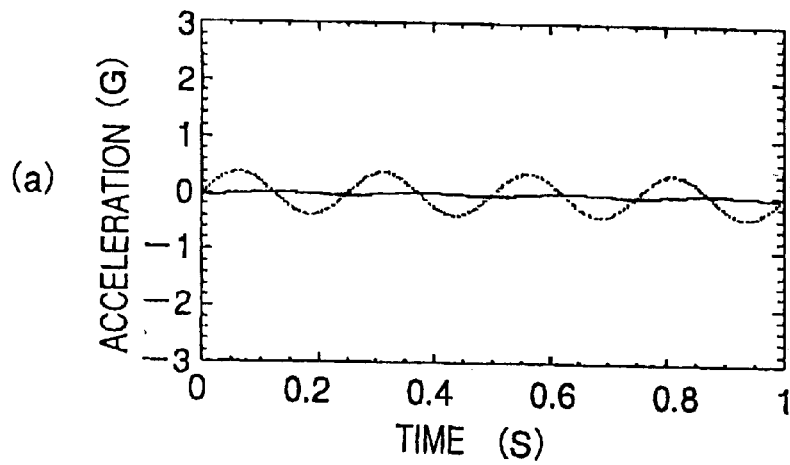
FIG. 83A is a graph similar to FIG. 82A, but depicting a relationship when vibration of an amplitude of 12 mm and a frequency of 4 Hz has been input.
Figure 83B:
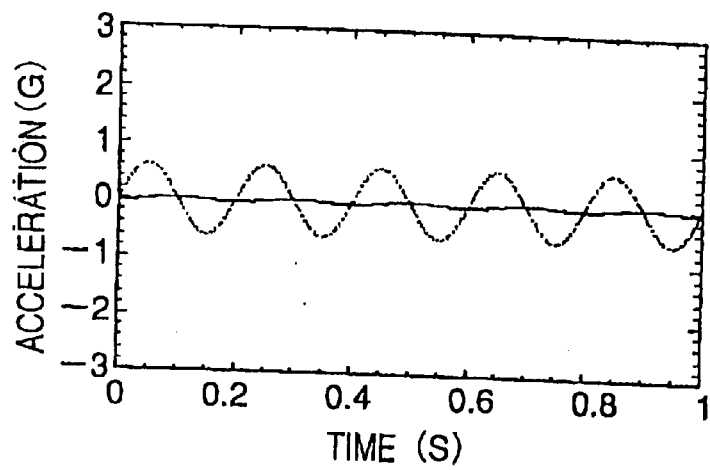
FIG. 83B is a graph similar to FIG. 82A, but depicting a relationship when vibration of an amplitude of 12 mm and a frequency of 5 Hz has been input.
Figure 83C:
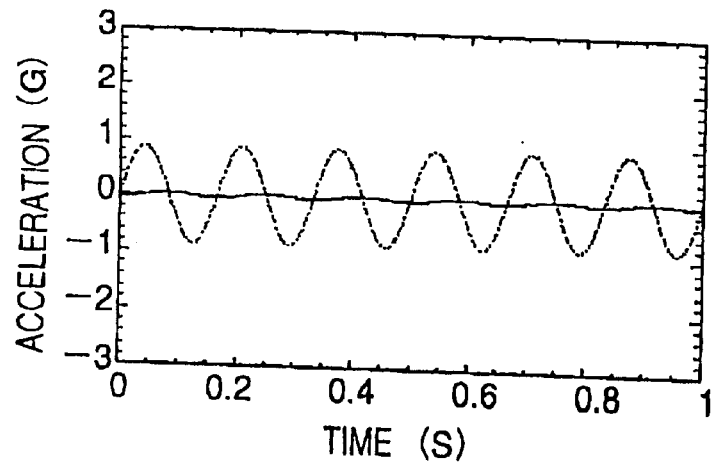
FIG. 83C is a graph similar to FIG. 82A, but depicting a relationship when vibration of an amplitude of 12 mm and a frequency of 6 Hz has been input.
Figure 84A:
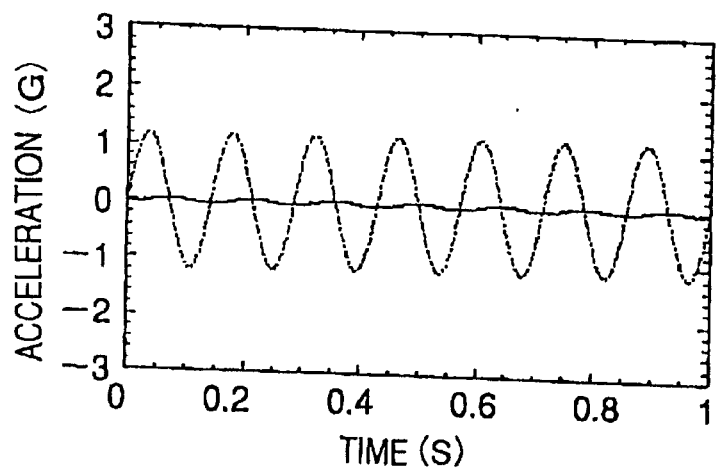
FIG. 84A is a graph similar to FIG. 82A, but depicting a relationship when vibration of an amplitude of 12 mm and a frequency of 7 Hz has been input.
Figure 84B:
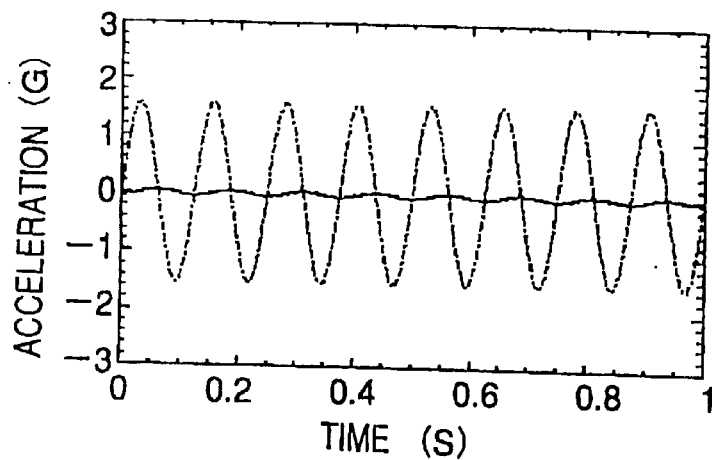
FIG. 84B is a graph similar to FIG. 82A, but depicting a relationship when vibration of an amplitude of 12 mm and a frequency of 8 Hz has been input.
Figure 84C:
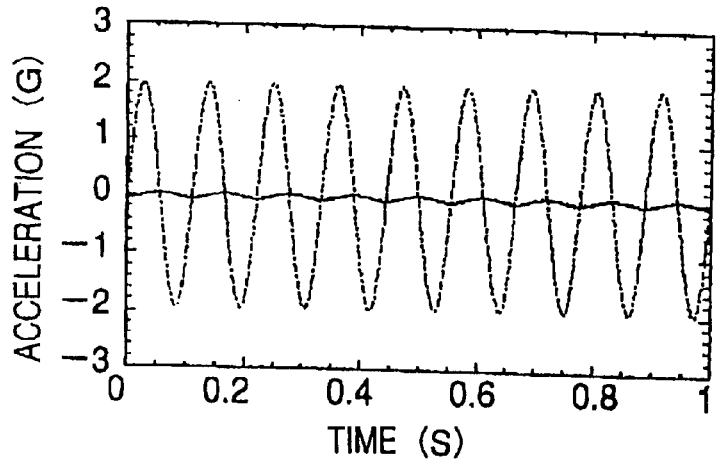
FIG. 84C is a graph similar to FIG. 82A, but depicting a relationship when vibration of an amplitude of 12 mm and a frequency of 9 Hz has been input.
Figure 85:
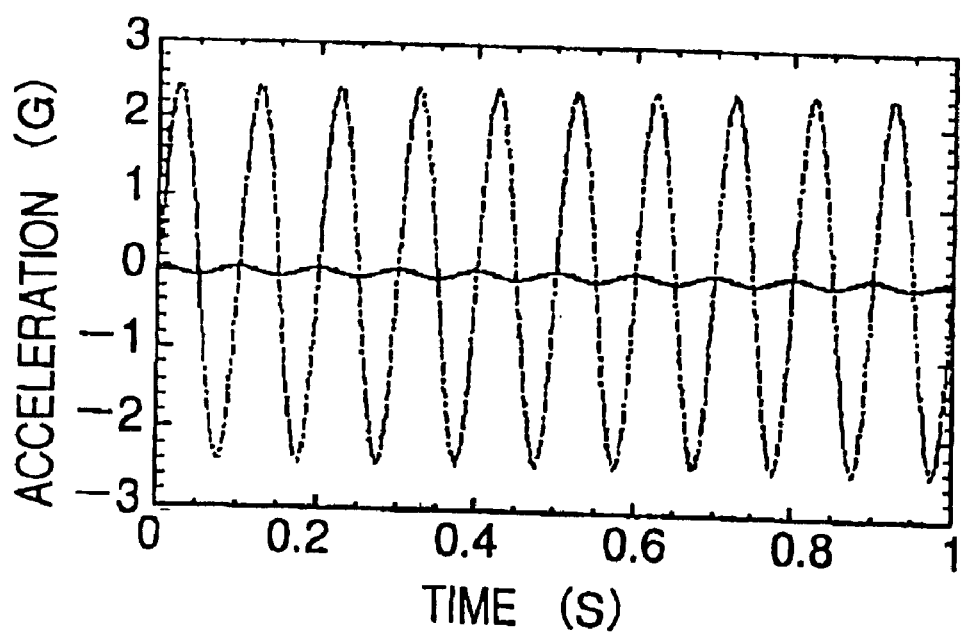
FIG. 85 is a graph similar to FIG. 82A, but depicting a relationship when vibration of an amplitude of 12 mm and a frequency of 10 Hz has been input.

FIG. 81 depicts resonance curves (analyzed values) when a sine wave having a constant amplitude with a forced deflection of y=6×10$^{-3}$ m has been input to the non-linear characteristics in which the spring constant is set to substantially zero with the use of only a magneto-spring. The anti-phase after a resonant point provides a high vibration isolating performance in a low-frequency region.

FIGS. 82A–82C, FIGS. 83A–83C, FIGS. 84A–84C, and FIG. 85 depict relationships (analyzed values when $\zeta=1.0$) between input acceleration and output acceleration when vibration having an amplitude of 12 mm and a frequency of 1–10 Hz has been input to the non-linear characteristics in which the spring constant is set to substantially zero with the use of only a magneto-spring. Even if the input acceleration varies, the output acceleration varies little, thus providing a high vibration isolating performance.

The equation of motion of the non-linear characteristics in which the spring constant is set to substantially zero with the use of only a magneto-spring is explained in detail.

$$m\ddot{x} + c(\dot{x}-\dot{y}) + g(x-y) + \frac{\dot{x}}{|\dot{x}|}h(x-y) = 0 \tag{34}$$

(i) $\dot{x}>0$ (35)

$m\ddot{x}+c(\dot{x}-\dot{y})+k_1(x-y)+k_3(x-y)^3+h_1(x-y)+h_3(x-y)^3=0$ (36)

$\ddot{x}=\ddot{z}+\ddot{y}$ (37)

$m\ddot{z}+c\dot{z}+k_1z+k_3z^3+h_1z+h_3z^3=-m\ddot{y}$ (38)

$k_1+h_1=k \quad \beta=\dfrac{k_3+h_3}{k_1+h_1}$ (39)

$m\ddot{z}+c\dot{z}+k(z+\beta z^3)=-m\ddot{y}$ (40)

(ii) $\dot{x}<0$ (41)

$m\ddot{x}+c(\dot{x}-\dot{y})+k_1(x-y)+k_3(x-y)^3-h_1(x-y)-h_3(x-y)^3=0$ (42)

$\ddot{x}=\ddot{z}+\ddot{y}$ (43)

$m\ddot{z}+c\dot{z}+k_1z+k_3z^3-h_1z-h_3z^3=-m\ddot{y}$ (44)

$k_1-h_1=k \quad \beta=\dfrac{k_3-h_3}{k_1-h_1}$ (45)

$m\ddot{z}+c\dot{z}+k(z+\beta z^3)=-m\ddot{y}$ (46)

When the platform undergoes a simple harmonic motion of $y=Y\cos\omega t$, $\dot{y}=-Y\omega\sin\omega t \quad \ddot{y}=-Y\omega^2\cos\omega t$ (47)

$m\ddot{z}+c\dot{z}+k(z+\beta z^3)=mY\omega^2\cos\omega t$ (48)

Although this vibration is expressed by the sum of a basic component $\omega$ and high-frequency components of a forced vibration, only the basic component is considered here, The solution to the forced vibration is given by:

$z=a\cos(\omega t-\phi)$ (49)

Accordingly, $\dot{z}=-a\omega\sin(\omega t-\phi)$ (50)

$\ddot{z}=-a\omega^2\cos(\omega t-\phi)$ (51)

$-ma\omega^2\cos(\omega t-\phi)-ca\omega\sin(\omega t-\phi)+k[a\cos(\omega t-\phi)+\beta a^3\cos^3(\omega t-\phi)]=mY\omega^2\cos\omega t$ (52)

$(-ma\omega^2+ka+\tfrac{3}{4}k\beta a^3)\cos(\omega t-\phi)-ca\omega\sin(\omega t-\phi)=mY\omega^2\cos(\omega t-\phi)\cos\phi-mY\omega^2\sin(\omega t-\phi)\sin\phi$ (53)

$ma\omega^2+ka+\tfrac{3}{4}k\beta a^3=mY\omega^2\cos\phi$ (54)

$-ca\omega=-mY\omega^2\sin\phi$ (55)

$[ka(1+\tfrac{3}{4}\beta a^2)-ma\omega^2]^2+[ca\omega]^2=[mY\omega^2]^2$ (56)

$m^2(a^2-Y^2)\omega^4-[2ka^2m(1+\tfrac{3}{4}\beta a^2)-c^2a^2]\omega^2+[ka(1+\tfrac{3}{4}\beta a^2)]^2=0$ (57)

$-k(a^2-Y^2)\left[\left(\dfrac{\omega}{\omega_0}\right)^2\right]^2 -$ (58)

$\quad 2k^2\left[a^2+\tfrac{3}{4}\beta a^4-\dfrac{c^2}{2mk}a^2\right]\left(\dfrac{\omega}{\omega_0}\right)^2+k^2a^2\left(1+\tfrac{3}{4}\beta a^2\right)^2=0$ $(a^2-Y^2)\left[\left(\dfrac{\omega}{\omega_0}\right)^2\right]^2 -$ (59)

$\quad 2\left[a^2+\tfrac{3}{4}\beta a^4-2\varsigma^2 a^2\right]\left(\dfrac{\omega}{\omega_0}\right)^2+a^2\left(1+\tfrac{3}{4}\beta a^2\right)^2=0$ $(a^2-Y^2)\left[\left(\dfrac{\omega}{\omega_0}\right)^2\right]^2 -$ (60)

$\quad 2a^2\left[1+\tfrac{3}{4}\beta a^2-2\varsigma^2\right]\left(\dfrac{\omega}{\omega_0}\right)^2+\left[a\left(1+\tfrac{3}{4}\beta a^2\right)\right]^2=0$ $$\left(\dfrac{\omega}{\omega_0}\right)^2 = \dfrac{a^2\left[1+\tfrac{3}{4}\beta a^2-2\varsigma^2\right]\pm\sqrt{a^4\left[1+\tfrac{3}{4}\beta a^2-2\varsigma^2\right]^2-(a^2-Y^2)\left[a\left(1+\tfrac{3}{4}\beta a^2\right)\right]^2}}{a^2-Y^2} \tag{61}$$

When $1+\tfrac{3}{4}\beta a^2=A, \quad |a|\neq Y, \ a\neq 0,$ (62)

$\left(\dfrac{\omega}{\omega_0}\right)^2 = \dfrac{a^2}{a^2-Y^2}\left[A-2\varsigma^2\pm\sqrt{(A-2\varsigma^2)^2-\dfrac{a^2-Y^2}{a^2}A^2}\right]$ (63)

$\left(\dfrac{\omega}{\omega_0}\right)^2 = \dfrac{a^2}{a^2-Y^2}\left[1+\tfrac{3}{4}\beta a^2 - \right.$ (64)

$\quad\left. 2\varsigma^2\pm\sqrt{\left[\dfrac{Y}{a}\left(1+\tfrac{3}{4}\beta a^2\right)\right]^2-3\beta a^2\varsigma^2-4\varsigma^2(1+\varsigma^2)}\right]$ In the present invention, the way of thinking applied to vibrographs, i.e., a method of utilizing a range in which $\omega$ is sufficiently larger than $\omega_0$ in vibration isolation by reducing the natural frequency and a method of disturbance cancellation are both applied to a vibration isolating apparatus under passive control. Hardened spring characteristics have been designed wherein the spring constant is set to quasi-zero around the balanced or equilibrium point by controlling the geometric dimensions of the opposing magnets, and wherein there are provided non-linear spring characteristics in the direction towards the bottom end shock. The vibration isolating effects of such characteristics have been confirmed by analysis and vibration experiments in which a sine wave has been input. As a result, the following conclusions have been obtained.

(1) The passive control system in which a spring constant of quasi-zero and a leakage magnetic field of two-pole magnets are utilized increases the vibration isolating effects in a low-frequency region by reducing the hysteresis loss and enhancing the stability, making it possible to create a non-resonant state.

(2) Even if input acceleration varies in a frequency zone of 1–10 Hz, output acceleration is maintained substantially constant, thus achieving independence of input.

(3) The passive vibration isolator according to the present invention employs disturbance cancellation in which input vibration is cancelled by input vibration by making use of relative deflections and phase shifts, and provides steady vibration characteristics in which variations in acceleration are small with a stroke smaller than 70 mm when a mass of 100 kg is loaded.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A vibration mechanism comprising:

a stationary frame;

a first permanent magnet secured to said stationary frame, wherein said first permanent magnet has a first face, a first magnetic pole of a first polarity on said first face, and a second magnetic pole of a second polarity on said first face;

a movable frame movably mounted with one degree of freedom on said stationary frame; and a second permanent magnet secured to said moveable frame, wherein said second permanent magnet has a second face, a third magnetic pole of the first polarity on said second face, and a fourth magnetic pole of the second polarity on said second face, wherein said first permanent magnet and said second permanent magnet are spaced from each other and oriented such that said first face of said first permanent magnet is opposed to said second face of said second permanent magnet, thereby forming a magneto-spring having a spring constant, and said first and second permanent magnets are inclined with respect to the one degree of freedom of said moveable frame with respect to said stationary frame so that magnetic energy accumulated in the magneto-spring is kept substantially constant and the spring constant is kept substantially zero during movement of said moveable frame with respect to said stationary frame.

2. The vibration mechanism according to claim 1, wherein an opposing area between said first face of said first permanent magnet and said second face of said second permanent magnet is changed when a distance between said first face of said first permanent magnet and said second face of said second permanent magnet is changed.

3. A vibration mechanism comprising:

a stationary frame;

a first permanent magnet secured to said stationary frame, wherein said first permanent magnet has a first face, a first magnetic pole of a first polarity on said first face, and a second magnetic pole of a second polarity on said first face;

a movable frame;

a second permanent magnet secured to said moveable frame, wherein said second permanent magnet has a second face, a third magnetic pole of the first polarity on said second face, and a fourth magnetic pole of the second polarity on said second face; and a plurality of crank shafts mounting said moveable frame to said stationary frame such that said moveable frame is rotatable with respect to said stationary frame, wherein said first permanent magnet and said second permanent magnet are spaced from each other and oriented such that said first face of said first permanent magnet is opposed to said second face of said second permanent magnet, thereby forming a magneto-spring having a spring constant such that magnetic energy accumulated in the magneto-spring is kept substantially constant and the spring constant is kept substantially zero during rotational movement of said moveable frame with respect to said stationary frame.

4. The vibration mechanism according to claim 1, wherein an opposing area between said first face of said first permanent magnet and said second face of said second permanent magnet is changed when a distance between said first face of said first permanent magnet and said second face of said second permanent magnet is changed.

* * * * *